US012764267B2

(12) United States Patent
Venkataraman et al.

(10) Patent No.: US 12,764,267 B2
(45) Date of Patent: Oct. 13, 2026

(54) SYSTEMS AND METHODS FOR DECODING IMAGE FILES CONTAINING DEPTH MAPS STORED AS METADATA

(71) Applicant: Adeia Imaging LLC, San Jose, CA (US)

(72) Inventors: Kartik Venkataraman, San Jose, CA (US); Semyon Nisenzon, Palo Alto, CA (US); Dan Lelescu, Morgan Hill, CA (US)

(73) Assignee: Adeia Imaging LLC, San Jose, CA (US)

( * ) Notice: Subject to any disclaimer, the term of this patent is extended or adjusted under 35 U.S.C. 154(b) by 278 days.

(21) Appl. No.: 18/742,982

(22) Filed: Jun. 13, 2024

(65) Prior Publication Data

US 2024/0333901 A1 Oct. 3, 2024

Related U.S. Application Data

(63) Continuation of application No. 18/339,775, filed on Jun. 22, 2023, now Pat. No. 12,052,409, which is a
(Continued)

(51) Int. Cl.
*G06V 10/00* (2022.01)
*G06T 3/4007* (2024.01)
(Continued)

(52) U.S. Cl.
CPC ......... *H04N 13/178* (2018.05); *G06T 3/4007* (2013.01); *G06T 3/4053* (2013.01);
(Continued)

(58) Field of Classification Search
CPC .. H04N 19/136; H04N 19/597; H04N 19/625; H04N 19/85; H04N 13/178;
(Continued)

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

CN 1619358 A 5/2005
CN 1669332 A 9/2005
(Continued)

OTHER PUBLICATIONS

Extended European Search Report for EP Application No. 11781313.9, Completed Oct. 1, 2013, Mailed Oct. 8, 2013, 6 pgs.
(Continued)

*Primary Examiner* — Amir Alavi
(74) *Attorney, Agent, or Firm* — KPPB LLP

(57) ABSTRACT

Systems and methods in accordance with embodiments of the invention are configured to decode images containing an image of a scene and a corresponding depth map. A depth-based effect is applied to the image to generate a synthetic image of the scene. The synthetic image can be encoded into a new image file that contains metadata associated with the depth-based effect. In many embodiments, the original decoded image has a different depth-based effect applied to it with respect to the synthetic image.

20 Claims, 19 Drawing Sheets

Related U.S. Application Data continuation of application No. 17/233,553, filed on Apr. 19, 2021, now Pat. No. 11,729,365, which is a continuation of application No. 16/586,827, filed on Sep. 27, 2019, now Pat. No. 10,984,276, which is a continuation of application No. 16/030,597, filed on Jul. 9, 2018, now Pat. No. 10,430,682, which is a continuation of application No. 15/396,024, filed on Dec. 30, 2016, now Pat. No. 10,019,816, which is a continuation of application No. 14/667,492, filed on Mar. 24, 2015, now Pat. No. 9,536,166, which is a continuation of application No. 14/504,687, filed on Oct. 2, 2014, now Pat. No. 9,042,667, which is a continuation of application No. 14/477,374, filed on Sep. 4, 2014, now Pat. No. 9,036,931, which is a continuation of application No. 13/955,411, filed on Jul. 31, 2013, now Pat. No. 8,831,367, which is a continuation of application No. 13/631,736, filed on Sep. 28, 2012, now Pat. No. 8,542,933.

(60) Provisional application No. 61/540,188, filed on Sep. 28, 2011.

(51) Int. Cl.

| | |
|---|---|
| ***G06T 3/4053*** | (2024.01) |
| ***G06T 7/50*** | (2017.01) |
| ***G06T 7/593*** | (2017.01) |
| ***G06T 9/00*** | (2006.01) |
| ***G06T 9/20*** | (2006.01) |
| ***G06T 15/08*** | (2011.01) |
| ***H04N 13/128*** | (2018.01) |
| ***H04N 13/161*** | (2018.01) |
| ***H04N 13/178*** | (2018.01) |
| ***H04N 13/243*** | (2018.01) |
| ***H04N 13/271*** | (2018.01) |
| ***H04N 19/136*** | (2014.01) |
| ***H04N 19/597*** | (2014.01) |
| ***H04N 19/625*** | (2014.01) |
| ***H04N 19/85*** | (2014.01) |
| *H04N 13/00* | (2018.01) |

(52) U.S. Cl.

CPC ................ *G06T 7/50* (2017.01); *G06T 7/596* (2017.01); *G06T 9/00* (2013.01); *G06T 9/20* (2013.01); *G06T 15/08* (2013.01); *H04N 13/128* (2018.05); *H04N 13/161* (2018.05); *H04N 13/243* (2018.05); *H04N 13/271* (2018.05); *H04N 19/136* (2014.11); *H04N 19/597* (2014.11); *H04N 19/625* (2014.11); *H04N 19/85* (2014.11); *G06T 2207/10052* (2013.01); *H04N 2013/0081* (2013.01)

(58) Field of Classification Search

CPC .. H04N 13/128; H04N 13/161; H04N 13/243; H04N 13/271; G06T 3/4007; G06T 3/4053; G06T 7/50; G06T 7/596; G06T 9/00; G06T 9/20; G06T 15/08

See application file for complete search history.

(56) References Cited

U.S. PATENT DOCUMENTS

| | | | |
|---|---|---|---|
| 4,323,925 | A | 4/1982 | Abell et al. |
| 4,460,449 | A | 7/1984 | Montalbano |
| 4,467,365 | A | 8/1984 | Murayama et al. |
| 4,652,909 | A | 3/1987 | Glenn |
| 4,888,645 | A | 12/1989 | Mitchell et al. |
| 4,899,060 | A | 2/1990 | Lischke |
| 4,962,425 | A | 10/1990 | Rea |
| 5,005,083 | A | 4/1991 | Grage et al. |
| 5,070,414 | A | 12/1991 | Tsutsumi |
| 5,109,425 | A | 4/1992 | Lawton |
| 5,144,448 | A | 9/1992 | Hornbaker et al. |
| 5,157,499 | A | 10/1992 | Oguma et al. |
| 5,325,449 | A | 6/1994 | Burt et al. |
| 5,327,125 | A | 7/1994 | Iwase et al. |
| 5,463,464 | A | 10/1995 | Ladewski |
| 5,488,674 | A | 1/1996 | Burt et al. |
| 5,629,524 | A | 5/1997 | Stettner et al. |
| 5,638,461 | A | 6/1997 | Fridge |
| 5,757,425 | A | 5/1998 | Barton et al. |
| 5,793,900 | A | 8/1998 | Nourbakhsh et al. |
| 5,801,919 | A | 9/1998 | Griencewic |
| 5,808,350 | A | 9/1998 | Jack et al. |
| 5,832,312 | A | 11/1998 | Rieger et al. |
| 5,833,507 | A | 11/1998 | Woodgate et al. |
| 5,880,691 | A | 3/1999 | Fossum et al. |
| 5,911,008 | A | 6/1999 | Niikura et al. |
| 5,933,190 | A | 8/1999 | Dierickx et al. |
| 5,963,664 | A | 10/1999 | Kumar et al. |
| 5,973,844 | A | 10/1999 | Burger |
| 6,002,743 | A | 12/1999 | Telymonde |
| 6,005,607 | A | 12/1999 | Uomori et al. |
| 6,034,690 | A | 3/2000 | Gallery et al. |
| 6,069,351 | A | 5/2000 | Mack |
| 6,069,365 | A | 5/2000 | Chow et al. |
| 6,095,989 | A | 8/2000 | Hay et al. |
| 6,097,394 | A | 8/2000 | Levoy et al. |
| 6,124,974 | A | 9/2000 | Burger |
| 6,130,786 | A | 10/2000 | Osawa et al. |
| 6,137,100 | A | 10/2000 | Fossum et al. |
| 6,137,535 | A | 10/2000 | Meyers |
| 6,139,490 | A | 10/2000 | Breidenthal et al. |
| 6,141,048 | A | 10/2000 | Meyers |
| 6,160,909 | A | 12/2000 | Melen |
| 6,163,414 | A | 12/2000 | Kikuchi et al. |
| 6,172,352 | B1 | 1/2001 | Liu |
| 6,175,379 | B1 | 1/2001 | Uomori et al. |
| 6,205,241 | B1 | 3/2001 | Melen |
| 6,239,909 | B1 | 5/2001 | Hayashi et al. |
| 6,292,713 | B1 | 9/2001 | Jouppi et al. |
| 6,340,994 | B1 | 1/2002 | Margulis et al. |
| 6,358,862 | B1 | 3/2002 | Ireland et al. |
| 6,373,518 | B1 | 4/2002 | Sogawa |
| 6,419,638 | B1 | 7/2002 | Hay et al. |
| 6,443,579 | B1 | 9/2002 | Myers |
| 6,445,815 | B1 | 9/2002 | Sato |
| 6,476,805 | B1 | 11/2002 | Shum et al. |
| 6,477,260 | B1 | 11/2002 | Shimomura |
| 6,483,949 | B1 | 11/2002 | Yokoyama et al. |
| 6,502,097 | B1 | 12/2002 | Chan et al. |
| 6,525,302 | B2 | 2/2003 | Dowski, Jr. et al. |
| 6,552,742 | B1 | 4/2003 | Seta |
| 6,563,537 | B1 | 5/2003 | Kawamura et al. |
| 6,571,466 | B1 | 6/2003 | Glenn et al. |
| 6,603,513 | B1 | 8/2003 | Berezin |
| 6,611,289 | B1 | 8/2003 | Yu et al. |
| 6,627,896 | B1 | 9/2003 | Hashimoto et al. |
| 6,628,330 | B1 | 9/2003 | Lin |
| 6,628,845 | B1 | 9/2003 | Stone et al. |
| 6,635,941 | B2 | 10/2003 | Suda |
| 6,639,596 | B1 | 10/2003 | Shum et al. |
| 6,647,142 | B1 | 11/2003 | Beardsley |
| 6,657,218 | B2 | 12/2003 | Noda |
| 6,671,399 | B1 | 12/2003 | Berestov |
| 6,674,892 | B1 | 1/2004 | Melen |
| 6,750,904 | B1 | 6/2004 | Lambert |
| 6,765,617 | B1 | 7/2004 | Tangen et al. |
| 6,771,833 | B1 | 8/2004 | Edgar |
| 6,774,941 | B1 | 8/2004 | Boisvert et al. |
| 6,788,338 | B1 | 9/2004 | Dinev et al. |
| 6,795,253 | B2 | 9/2004 | Shinohara |
| 6,801,653 | B1 | 10/2004 | Wu et al. |
| 6,819,328 | B1 | 11/2004 | Moriwaki et al. |
| 6,819,358 | B1 | 11/2004 | Kagle et al. |
| 6,833,863 | B1 | 12/2004 | Clemens |
| 6,879,735 | B1 | 4/2005 | Portniaguine et al. |

(56) References Cited

U.S. PATENT DOCUMENTS 6,897,454 B2 5/2005 Sasaki et al.
6,903,770 B1 6/2005 Kobayashi et al.
6,909,121 B2 6/2005 Nishikawa
6,917,702 B2 7/2005 Beardsley
6,927,922 B2 8/2005 George et al.
6,958,862 B1 10/2005 Joseph
6,985,175 B2 1/2006 Iwai et al.
7,015,954 B1 3/2006 Foote et al.
7,085,409 B2 8/2006 Sawhney et al.
7,161,614 B1 1/2007 Yamashita et al.
7,199,348 B2 4/2007 Olsen et al.
7,206,449 B2 4/2007 Raskar et al.
7,215,364 B2 5/2007 Wachtel et al.
7,235,785 B2 6/2007 Hornback et al.
7,245,761 B2 7/2007 Swaminathan et al.
7,262,799 B2 8/2007 Suda
7,292,735 B2 11/2007 Blake et al.
7,295,697 B1 11/2007 Satoh
7,333,651 B1 2/2008 Kim et al.
7,369,165 B2 5/2008 Bosco et al.
7,391,572 B2 6/2008 Jacobowitz et al.
7,408,725 B2 8/2008 Sato
7,425,984 B2 9/2008 Chen et al.
7,430,312 B2 9/2008 Gu
7,471,765 B2 12/2008 Jaffray et al.
7,496,293 B2 2/2009 Shamir et al.
7,564,019 B2 7/2009 Olsen et al.
7,599,547 B2 10/2009 Sun et al.
7,606,484 B1 10/2009 Richards et al.
7,620,265 B1 11/2009 Wolff et al.
7,633,511 B2 12/2009 Shum et al.
7,639,435 B2 12/2009 Chiang
7,639,838 B2 12/2009 Nims
7,646,549 B2 1/2010 Zalevsky et al.
7,657,090 B2 2/2010 Omatsu et al.
7,667,824 B1 2/2010 Moran
7,675,080 B2 3/2010 Boettiger
7,675,681 B2 3/2010 Tomikawa et al.
7,706,634 B2 4/2010 Schmitt et al.
7,723,662 B2 5/2010 Levoy et al.
7,738,013 B2 6/2010 Galambos et al.
7,741,620 B2 6/2010 Doering et al.
7,782,364 B2 8/2010 Smith
7,826,153 B2 11/2010 Hong
7,840,067 B2 11/2010 Shen et al.
7,912,673 B2 3/2011 Hébert et al.
7,924,321 B2 4/2011 Nayar et al.
7,956,871 B2 6/2011 Fainstain et al.
7,965,314 B1 6/2011 Miller et al.
7,973,834 B2 7/2011 Yang
7,986,018 B2 7/2011 Rennie
7,990,447 B2 8/2011 Honda et al.
8,000,498 B2 8/2011 Shih et al.
8,013,904 B2 9/2011 Tan et al.
8,027,531 B2 9/2011 Wilburn et al.
8,036,931 B2 * 10/2011 Hale .................. G06Q 30/0244
705/14.1
8,044,994 B2 10/2011 Vetro et al.
8,055,466 B2 11/2011 Bryll
8,077,245 B2 12/2011 Adamo et al.
8,089,515 B2 1/2012 Chebil et al.
8,098,297 B2 1/2012 Crisan et al.
8,098,304 B2 1/2012 Pinto et al.
8,106,949 B2 1/2012 Tan et al.
8,111,910 B2 2/2012 Tanaka
8,126,279 B2 2/2012 Marcellin et al.
8,130,120 B2 3/2012 Kawabata et al.
8,131,097 B2 3/2012 Lelescu et al.
8,149,323 B2 4/2012 Li et al.
8,164,629 B1 4/2012 Zhang
8,169,486 B2 5/2012 Corcoran et al.
8,180,145 B2 5/2012 Wu et al.
8,189,065 B2 5/2012 Georgiev et al.
8,189,089 B1 5/2012 Georgiev et al.
8,194,296 B2 6/2012 Compton et al.
8,212,914 B2 7/2012 Chiu
8,213,711 B2 7/2012 Tam
8,231,814 B2 7/2012 Duparre
8,242,426 B2 8/2012 Ward et al.
8,244,027 B2 8/2012 Takahashi
8,244,058 B1 8/2012 Intwala et al.
8,254,668 B2 8/2012 Mashitani et al.
8,279,325 B2 10/2012 Pitts et al.
8,280,194 B2 10/2012 Wong et al.
8,284,240 B2 10/2012 Saint-Pierre et al.
8,289,409 B2 10/2012 Chang
8,289,440 B2 10/2012 Pitts et al.
8,290,358 B1 10/2012 Georgiev
8,294,099 B2 10/2012 Blackwell, Jr.
8,294,754 B2 10/2012 Jung et al.
8,300,085 B2 10/2012 Yang et al.
8,305,456 B1 11/2012 McMahon
8,315,476 B1 11/2012 Georgiev et al.
8,345,144 B1 1/2013 Georgiev et al.
8,360,574 B2 1/2013 Ishak et al.
8,400,555 B1 3/2013 Georgiev et al.
8,406,562 B2 3/2013 Bassi et al.
8,411,146 B2 4/2013 Twede
8,416,282 B2 4/2013 Lablans
8,421,846 B2 4/2013 Nelson et al.
8,446,492 B2 5/2013 Nakano et al.
8,447,128 B2 5/2013 Kameyama
8,456,517 B2 6/2013 Spektor et al.
8,493,496 B2 7/2013 Freedman et al.
8,514,291 B2 8/2013 Chang
8,514,491 B2 8/2013 Duparre
8,541,730 B2 9/2013 Inuiya
8,542,933 B2 * 9/2013 Venkataraman ........ G06T 15/08
382/233
8,553,093 B2 10/2013 Wong et al.
8,559,705 B2 10/2013 Ng
8,559,756 B2 10/2013 Georgiev et al.
8,565,547 B2 10/2013 Strandemar
8,576,302 B2 11/2013 Yoshikawa
8,577,183 B2 11/2013 Robinson
8,581,995 B2 11/2013 Lin et al.
8,587,679 B2 11/2013 Knee
8,619,082 B1 12/2013 Ciurea et al.
8,648,918 B2 2/2014 Kauker et al.
8,648,919 B2 2/2014 Mantzel et al.
8,655,052 B2 2/2014 Spooner et al.
8,682,107 B2 3/2014 Yoon et al.
8,687,087 B2 4/2014 Pertsel et al.
8,692,893 B2 4/2014 McMahon
8,749,620 B1 6/2014 Knight et al.
8,754,941 B1 6/2014 Sarwari et al.
8,773,536 B1 7/2014 Zhang
8,780,113 B1 7/2014 Ciurea et al.
8,804,255 B2 8/2014 Duparre
8,823,813 B2 9/2014 Mantzel et al.
8,830,375 B2 9/2014 Ludwig
8,831,367 B2 * 9/2014 Venkataraman ....... H04N 19/85
382/233
8,831,377 B2 9/2014 Pitts et al.
8,836,793 B1 9/2014 Kriesel et al.
8,842,201 B2 9/2014 Tajiri
8,854,462 B2 10/2014 Herbin et al.
8,861,089 B2 10/2014 Duparre
8,866,912 B2 10/2014 Mullis
8,866,920 B2 10/2014 Venkataraman et al.
8,866,951 B2 10/2014 Keelan
8,878,950 B2 11/2014 Lelescu et al.
8,885,059 B1 11/2014 Venkataraman et al.
8,885,922 B2 11/2014 Ito et al.
8,896,594 B2 11/2014 Xiong et al.
8,896,719 B1 11/2014 Venkataraman et al.
8,902,321 B2 12/2014 Venkataraman et al.
8,928,793 B2 1/2015 McMahon
8,977,038 B2 3/2015 Tian et al.
9,001,226 B1 4/2015 Ng et al.
9,019,426 B2 4/2015 Han et al.
9,025,894 B2 5/2015 Venkataraman et al.
9,025,895 B2 5/2015 Venkataraman et al.
9,030,528 B2 5/2015 Pesach et al.

(56) References Cited

U.S. PATENT DOCUMENTS 9,031,335 B2 5/2015 Venkataraman et al.
9,031,342 B2 5/2015 Venkataraman
9,031,343 B2 5/2015 Venkataraman
9,036,928 B2 5/2015 Venkataraman
9,036,931 B2 5/2015 Venkataraman et al.
9,041,823 B2 5/2015 Venkataraman et al.
9,041,824 B2 5/2015 Lelescu et al.
9,041,829 B2 5/2015 Venkataraman et al.
9,042,667 B2 * 5/2015 Venkataraman .......... G06T 7/50 382/233
9,047,684 B2 6/2015 Lelescu et al.
9,049,367 B2 6/2015 Venkataraman et al.
9,055,233 B2 6/2015 Venkataraman et al.
9,060,120 B2 6/2015 Venkataraman et al.
9,060,124 B2 6/2015 Venkataraman et al.
9,077,893 B2 7/2015 Venkataraman et al.
9,094,661 B2 7/2015 Venkataraman et al.
9,100,586 B2 8/2015 McMahon et al.
9,100,635 B2 8/2015 Duparre et al.
9,123,117 B2 9/2015 Ciurea et al.
9,123,118 B2 9/2015 Ciurea et al.
9,124,815 B2 9/2015 Venkataraman et al.
9,124,831 B2 9/2015 Mullis
9,124,864 B2 9/2015 Mullis
9,128,228 B2 9/2015 Duparre
9,129,183 B2 9/2015 Venkataraman et al.
9,129,377 B2 9/2015 Ciurea et al.
9,131,128 B2 9/2015 Meyers et al.
9,143,711 B2 9/2015 McMahon
9,147,254 B2 9/2015 Florian et al.
9,185,276 B2 11/2015 Rodda et al.
9,188,765 B2 11/2015 Venkataraman et al.
9,191,580 B2 11/2015 Venkataraman et al.
9,197,821 B2 11/2015 McMahon
9,210,392 B2 12/2015 Nisenzon et al.
9,214,013 B2 12/2015 Venkataraman et al.
9,235,898 B2 1/2016 Venkataraman et al.
9,235,900 B2 1/2016 Ciurea et al.
9,240,049 B2 1/2016 Ciurea et al.
9,253,380 B2 2/2016 Venkataraman et al.
9,253,397 B2 2/2016 Lee et al.
9,256,974 B1 2/2016 Hines
9,264,592 B2 2/2016 Rodda et al.
9,264,610 B2 2/2016 Duparre
9,270,970 B2 2/2016 Ishii
9,361,662 B2 6/2016 Lelescu et al.
9,374,512 B2 6/2016 Venkataraman et al.
9,412,206 B2 8/2016 McMahon et al.
9,413,953 B2 8/2016 Maeda
9,414,048 B2 8/2016 Karsch et al.
9,426,343 B2 8/2016 Rodda et al.
9,426,361 B2 8/2016 Venkataraman et al.
9,438,888 B2 9/2016 Venkataraman et al.
9,445,003 B1 9/2016 Lelescu et al.
9,456,134 B2 9/2016 Venkataraman et al.
9,456,196 B2 9/2016 Kim et al.
9,462,164 B2 10/2016 Venkataraman et al.
9,485,496 B2 11/2016 Venkataraman et al.
9,497,370 B2 11/2016 Venkataraman et al.
9,497,429 B2 11/2016 Mullis et al.
9,516,222 B2 12/2016 Duparre et al.
9,519,972 B2 12/2016 Venkataraman et al.
9,521,319 B2 12/2016 Rodda et al.
9,521,416 B1 12/2016 McMahon et al.
9,536,166 B2 * 1/2017 Venkataraman ..... H04N 19/625
9,576,369 B2 2/2017 Venkataraman et al.
9,578,237 B2 2/2017 Duparre et al.
9,578,259 B2 2/2017 Molina
9,602,805 B2 3/2017 Venkataraman et al.
9,633,442 B2 4/2017 Venkataraman et al.
9,635,274 B2 4/2017 Lin et al.
9,638,883 B1 5/2017 Duparre
9,661,310 B2 5/2017 Deng et al.
9,706,132 B2 7/2017 Nisenzon et al.
9,712,759 B2 7/2017 Venkataraman et al.
9,733,486 B2 8/2017 Lelescu et al.
9,741,118 B2 8/2017 Mullis
9,743,051 B2 8/2017 Venkataraman et al.
9,749,547 B2 8/2017 Venkataraman et al.
9,749,568 B2 8/2017 McMahon
9,754,422 B2 9/2017 McMahon et al.
9,766,380 B2 9/2017 Duparre et al.
9,769,365 B1 9/2017 Jannard
9,774,789 B2 9/2017 Ciurea et al.
9,774,831 B2 9/2017 Venkataraman et al.
9,787,911 B2 10/2017 McMahon et al.
9,794,476 B2 10/2017 Nayar et al.
9,800,856 B2 10/2017 Venkataraman et al.
9,800,859 B2 10/2017 Venkataraman et al.
9,807,382 B2 10/2017 Duparre et al.
9,811,753 B2 11/2017 Venkataraman et al.
9,813,616 B2 11/2017 Lelescu et al.
9,813,617 B2 11/2017 Venkataraman et al.
9,826,212 B2 11/2017 Newton et al.
9,858,673 B2 1/2018 Ciurea et al.
9,864,921 B2 1/2018 Venkataraman et al.
9,888,194 B2 2/2018 Duparre
9,898,856 B2 2/2018 Yang et al.
9,917,998 B2 3/2018 Venkataraman et al.
9,924,092 B2 3/2018 Rodda et al.
9,936,148 B2 4/2018 McMahon
9,955,070 B2 4/2018 Lelescu et al.
9,986,224 B2 5/2018 Mullis
10,009,538 B2 6/2018 Venkataraman et al.
10,019,816 B2 * 7/2018 Venkataraman .......... G06T 7/50
10,027,901 B2 7/2018 Venkataraman et al.
10,089,740 B2 10/2018 Srikanth et al.
10,091,405 B2 10/2018 Molina
10,102,673 B2 10/2018 Eraker et al.
10,119,808 B2 11/2018 Venkataraman et al.
10,122,993 B2 11/2018 Venkataraman et al.
10,127,682 B2 11/2018 Mullis
10,142,560 B2 11/2018 Venkataraman et al.
10,182,216 B2 1/2019 Mullis et al.
10,187,560 B2 1/2019 Chen et al.
10,225,543 B2 3/2019 Mullis
10,250,871 B2 4/2019 Ciurea et al.
10,261,219 B2 4/2019 Duparre et al.
10,275,676 B2 4/2019 Venkataraman et al.
10,306,120 B2 5/2019 Duparre
10,311,649 B2 6/2019 McMohan et al.
10,334,241 B2 6/2019 Duparre et al.
10,366,472 B2 7/2019 Lelescu et al.
10,375,302 B2 8/2019 Nayar et al.
10,375,319 B2 8/2019 Venkataraman et al.
10,380,752 B2 8/2019 Ciurea et al.
10,382,665 B2 8/2019 Sa et al.
10,390,005 B2 8/2019 Nisenzon et al.
10,412,314 B2 9/2019 McMahon et al.
10,430,682 B2 * 10/2019 Venkataraman ...... G06T 3/4053
10,432,944 B2 10/2019 Hamilton et al.
10,455,168 B2 10/2019 McMahon
10,455,218 B2 10/2019 Venkataraman et al.
10,462,362 B2 10/2019 Lelescu et al.
10,475,163 B2 11/2019 Boisson et al.
10,540,806 B2 1/2020 Yang et al.
10,540,818 B2 1/2020 Akeley
10,542,208 B2 1/2020 Lelescu et al.
10,547,772 B2 1/2020 Molina
10,560,684 B2 2/2020 Mullis
10,574,905 B2 2/2020 Srikanth et al.
10,638,099 B2 4/2020 Mullis et al.
10,674,138 B2 6/2020 Venkataraman et al.
10,687,068 B1 6/2020 Barros Da Silva et al.
10,694,114 B2 6/2020 Venkataraman et al.
10,708,492 B2 7/2020 Venkataraman et al.
10,735,635 B2 8/2020 Duparre
10,767,981 B2 9/2020 Venkataraman et al.
10,839,485 B2 11/2020 Lelescu et al.
10,909,707 B2 2/2021 Ciurea et al.
10,911,735 B2 2/2021 Hamilton et al.
10,944,961 B2 3/2021 Ciurea et al.
10,958,892 B2 3/2021 Mullis
10,984,276 B2 * 4/2021 Venkataraman ...... G06T 3/4053

(56) References Cited

U.S. PATENT DOCUMENTS 11,022,725 B2 6/2021 Duparre et al.
11,064,154 B2 7/2021 Cutler
11,082,659 B2 8/2021 Cutler
11,120,260 B2 9/2021 Guglielmo
11,270,464 B2 3/2022 Cutler
11,272,161 B2 3/2022 Mullis
11,315,321 B2 4/2022 Lucas et al.
11,412,158 B2 8/2022 Venkataraman et al.
11,423,513 B2 8/2022 Lelescu et al.
11,486,698 B2 11/2022 Venkataraman et al.
11,503,274 B2 11/2022 Smithwick
11,525,906 B2 12/2022 Kadambi et al.
11,546,576 B2 1/2023 Ciurea et al.
11,553,123 B2 1/2023 Cutler
11,562,530 B2 1/2023 Hamilton
11,570,423 B2 1/2023 Mullis
11,729,365 B2 * 8/2023 Venkataraman ..... H04N 13/128 382/233
11,792,538 B2 10/2023 Venkataraman et al.
11,875,475 B2 1/2024 Lelescu et al.
11,985,293 B2 5/2024 Mullis
12,002,233 B2 6/2024 Ciurea et al.
12,022,207 B2 6/2024 Venkataraman et al.
12,041,360 B2 7/2024 Venkataraman et al.
12,052,409 B2 * 7/2024 Venkataraman ..... H04N 19/136
12,243,190 B2 3/2025 Lelescu et al.
12,437,432 B2 10/2025 Ciurea et al.
2001/0005225 A1 6/2001 Clark et al.
2001/0019621 A1 9/2001 Hanna et al.
2001/0028038 A1 10/2001 Hamaguchi et al.
2001/0038387 A1 11/2001 Tomooka et al.
2002/0012056 A1 1/2002 Trevino et al.
2002/0015536 A1 2/2002 Warren et al.
2002/0027608 A1 3/2002 Johnson et al.
2002/0028014 A1 3/2002 Ono
2002/0039438 A1 4/2002 Mori et al.
2002/0057845 A1 5/2002 Fossum et al.
2002/0061131 A1 5/2002 Sawhney et al.
2002/0063807 A1 5/2002 Margulis
2002/0075450 A1 6/2002 Aratani et al.
2002/0087403 A1 7/2002 Meyers et al.
2002/0089596 A1 7/2002 Yasuo
2002/0094027 A1 7/2002 Sato et al.
2002/0101528 A1 8/2002 Lee et al.
2002/0113867 A1 8/2002 Takigawa et al.
2002/0113888 A1 8/2002 Sonoda et al.
2002/0118113 A1 8/2002 Oku et al.
2002/0120634 A1 8/2002 Min et al.
2002/0122113 A1 9/2002 Foote
2002/0163054 A1 11/2002 Suda
2002/0167537 A1 11/2002 Trajkovic
2002/0171666 A1 11/2002 Endo et al.
2002/0177054 A1 11/2002 Saitoh et al.
2002/0190991 A1 12/2002 Efran et al.
2002/0195548 A1 12/2002 Dowski, Jr. et al.
2003/0025227 A1 2/2003 Daniell
2003/0026474 A1 2/2003 Yano
2003/0086079 A1 5/2003 Barth et al.
2003/0124763 A1 7/2003 Fan et al.
2003/0140347 A1 7/2003 Varsa
2003/0156189 A1 8/2003 Utsumi et al.
2003/0179418 A1 9/2003 Wengender et al.
2003/0188659 A1 10/2003 Merry et al.
2003/0190072 A1 10/2003 Adkins et al.
2003/0198377 A1 10/2003 Ng
2003/0211405 A1 11/2003 Venkataraman
2003/0231179 A1 12/2003 Suzuki
2004/0003409 A1 1/2004 Berstis
2004/0008271 A1 1/2004 Hagimori et al.
2004/0012689 A1 1/2004 Tinnerino et al.
2004/0027358 A1 2/2004 Nakao
2004/0047274 A1 3/2004 Amanai
2004/0050104 A1 3/2004 Ghosh et al.
2004/0056966 A1 3/2004 Schechner et al.
2004/0061787 A1 4/2004 Liu et al.
2004/0066454 A1 4/2004 Otani et al.
2004/0071367 A1 4/2004 Irani et al.
2004/0075654 A1 4/2004 Hsiao et al.
2004/0096119 A1 5/2004 Williams et al.
2004/0100570 A1 5/2004 Shizukuishi
2004/0105021 A1 6/2004 Hu
2004/0114807 A1 6/2004 Lelescu et al.
2004/0141659 A1 7/2004 Zhang
2004/0151401 A1 8/2004 Sawhney et al.
2004/0165090 A1 8/2004 Ning
2004/0169617 A1 9/2004 Yelton et al.
2004/0170340 A1 9/2004 Tipping et al.
2004/0174439 A1 9/2004 Upton
2004/0179008 A1 9/2004 Gordon et al.
2004/0179834 A1 9/2004 Szajewski et al.
2004/0196379 A1 10/2004 Chen et al.
2004/0207600 A1 10/2004 Zhang et al.
2004/0207836 A1 10/2004 Chhibber et al.
2004/0212734 A1 10/2004 Macinnis et al.
2004/0213449 A1 10/2004 Safaee-Rad et al.
2004/0218809 A1 11/2004 Blake et al.
2004/0223051 A1 11/2004 Peleg et al.
2004/0234873 A1 11/2004 Venkataraman
2004/0239782 A1 12/2004 Equitz et al.
2004/0239885 A1 12/2004 Jaynes et al.
2004/0240052 A1 12/2004 Minefuji et al.
2004/0251509 A1 12/2004 Choi
2004/0264806 A1 12/2004 Herley
2005/0006477 A1 1/2005 Patel
2005/0007461 A1 1/2005 Chou et al.
2005/0009313 A1 1/2005 Suzuki et al.
2005/0010621 A1 1/2005 Pinto et al.
2005/0012035 A1 1/2005 Miller
2005/0036778 A1 2/2005 DeMonte
2005/0047678 A1 3/2005 Jones et al.
2005/0048690 A1 3/2005 Yamamoto
2005/0068436 A1 3/2005 Fraenkel et al.
2005/0083531 A1 4/2005 Millerd et al.
2005/0084179 A1 4/2005 Hanna et al.
2005/0128509 A1 6/2005 Tokkonen et al.
2005/0128595 A1 6/2005 Shimizu
2005/0132098 A1 6/2005 Sonoda et al.
2005/0134698 A1 6/2005 Schroeder et al.
2005/0134699 A1 6/2005 Nagashima
2005/0134712 A1 6/2005 Gruhlke et al.
2005/0147277 A1 7/2005 Higaki et al.
2005/0151759 A1 7/2005 Gonzalez-Banos et al.
2005/0168924 A1 8/2005 Wu et al.
2005/0175257 A1 8/2005 Kuroki
2005/0185711 A1 8/2005 Pfister et al.
2005/0205785 A1 9/2005 Hornback et al.
2005/0219264 A1 10/2005 Shum et al.
2005/0219363 A1 10/2005 Kohler et al.
2005/0224843 A1 10/2005 Boemler
2005/0225654 A1 10/2005 Feldman et al.
2005/0265633 A1 12/2005 Piacentino et al.
2005/0275946 A1 12/2005 Choo et al.
2005/0286612 A1 12/2005 Takanashi
2005/0286756 A1 12/2005 Hong et al.
2006/0002635 A1 1/2006 Nestares et al.
2006/0007331 A1 1/2006 Izumi et al.
2006/0013318 A1 1/2006 Webb et al.
2006/0018509 A1 1/2006 Miyoshi
2006/0023197 A1 2/2006 Joel
2006/0023314 A1 2/2006 Boettiger et al.
2006/0028476 A1 2/2006 Sobel et al.
2006/0029270 A1 2/2006 Berestov et al.
2006/0029271 A1 2/2006 Miyoshi et al.
2006/0033005 A1 2/2006 Jerdev et al.
2006/0034003 A1 2/2006 Zalevsky
2006/0034531 A1 2/2006 Poon et al.
2006/0035415 A1 2/2006 Wood
2006/0038879 A1 2/2006 Kremen
2006/0038891 A1 2/2006 Okutomi et al.
2006/0039611 A1 2/2006 Rother et al.
2006/0046204 A1 3/2006 Ono et al.
2006/0049930 A1 3/2006 Zruya et al.
2006/0050980 A1 3/2006 Kohashi et al.
2006/0054780 A1 3/2006 Garrood et al.

(56) References Cited

U.S. PATENT DOCUMENTS

2006/0054782 A1 3/2006 Olsen et al.
2006/0055811 A1 3/2006 Frtiz et al.
2006/0069478 A1 3/2006 Iwama
2006/0072029 A1 4/2006 Miyatake et al.
2006/0087747 A1 4/2006 Ohzawa et al.
2006/0098888 A1 5/2006 Morishita
2006/0103754 A1 5/2006 Wenstrand et al.
2006/0119597 A1 6/2006 Oshino
2006/0125936 A1 6/2006 Gruhike et al.
2006/0138322 A1 6/2006 Costello et al.
2006/0139475 A1 6/2006 Esch et al.
2006/0152803 A1 7/2006 Provitola
2006/0157640 A1 7/2006 Perlman et al.
2006/0159369 A1 7/2006 Young
2006/0176566 A1 8/2006 Boettiger et al.
2006/0187322 A1 8/2006 Janson, Jr. et al.
2006/0187338 A1 8/2006 May et al.
2006/0197937 A1 9/2006 Bamji et al.
2006/0203100 A1 9/2006 Ajito et al.
2006/0203113 A1 9/2006 Wada et al.
2006/0210146 A1 9/2006 Gu
2006/0210186 A1 9/2006 Berkner
2006/0214085 A1 9/2006 Olsen et al.
2006/0221250 A1 10/2006 Rossbach et al.
2006/0239549 A1 10/2006 Kelly et al.
2006/0243889 A1 11/2006 Farnworth et al.
2006/0251410 A1 11/2006 Trutna
2006/0274174 A1 12/2006 Tewinkle
2006/0278948 A1 12/2006 Yamaguchi et al.
2006/0279648 A1 12/2006 Senba et al.
2006/0289772 A1 12/2006 Johnson et al.
2007/0002159 A1 1/2007 Olsen et al.
2007/0008575 A1 1/2007 Yu et al.
2007/0009150 A1 1/2007 Suwa
2007/0024614 A1 2/2007 Tam et al.
2007/0030356 A1 2/2007 Yea et al.
2007/0035707 A1 2/2007 Margulis
2007/0036427 A1 2/2007 Nakamura et al.
2007/0040828 A1 2/2007 Zalevsky et al.
2007/0040922 A1 2/2007 McKee et al.
2007/0041391 A1 2/2007 Lin et al.
2007/0052825 A1 3/2007 Cho
2007/0083114 A1 4/2007 Yang et al.
2007/0085917 A1 4/2007 Kobayashi
2007/0092245 A1 4/2007 Bazakos et al.
2007/0102622 A1 5/2007 Olsen et al.
2007/0116447 A1 5/2007 Ye
2007/0126898 A1 6/2007 Feldman et al.
2007/0127831 A1 6/2007 Venkataraman
2007/0139333 A1 6/2007 Sato et al.
2007/0140685 A1 6/2007 Wu
2007/0146503 A1 6/2007 Shiraki
2007/0146511 A1 6/2007 Kinoshita et al.
2007/0153335 A1 7/2007 Hosaka
2007/0158427 A1 7/2007 Zhu et al.
2007/0159541 A1 7/2007 Sparks et al.
2007/0160310 A1 7/2007 Tanida et al.
2007/0165931 A1 7/2007 Higaki
2007/0166447 A1 7/2007 Ur-Rehman et al.
2007/0171290 A1 7/2007 Kroger
2007/0177004 A1 8/2007 Kolehmainen et al.
2007/0182843 A1 8/2007 Shimamura et al.
2007/0201859 A1 8/2007 Sarrat
2007/0206241 A1 9/2007 Smith et al.
2007/0211164 A1 9/2007 Olsen et al.
2007/0216765 A1 9/2007 Wong et al.
2007/0225600 A1 9/2007 Weibrecht et al.
2007/0228256 A1 10/2007 Mentzer et al.
2007/0236595 A1 10/2007 Pan et al.
2007/0242141 A1 10/2007 Ciurea
2007/0247517 A1 10/2007 Zhang et al.
2007/0257184 A1 11/2007 Olsen et al.
2007/0258006 A1 11/2007 Olsen et al.
2007/0258706 A1 11/2007 Raskar et al.
2007/0263113 A1 11/2007 Baek et al.
2007/0263114 A1 11/2007 Gurevich et al.
2007/0268374 A1 11/2007 Robinson
2007/0296721 A1 12/2007 Chang et al.
2007/0296832 A1 12/2007 Ota et al.
2007/0296835 A1 12/2007 Olsen et al.
2007/0296847 A1 12/2007 Chang et al.
2007/0297696 A1 12/2007 Hamza et al.
2008/0006859 A1 1/2008 Mionetto
2008/0019611 A1 1/2008 Larkin et al.
2008/0024683 A1 1/2008 Damera-Venkata et al.
2008/0025649 A1 1/2008 Liu et al.
2008/0029714 A1 2/2008 Olsen et al.
2008/0030592 A1 2/2008 Border et al.
2008/0030597 A1 2/2008 Olsen et al.
2008/0043095 A1 2/2008 Vetro et al.
2008/0043096 A1 2/2008 Vetro et al.
2008/0054518 A1 3/2008 Ra et al.
2008/0056302 A1 3/2008 Erdal et al.
2008/0062164 A1 3/2008 Bassi et al.
2008/0079805 A1 4/2008 Takagi et al.
2008/0080028 A1 4/2008 Bakin et al.
2008/0084486 A1 4/2008 Enge et al.
2008/0088793 A1 4/2008 Sverdrup et al.
2008/0095523 A1 4/2008 Schilling-Benz et al.
2008/0099804 A1 5/2008 Venezia et al.
2008/0106620 A1 5/2008 Sawachi
2008/0112059 A1 5/2008 Choi et al.
2008/0112635 A1 5/2008 Kondo et al.
2008/0117289 A1 5/2008 Schowengerdt et al.
2008/0118241 A1 5/2008 TeKolste et al.
2008/0123937 A1 5/2008 Arias et al.
2008/0131019 A1 6/2008 Ng
2008/0131107 A1 6/2008 Ueno
2008/0151097 A1 6/2008 Chen et al.
2008/0152215 A1 6/2008 Horie et al.
2008/0152296 A1 6/2008 Oh et al.
2008/0156991 A1 7/2008 Hu et al.
2008/0158259 A1 7/2008 Kempf et al.
2008/0158375 A1 7/2008 Kakkori et al.
2008/0158698 A1 7/2008 Chang et al.
2008/0165257 A1 7/2008 Boettiger
2008/0174670 A1 7/2008 Olsen et al.
2008/0187305 A1 8/2008 Raskar et al.
2008/0193026 A1 8/2008 Horie et al.
2008/0208506 A1 8/2008 Kuwata
2008/0211737 A1 9/2008 Kim et al.
2008/0218610 A1 9/2008 Chapman et al.
2008/0218611 A1 9/2008 Parulski et al.
2008/0218612 A1 9/2008 Border et al.
2008/0218613 A1 9/2008 Janson et al.
2008/0219654 A1 9/2008 Border et al.
2008/0239116 A1 10/2008 Smith
2008/0240598 A1 10/2008 Hasegawa
2008/0247638 A1 10/2008 Tanida et al.
2008/0247653 A1 10/2008 Moussavi et al.
2008/0272416 A1 11/2008 Yun
2008/0273751 A1 11/2008 Yuan et al.
2008/0278591 A1 11/2008 Barna et al.
2008/0278610 A1 11/2008 Boettiger
2008/0284880 A1 11/2008 Numata
2008/0291295 A1 11/2008 Kato et al.
2008/0298674 A1 12/2008 Baker et al.
2008/0310501 A1 12/2008 Ward et al.
2009/0027543 A1 1/2009 Kanehiro
2009/0050946 A1 2/2009 Duparre et al.
2009/0052743 A1 2/2009 Techmer
2009/0060281 A1 3/2009 Tanida et al.
2009/0066693 A1 3/2009 Carson
2009/0079862 A1 3/2009 Subbotin
2009/0086074 A1 4/2009 Li et al.
2009/0091645 A1 4/2009 Trimeche et al.
2009/0091806 A1 4/2009 Inuiya
2009/0092363 A1 4/2009 Daum et al.
2009/0096050 A1 4/2009 Park
2009/0102956 A1 4/2009 Georgiev
2009/0103792 A1 4/2009 Rahn et al.
2009/0109306 A1 4/2009 Shan et al.
2009/0127430 A1 5/2009 Hirasawa et al.
2009/0128644 A1 5/2009 Camp, Jr. et al.

(56) References Cited

U.S. PATENT DOCUMENTS

2009/0128833 A1 5/2009 Yahav
2009/0129667 A1 5/2009 Ho et al.
2009/0140131 A1 6/2009 Utagawa
2009/0141933 A1 6/2009 Wagg
2009/0147919 A1 6/2009 Goto et al.
2009/0152664 A1 6/2009 Klem et al.
2009/0160979 A1 6/2009 Xu et al.
2009/0167922 A1 7/2009 Perlman et al.
2009/0167923 A1 7/2009 Safaee-Rad et al.
2009/0167934 A1 7/2009 Gupta
2009/0175349 A1 7/2009 Ye et al.
2009/0179142 A1 7/2009 Duparre et al.
2009/0180021 A1 7/2009 Kikuchi et al.
2009/0200622 A1 8/2009 Tai et al.
2009/0201371 A1 8/2009 Matsuda et al.
2009/0207235 A1 8/2009 Francini et al.
2009/0219435 A1 9/2009 Yuan
2009/0225203 A1 9/2009 Tanida et al.
2009/0237520 A1 9/2009 Kaneko et al.
2009/0245573 A1 10/2009 Saptharishi et al.
2009/0252323 A1 10/2009 Cooper
2009/0256947 A1 10/2009 Ciurea et al.
2009/0263017 A1 10/2009 Tanbakuchi
2009/0268192 A1 10/2009 Koenck et al.
2009/0268970 A1 10/2009 Babacan et al.
2009/0268983 A1 10/2009 Stone et al.
2009/0273663 A1 11/2009 Yoshida
2009/0274387 A1 11/2009 Jin
2009/0279800 A1 11/2009 Uetani et al.
2009/0284651 A1 11/2009 Srinivasan
2009/0290811 A1 11/2009 Imai
2009/0297056 A1 12/2009 Lelescu et al.
2009/0302205 A9 12/2009 Olsen et al.
2009/0315982 A1 12/2009 Schmidt et al.
2009/0317061 A1 12/2009 Jung et al.
2009/0322876 A1 12/2009 Lee et al.
2009/0323195 A1 12/2009 Hembree et al.
2009/0323206 A1 12/2009 Oliver et al.
2009/0324118 A1 12/2009 Maslov et al.
2010/0002126 A1 1/2010 Wenstrand et al.
2010/0002313 A1 1/2010 Duparre et al.
2010/0002314 A1 1/2010 Duparre
2010/0007714 A1 1/2010 Kim et al.
2010/0013927 A1 1/2010 Nixon
2010/0014781 A1 1/2010 Liu et al.
2010/0020074 A1 1/2010 Taborowski et al.
2010/0044815 A1 2/2010 Chang
2010/0045809 A1 2/2010 Packard
2010/0053342 A1 3/2010 Hwang et al.
2010/0053347 A1 3/2010 Agarwala et al.
2010/0053415 A1 3/2010 Yun
2010/0053600 A1 3/2010 Tanida et al.
2010/0060746 A9 3/2010 Olsen et al.
2010/0073463 A1 3/2010 Momonoi et al.
2010/0074532 A1 3/2010 Gordon et al.
2010/0085351 A1 4/2010 Deb et al.
2010/0085425 A1 4/2010 Tan
2010/0086227 A1 4/2010 Sun et al.
2010/0091389 A1 4/2010 Henriksen et al.
2010/0097491 A1 4/2010 Farina et al.
2010/0103175 A1 4/2010 Okutomi et al.
2010/0103259 A1 4/2010 Tanida et al.
2010/0103308 A1 4/2010 Butterfield et al.
2010/0111444 A1 5/2010 Coffman
2010/0118127 A1 5/2010 Nam et al.
2010/0128145 A1 5/2010 Pitts et al.
2010/0129048 A1 5/2010 Pitts et al.
2010/0133230 A1 6/2010 Henriksen et al.
2010/0133418 A1 6/2010 Sargent et al.
2010/0134667 A1 6/2010 Suzuki et al.
2010/0141802 A1 6/2010 Knight et al.
2010/0142828 A1 6/2010 Chang et al.
2010/0142839 A1 6/2010 Lakus-Becker
2010/0157073 A1 6/2010 Kondo et al.
2010/0165152 A1 7/2010 Lim
2010/0166410 A1 7/2010 Chang
2010/0171866 A1 7/2010 Brady et al.
2010/0177411 A1 7/2010 Hegde et al.
2010/0182406 A1 7/2010 Benitez
2010/0194860 A1 8/2010 Mentz et al.
2010/0194901 A1 8/2010 Van Hoorebeke et al.
2010/0195716 A1 8/2010 Klein Gunnewiek et al.
2010/0201809 A1 8/2010 Oyama et al.
2010/0201834 A1 8/2010 Maruyama et al.
2010/0202054 A1 8/2010 Niederer
2010/0202683 A1 8/2010 Robinson
2010/0208100 A9 8/2010 Olsen et al.
2010/0214423 A1 8/2010 Ogawa
2010/0220212 A1 9/2010 Perlman et al.
2010/0223237 A1 9/2010 Mishra et al.
2010/0225740 A1 9/2010 Jung et al.
2010/0231285 A1 9/2010 Boomer et al.
2010/0238327 A1 9/2010 Griffith et al.
2010/0244165 A1 9/2010 Lake et al.
2010/0245684 A1 9/2010 Xiao et al.
2010/0254627 A1 10/2010 Panahpour Tehrani et al.
2010/0259610 A1 10/2010 Petersen
2010/0265346 A1 10/2010 Iizuka
2010/0265381 A1 10/2010 Yamamoto et al.
2010/0265385 A1 10/2010 Knight et al.
2010/0277629 A1 11/2010 Tanaka
2010/0281070 A1 11/2010 Chan et al.
2010/0289941 A1 11/2010 Ito et al.
2010/0290483 A1 11/2010 Park et al.
2010/0302423 A1 12/2010 Adams, Jr. et al.
2010/0309292 A1 12/2010 Ho et al.
2010/0309368 A1 12/2010 Choi et al.
2010/0321595 A1 12/2010 Chiu
2010/0321640 A1 12/2010 Yeh et al.
2010/0328456 A1 12/2010 Alakarhu
2010/0329556 A1 12/2010 Mitarai et al.
2010/0329582 A1 12/2010 Albu et al.
2011/0001037 A1 1/2011 Tewinkle
2011/0018973 A1 1/2011 Takayama
2011/0019048 A1 1/2011 Raynor et al.
2011/0019243 A1 1/2011 Constant, Jr. et al.
2011/0031381 A1 2/2011 Tay et al.
2011/0032341 A1 2/2011 Ignatov et al.
2011/0032370 A1 2/2011 Ludwig
2011/0033129 A1 2/2011 Robinson
2011/0038536 A1 2/2011 Gong
2011/0043604 A1 2/2011 Peleg et al.
2011/0043613 A1 2/2011 Rohaly et al.
2011/0043661 A1 2/2011 Podoleanu
2011/0043665 A1 2/2011 Ogasahara
2011/0043668 A1 2/2011 McKinnon et al.
2011/0044502 A1 2/2011 Liu et al.
2011/0051255 A1 3/2011 Lee et al.
2011/0055729 A1 3/2011 Mason et al.
2011/0064327 A1 3/2011 Dagher et al.
2011/0069189 A1 3/2011 Venkataraman et al.
2011/0080487 A1 4/2011 Venkataraman et al.
2011/0085028 A1 4/2011 Samadani et al.
2011/0090217 A1 4/2011 Mashitani et al.
2011/0108708 A1 5/2011 Olsen et al.
2011/0115886 A1 5/2011 Nguyen et al.
2011/0121421 A1 5/2011 Charbon et al.
2011/0122308 A1 5/2011 Duparre
2011/0128393 A1 6/2011 Tavi et al.
2011/0128412 A1 6/2011 Milnes et al.
2011/0129165 A1 6/2011 Lim et al.
2011/0141309 A1 6/2011 Nagashima et al.
2011/0142138 A1 6/2011 Tian et al.
2011/0149408 A1 6/2011 Hahgholt et al.
2011/0149409 A1 6/2011 Haugholt et al.
2011/0150321 A1 6/2011 Cheong et al.
2011/0153248 A1 6/2011 Gu et al.
2011/0157321 A1 6/2011 Nakajima et al.
2011/0157451 A1 6/2011 Chang
2011/0169818 A1 7/2011 Pan et al.
2011/0169921 A1 7/2011 Lee et al.
2011/0169994 A1 7/2011 DiFrancesco et al.
2011/0176020 A1 7/2011 Chang
2011/0181797 A1 7/2011 Galstian et al.

(56) References Cited

U.S. PATENT DOCUMENTS

2011/0193944 A1 8/2011 Lian et al.
2011/0199458 A1 8/2011 Hayasaka et al.
2011/0200319 A1 8/2011 Kravitz et al.
2011/0206291 A1 8/2011 Kashani et al.
2011/0207074 A1 8/2011 Hall-Holt et al.
2011/0211068 A1 9/2011 Yokota
2011/0211077 A1 9/2011 Nayar et al.
2011/0211824 A1 9/2011 Georgiev et al.
2011/0221599 A1 9/2011 Högasten
2011/0221658 A1 9/2011 Haddick et al.
2011/0221939 A1 9/2011 Jerdev
2011/0221950 A1 9/2011 Oostra et al.
2011/0222757 A1 9/2011 Yeatman, Jr. et al.
2011/0228142 A1 9/2011 Brueckner et al.
2011/0228144 A1 9/2011 Tian et al.
2011/0234825 A1 9/2011 Liu et al.
2011/0234841 A1 9/2011 Akeley et al.
2011/0241234 A1 10/2011 Duparre
2011/0242342 A1 10/2011 Goma et al.
2011/0242355 A1 10/2011 Goma et al.
2011/0242356 A1 10/2011 Aleksic et al.
2011/0243428 A1 10/2011 Das Gupta et al.
2011/0255592 A1 10/2011 Sung et al.
2011/0255745 A1 10/2011 Hodder et al.
2011/0261993 A1 10/2011 Weiming et al.
2011/0267264 A1 11/2011 Mccarthy et al.
2011/0267348 A1 11/2011 Lin et al.
2011/0267531 A1 11/2011 Imai
2011/0273531 A1 11/2011 Ito et al.
2011/0274175 A1 11/2011 Sumitomo
2011/0274366 A1 11/2011 Tardif
2011/0279705 A1 11/2011 Kuang et al.
2011/0279721 A1 11/2011 McMahon
2011/0285701 A1 11/2011 Chen et al.
2011/0285866 A1 11/2011 Bhrugumalla et al.
2011/0285910 A1 11/2011 Bamji et al.
2011/0292216 A1 12/2011 Fergus et al.
2011/0298898 A1 12/2011 Jung et al.
2011/0298917 A1 12/2011 Yanagita
2011/0300929 A1 12/2011 Tardif et al.
2011/0310980 A1 12/2011 Mathew
2011/0316968 A1 12/2011 Taguchi et al.
2011/0317766 A1 12/2011 Lim et al.
2012/0012748 A1 1/2012 Pain et al.
2012/0013748 A1 1/2012 Stanwood et al.
2012/0014456 A1 1/2012 Martinez Bauza et al.
2012/0019530 A1 1/2012 Baker
2012/0019700 A1 1/2012 Gaber
2012/0023456 A1 1/2012 Sun et al.
2012/0026297 A1 2/2012 Sato
2012/0026342 A1 2/2012 Yu et al.
2012/0026366 A1 2/2012 Golan et al.
2012/0026451 A1 2/2012 Nystrom
2012/0026478 A1 2/2012 Chen et al.
2012/0038745 A1 2/2012 Yu et al.
2012/0039525 A1 2/2012 Tian et al.
2012/0044249 A1 2/2012 Mashitani et al.
2012/0044372 A1 2/2012 Côté et al.
2012/0051624 A1 3/2012 Ando
2012/0056982 A1 3/2012 Katz et al.
2012/0057040 A1 3/2012 Park et al.
2012/0062548 A1 3/2012 Pan et al.
2012/0062697 A1 3/2012 Treado et al.
2012/0062702 A1 3/2012 Jiang et al.
2012/0062756 A1 3/2012 Tian et al.
2012/0069235 A1 3/2012 Imai
2012/0081519 A1 4/2012 Goma et al.
2012/0086803 A1 4/2012 Malzbender et al.
2012/0105590 A1 5/2012 Fukumoto et al.
2012/0105654 A1 5/2012 Kwatra et al.
2012/0105691 A1 5/2012 Waqas et al.
2012/0113232 A1 5/2012 Joblove
2012/0113318 A1 5/2012 Galstian et al.
2012/0113413 A1 5/2012 Miahczylowicz-Wolski et al.
2012/0114224 A1 5/2012 Xu et al.
2012/0120264 A1 5/2012 Lee et al.
2012/0127155 A1 5/2012 Deshpande
2012/0127275 A1 5/2012 Von Zitzewitz et al.
2012/0147139 A1 6/2012 Li et al.
2012/0147205 A1 6/2012 Lelescu et al.
2012/0153153 A1 6/2012 Chang et al.
2012/0154530 A1 6/2012 Yamada
2012/0154551 A1 6/2012 Inoue
2012/0155830 A1 6/2012 Sasaki et al.
2012/0162193 A1 6/2012 Bae et al.
2012/0163672 A1 6/2012 McKinnon
2012/0163725 A1 6/2012 Fukuhara
2012/0169433 A1 7/2012 Mullins et al.
2012/0170134 A1 7/2012 Bolis et al.
2012/0176479 A1 7/2012 Mayhew et al.
2012/0176481 A1 7/2012 Lukk et al.
2012/0188235 A1 7/2012 Wu et al.
2012/0188341 A1 7/2012 Klein Gunnewiek et al.
2012/0188389 A1 7/2012 Lin et al.
2012/0188420 A1 7/2012 Black et al.
2012/0188634 A1 7/2012 Kubala et al.
2012/0198677 A1 8/2012 Duparre
2012/0200669 A1 8/2012 Lai et al.
2012/0200726 A1 8/2012 Bugnariu
2012/0200734 A1 8/2012 Tang
2012/0206582 A1 8/2012 DiCarlo et al.
2012/0219236 A1 8/2012 Ali et al.
2012/0224083 A1 9/2012 Jovanovski et al.
2012/0229602 A1 9/2012 Chen et al.
2012/0229628 A1 9/2012 Ishiyama et al.
2012/0237114 A1 9/2012 Park et al.
2012/0249550 A1 10/2012 Akeley et al.
2012/0249750 A1 10/2012 Izzat et al.
2012/0249836 A1 10/2012 Ali et al.
2012/0249853 A1 10/2012 Krolczyk et al.
2012/0250990 A1 10/2012 Bocirnea
2012/0262601 A1 10/2012 Choi et al.
2012/0262607 A1 10/2012 Shimura et al.
2012/0268574 A1 10/2012 Gidon et al.
2012/0274626 A1 11/2012 Hsieh
2012/0287291 A1 11/2012 McMahon
2012/0290257 A1 11/2012 Hodge et al.
2012/0293489 A1 11/2012 Chen et al.
2012/0293624 A1 11/2012 Chen et al.
2012/0293695 A1 11/2012 Tanaka
2012/0294510 A1 11/2012 Zhang et al.
2012/0307023 A1 12/2012 Freiburg et al.
2012/0307093 A1 12/2012 Miyoshi
2012/0307099 A1 12/2012 Yahata
2012/0314033 A1 12/2012 Lee et al.
2012/0314937 A1 12/2012 Kim et al.
2012/0327222 A1 12/2012 Ng et al.
2013/0002828 A1 1/2013 Ding et al.
2013/0003184 A1 1/2013 Duparre
2013/0010073 A1 1/2013 Do et al.
2013/0016245 A1 1/2013 Yuba
2013/0016885 A1 1/2013 Tsujimoto
2013/0022111 A1 1/2013 Chen et al.
2013/0027580 A1 1/2013 Olsen et al.
2013/0033579 A1 2/2013 Wajs
2013/0033585 A1 2/2013 Li et al.
2013/0038696 A1 2/2013 Ding et al.
2013/0047396 A1 2/2013 Au et al.
2013/0050504 A1 2/2013 Safaee-Rad et al.
2013/0050526 A1 2/2013 Keelan
2013/0057710 A1 3/2013 McMahon
2013/0070060 A1 3/2013 Chatterjee et al.
2013/0076967 A1 3/2013 Brunner et al.
2013/0077859 A1 3/2013 Stauder et al.
2013/0077880 A1 3/2013 Venkataraman et al.
2013/0077882 A1 3/2013 Venkataraman et al.
2013/0083172 A1 4/2013 Baba
2013/0088489 A1 4/2013 Schmeitz et al.
2013/0088637 A1 4/2013 Duparre
2013/0093842 A1 4/2013 Yahata
2013/0100254 A1 4/2013 Morioka et al.
2013/0100256 A1 4/2013 Kirk et al.
2013/0107061 A1 5/2013 Kumar et al.
2013/0113888 A1 5/2013 Koguchi

(56) References Cited

U.S. PATENT DOCUMENTS

| | | | |
|---|---|---|---|
| 2013/0113899 | A1 | 5/2013 | Morohoshi et al. |
| 2013/0113939 | A1 | 5/2013 | Strandemar |
| 2013/0120536 | A1 | 5/2013 | Song et al. |
| 2013/0120605 | A1 | 5/2013 | Georgiev et al. |
| 2013/0121559 | A1 | 5/2013 | Hu et al. |
| 2013/0127988 | A1 | 5/2013 | Wang et al. |
| 2013/0128068 | A1 | 5/2013 | Georgiev et al. |
| 2013/0128069 | A1 | 5/2013 | Georgiev et al. |
| 2013/0128087 | A1 | 5/2013 | Georgiev et al. |
| 2013/0128121 | A1 | 5/2013 | Agarwala et al. |
| 2013/0135315 | A1 | 5/2013 | Bares et al. |
| 2013/0135448 | A1 | 5/2013 | Nagumo et al. |
| 2013/0147979 | A1 | 6/2013 | McMahon et al. |
| 2013/0155050 | A1 | 6/2013 | Rastogi et al. |
| 2013/0162641 | A1 | 6/2013 | Zhang et al. |
| 2013/0169754 | A1 | 7/2013 | Aronsson et al. |
| 2013/0176394 | A1 | 7/2013 | Tian et al. |
| 2013/0208138 | A1 | 8/2013 | Li et al. |
| 2013/0215108 | A1 | 8/2013 | McMahon et al. |
| 2013/0215231 | A1 | 8/2013 | Hiramoto et al. |
| 2013/0222556 | A1 | 8/2013 | Shimada |
| 2013/0222656 | A1 | 8/2013 | Kaneko |
| 2013/0223759 | A1 | 8/2013 | Nishiyama |
| 2013/0229540 | A1 | 9/2013 | Farina et al. |
| 2013/0230237 | A1 | 9/2013 | Schlosser et al. |
| 2013/0250123 | A1 | 9/2013 | Zhang et al. |
| 2013/0250150 | A1 | 9/2013 | Malone et al. |
| 2013/0258067 | A1 | 10/2013 | Zhang et al. |
| 2013/0259317 | A1 | 10/2013 | Gaddy |
| 2013/0265459 | A1 | 10/2013 | Duparre et al. |
| 2013/0274596 | A1 | 10/2013 | Azizian et al. |
| 2013/0274923 | A1 | 10/2013 | By |
| 2013/0286236 | A1 | 10/2013 | Mankowski |
| 2013/0293760 | A1 | 11/2013 | Nisenzon et al. |
| 2013/0308197 | A1 | 11/2013 | Duparre |
| 2013/0321581 | A1 | 12/2013 | El-ghoroury et al. |
| 2013/0321589 | A1 | 12/2013 | Kirk et al. |
| 2013/0329015 | A1 | 12/2013 | Pulli et al. |
| 2013/0335598 | A1 | 12/2013 | Gustavsson et al. |
| 2013/0342641 | A1 | 12/2013 | Morioka et al. |
| 2014/0002610 | A1 | 1/2014 | Xi et al. |
| 2014/0002674 | A1 | 1/2014 | Duparre et al. |
| 2014/0002675 | A1 | 1/2014 | Duparre et al. |
| 2014/0009586 | A1 | 1/2014 | McNamer et al. |
| 2014/0013273 | A1 | 1/2014 | Ng |
| 2014/0014818 | A1 | 1/2014 | Cho et al. |
| 2014/0037137 | A1 | 2/2014 | Broaddus et al. |
| 2014/0037140 | A1 | 2/2014 | Benhimane et al. |
| 2014/0043507 | A1 | 2/2014 | Wang et al. |
| 2014/0059462 | A1 | 2/2014 | Wernersson |
| 2014/0076336 | A1 | 3/2014 | Clayton et al. |
| 2014/0078333 | A1 | 3/2014 | Miao |
| 2014/0079336 | A1 | 3/2014 | Venkataraman et al. |
| 2014/0081454 | A1 | 3/2014 | Nuyujukian et al. |
| 2014/0085502 | A1 | 3/2014 | Lin et al. |
| 2014/0092281 | A1 | 4/2014 | Nisenzon et al. |
| 2014/0098266 | A1 | 4/2014 | Nayar et al. |
| 2014/0098267 | A1 | 4/2014 | Tian et al. |
| 2014/0104490 | A1 | 4/2014 | Hsieh et al. |
| 2014/0118493 | A1 | 5/2014 | Sali et al. |
| 2014/0118584 | A1 | 5/2014 | Lee et al. |
| 2014/0125771 | A1 | 5/2014 | Grossmann et al. |
| 2014/0132734 | A1 | 5/2014 | Zhuang et al. |
| 2014/0132810 | A1 | 5/2014 | McMahon |
| 2014/0139642 | A1 | 5/2014 | Ni et al. |
| 2014/0139643 | A1 | 5/2014 | Hogasten et al. |
| 2014/0140626 | A1 | 5/2014 | Cho et al. |
| 2014/0146132 | A1 | 5/2014 | Bagnato et al. |
| 2014/0146139 | A1 | 5/2014 | Schwartz et al. |
| 2014/0146201 | A1 | 5/2014 | Knight et al. |
| 2014/0168424 | A1 | 6/2014 | Attar et al. |
| 2014/0176592 | A1 | 6/2014 | Wilburn et al. |
| 2014/0183334 | A1 | 7/2014 | Wang et al. |
| 2014/0186045 | A1 | 7/2014 | Poddar et al. |
| 2014/0192154 | A1 | 7/2014 | Jeong et al. |
| 2014/0192253 | A1 | 7/2014 | Laroia |
| 2014/0198188 | A1 | 7/2014 | Izawa |
| 2014/0204183 | A1 | 7/2014 | Lee et al. |
| 2014/0218546 | A1 | 8/2014 | McMahon |
| 2014/0219549 | A1 | 8/2014 | Choi et al. |
| 2014/0232822 | A1 | 8/2014 | Venkataraman et al. |
| 2014/0240528 | A1 | 8/2014 | Venkataraman et al. |
| 2014/0240529 | A1 | 8/2014 | Venkataraman et al. |
| 2014/0253738 | A1 | 9/2014 | Mullis |
| 2014/0253781 | A1 | 9/2014 | Gill et al. |
| 2014/0267243 | A1 | 9/2014 | Venkataraman et al. |
| 2014/0267286 | A1 | 9/2014 | Duparre |
| 2014/0267633 | A1 | 9/2014 | Venkataraman et al. |
| 2014/0267762 | A1 | 9/2014 | Mullis et al. |
| 2014/0267829 | A1 | 9/2014 | McMahon et al. |
| 2014/0267890 | A1 | 9/2014 | Lelescu et al. |
| 2014/0285675 | A1 | 9/2014 | Mullis |
| 2014/0300706 | A1 | 10/2014 | Song |
| 2014/0313315 | A1 | 10/2014 | Shoham et al. |
| 2014/0321712 | A1 | 10/2014 | Ciurea et al. |
| 2014/0333731 | A1 | 11/2014 | Venkataraman et al. |
| 2014/0333764 | A1 | 11/2014 | Venkataraman et al. |
| 2014/0333787 | A1 | 11/2014 | Venkataraman et al. |
| 2014/0340539 | A1 | 11/2014 | Venkataraman et al. |
| 2014/0347509 | A1 | 11/2014 | Venkataraman et al. |
| 2014/0347748 | A1 | 11/2014 | Duparre |
| 2014/0354773 | A1 | 12/2014 | Venkataraman et al. |
| 2014/0354843 | A1 | 12/2014 | Venkataraman et al. |
| 2014/0354844 | A1 | 12/2014 | Venkataraman et al. |
| 2014/0354853 | A1 | 12/2014 | Venkataraman et al. |
| 2014/0354854 | A1 | 12/2014 | Venkataraman et al. |
| 2014/0354855 | A1 | 12/2014 | Venkataraman et al. |
| 2014/0355870 | A1 | 12/2014 | Venkataraman et al. |
| 2014/0368662 | A1 | 12/2014 | Venkataraman et al. |
| 2014/0368683 | A1 | 12/2014 | Venkataraman et al. |
| 2014/0368684 | A1 | 12/2014 | Venkataraman et al. |
| 2014/0368685 | A1 | 12/2014 | Venkataraman et al. |
| 2014/0368686 | A1 | 12/2014 | Duparre |
| 2014/0369612 | A1 | 12/2014 | Venkataraman et al. |
| 2014/0369615 | A1 | 12/2014 | Venkataraman et al. |
| 2014/0376825 | A1 | 12/2014 | Venkataraman et al. |
| 2014/0376826 | A1 | 12/2014 | Venkataraman et al. |
| 2015/0002734 | A1 | 1/2015 | Lee |
| 2015/0003752 | A1 | 1/2015 | Venkataraman et al. |
| 2015/0003753 | A1 | 1/2015 | Venkataraman et al. |
| 2015/0009353 | A1 | 1/2015 | Venkataraman et al. |
| 2015/0009354 | A1 | 1/2015 | Venkataraman et al. |
| 2015/0009362 | A1 | 1/2015 | Venkataraman et al. |
| 2015/0015669 | A1 | 1/2015 | Venkataraman et al. |
| 2015/0035992 | A1 | 2/2015 | Mullis |
| 2015/0036014 | A1 | 2/2015 | Lelescu et al. |
| 2015/0036015 | A1 | 2/2015 | Lelescu et al. |
| 2015/0042766 | A1 | 2/2015 | Ciurea et al. |
| 2015/0042767 | A1 | 2/2015 | Ciurea et al. |
| 2015/0042833 | A1 | 2/2015 | Lelescu et al. |
| 2015/0049915 | A1 | 2/2015 | Ciurea et al. |
| 2015/0049916 | A1 | 2/2015 | Ciurea et al. |
| 2015/0049917 | A1 | 2/2015 | Ciurea et al. |
| 2015/0055884 | A1 | 2/2015 | Venkataraman et al. |
| 2015/0085073 | A1 | 3/2015 | Bruls et al. |
| 2015/0085174 | A1 | 3/2015 | Shabtay et al. |
| 2015/0091900 | A1 | 4/2015 | Yang et al. |
| 2015/0098079 | A1 | 4/2015 | Montgomery et al. |
| 2015/0104076 | A1 | 4/2015 | Hayasaka |
| 2015/0104101 | A1 | 4/2015 | Bryant et al. |
| 2015/0122411 | A1 | 5/2015 | Rodda et al. |
| 2015/0124059 | A1 | 5/2015 | Georgiev et al. |
| 2015/0124113 | A1 | 5/2015 | Rodda et al. |
| 2015/0124151 | A1 | 5/2015 | Rodda et al. |
| 2015/0138346 | A1 | 5/2015 | Venkataraman et al. |
| 2015/0146029 | A1 | 5/2015 | Venkataraman et al. |
| 2015/0146030 | A1 | 5/2015 | Venkataraman et al. |
| 2015/0161798 | A1 | 6/2015 | Venkataraman et al. |
| 2015/0199793 | A1 | 7/2015 | Venkataraman et al. |
| 2015/0199841 | A1 | 7/2015 | Venkataraman et al. |
| 2015/0229911 | A1 | 8/2015 | Ge et al. |
| 2015/0235476 | A1 | 8/2015 | McMahon et al. |
| 2015/0237329 | A1 | 8/2015 | Venkataraman et al. |
| 2015/0243480 | A1 | 8/2015 | Yamada |

(56) References Cited

U.S. PATENT DOCUMENTS

| | | | |
|---|---|---|---|
| 2015/0244927 A1 | 8/2015 | Laroia et al. | |
| 2015/0245013 A1 | 8/2015 | Venkataraman et al. | |
| 2015/0248744 A1 | 9/2015 | Hayasaka et al. | |
| 2015/0254868 A1 | 9/2015 | Srikanth et al. | |
| 2015/0264337 A1 | 9/2015 | Venkataraman et al. | |
| 2015/0296137 A1 | 10/2015 | Duparre et al. | |
| 2015/0312455 A1 | 10/2015 | Venkataraman et al. | |
| 2015/0326852 A1 | 11/2015 | Duparre et al. | |
| 2015/0332468 A1 | 11/2015 | Hayasaka et al. | |
| 2015/0373261 A1 | 12/2015 | Rodda et al. | |
| 2015/0381972 A1 | 12/2015 | Kowdle et al. | |
| 2016/0037097 A1 | 2/2016 | Duparre | |
| 2016/0044252 A1 | 2/2016 | Molina | |
| 2016/0044257 A1 | 2/2016 | Venkataraman et al. | |
| 2016/0057332 A1 | 2/2016 | Ciurea et al. | |
| 2016/0065934 A1 | 3/2016 | Kaza et al. | |
| 2016/0163051 A1 | 6/2016 | Mullis | |
| 2016/0165106 A1 | 6/2016 | Duparre | |
| 2016/0165134 A1 | 6/2016 | Lelescu et al. | |
| 2016/0165147 A1 | 6/2016 | Nisenzon et al. | |
| 2016/0165212 A1 | 6/2016 | Mullis | |
| 2016/0191768 A1 | 6/2016 | Shin et al. | |
| 2016/0195733 A1 | 7/2016 | Lelescu et al. | |
| 2016/0198096 A1 | 7/2016 | McMahon et al. | |
| 2016/0227195 A1 | 8/2016 | Venkataraman et al. | |
| 2016/0249001 A1 | 8/2016 | McMahon | |
| 2016/0255333 A1 | 9/2016 | Nisenzon et al. | |
| 2016/0266284 A1 | 9/2016 | Duparre et al. | |
| 2016/0267665 A1 | 9/2016 | Venkataraman et al. | |
| 2016/0267672 A1 | 9/2016 | Ciurea et al. | |
| 2016/0269626 A1 | 9/2016 | McMahon | |
| 2016/0269627 A1 | 9/2016 | McMahon | |
| 2016/0269650 A1 | 9/2016 | Venkataraman et al. | |
| 2016/0269651 A1 | 9/2016 | Venkataraman et al. | |
| 2016/0269664 A1 | 9/2016 | Duparre | |
| 2016/0316140 A1 | 10/2016 | Nayar et al. | |
| 2017/0006233 A1 | 1/2017 | Venkataraman et al. | |
| 2017/0048468 A1 | 2/2017 | Pain et al. | |
| 2017/0053382 A1 | 2/2017 | Lelescu et al. | |
| 2017/0054901 A1 | 2/2017 | Venkataraman et al. | |
| 2017/0070672 A1 | 3/2017 | Rodda et al. | |
| 2017/0070673 A1 | 3/2017 | Lelescu et al. | |
| 2017/0070751 A1* | 3/2017 | Shimizu | H04N 19/11 |
| 2017/0078568 A1 | 3/2017 | Venkataraman et al. | |
| 2017/0085845 A1 | 3/2017 | Venkataraman et al. | |
| 2017/0094243 A1 | 3/2017 | Venkataraman et al. | |
| 2017/0099465 A1 | 4/2017 | Mullis et al. | |
| 2017/0163862 A1 | 6/2017 | Molina | |
| 2017/0178363 A1 | 6/2017 | Venkataraman et al. | |
| 2017/0187933 A1 | 6/2017 | Duparre | |
| 2017/0188011 A1 | 6/2017 | Panescu et al. | |
| 2017/0244960 A1 | 8/2017 | Ciurea et al. | |
| 2017/0257562 A1 | 9/2017 | Venkataraman et al. | |
| 2017/0365104 A1 | 12/2017 | McMahon et al. | |
| 2018/0007284 A1 | 1/2018 | Venkataraman et al. | |
| 2018/0013945 A1 | 1/2018 | Ciurea et al. | |
| 2018/0024330 A1 | 1/2018 | Laroia | |
| 2018/0035057 A1 | 2/2018 | McMahon et al. | |
| 2018/0040135 A1 | 2/2018 | Mullis | |
| 2018/0048830 A1 | 2/2018 | Venkataraman et al. | |
| 2018/0048879 A1 | 2/2018 | Venkataraman et al. | |
| 2018/0081090 A1 | 3/2018 | Duparre et al. | |
| 2018/0097993 A1 | 4/2018 | Nayar et al. | |
| 2018/0109782 A1 | 4/2018 | Duparre et al. | |
| 2018/0124311 A1 | 5/2018 | Lelescu et al. | |
| 2018/0139382 A1 | 5/2018 | Venkataraman et al. | |
| 2018/0184066 A1 | 6/2018 | Salahieh et al. | |
| 2018/0197035 A1 | 7/2018 | Venkataraman et al. | |
| 2018/0211402 A1 | 7/2018 | Ciurea et al. | |
| 2018/0227511 A1 | 8/2018 | McMahon | |
| 2018/0240265 A1 | 8/2018 | Yang et al. | |
| 2018/0270473 A1 | 9/2018 | Mullis | |
| 2018/0302554 A1 | 10/2018 | Lelescu et al. | |
| 2018/0330182 A1 | 11/2018 | Venkataraman et al. | |
| 2019/0037116 A1 | 1/2019 | Molina | |
| 2019/0037150 A1 | 1/2019 | Srikanth et al. | |
| 2019/0043253 A1 | 2/2019 | Lucas et al. | |
| 2019/0063905 A1 | 2/2019 | Venkataraman et al. | |
| 2019/0089947 A1 | 3/2019 | Venkataraman et al. | |
| 2019/0098209 A1 | 3/2019 | Venkataraman et al. | |
| 2019/0109998 A1 | 4/2019 | Venkataraman et al. | |
| 2019/0215496 A1 | 7/2019 | Mullis et al. | |
| 2019/0230348 A1 | 7/2019 | Ciurea et al. | |
| 2019/0235138 A1 | 8/2019 | Duparre et al. | |
| 2019/0268586 A1 | 8/2019 | Mullis | |
| 2019/0289176 A1 | 9/2019 | Duparre | |
| 2019/0333237 A1 | 10/2019 | Javidnia et al. | |
| 2019/0347768 A1 | 11/2019 | Lelescu et al. | |
| 2019/0356863 A1 | 11/2019 | Venkataraman et al. | |
| 2019/0362515 A1 | 11/2019 | Ciurea et al. | |
| 2019/0364263 A1 | 11/2019 | Jannard et al. | |
| 2020/0026948 A1 | 1/2020 | Venkataraman et al. | |
| 2020/0249428 A1 | 8/2020 | Sugiyama | |
| 2020/0252597 A1 | 8/2020 | Mullis | |
| 2020/0389604 A1 | 12/2020 | Venkataraman et al. | |
| 2021/0063141 A1 | 3/2021 | Venkataraman et al. | |
| 2021/0133927 A1 | 5/2021 | Lelescu et al. | |
| 2021/0150748 A1 | 5/2021 | Ciurea et al. | |
| 2021/0281816 A1 | 9/2021 | Mullis | |
| 2021/0281828 A1 | 9/2021 | Ciurea et al. | |
| 2021/0312207 A1 | 10/2021 | Venkataraman et al. | |
| 2022/0239890 A1 | 7/2022 | Mullis | |
| 2022/0385848 A1 | 12/2022 | Venkataraman et al. | |
| 2022/0414829 A1 | 12/2022 | Lelescu et al. | |
| 2023/0152087 A1 | 5/2023 | Venkataraman et al. | |
| 2023/0336707 A1 | 10/2023 | Ciurea et al. | |
| 2023/0362344 A1 | 11/2023 | Mullis | |
| 2023/0421742 A1 | 12/2023 | Venkataraman et al. | |
| 2024/0031690 A1 | 1/2024 | Venkataraman et al. | |
| 2024/0040270 A1 | 2/2024 | Venkataraman et al. | |
| 2024/0169483 A1 | 5/2024 | Lelescu et al. | |
| 2024/0331181 A1 | 10/2024 | Ciurea et al. | |
| 2024/0333901 A1* | 10/2024 | Venkataraman | G06T 3/4007 |
| 2024/0348941 A1 | 10/2024 | Venkataraman et al. | |
| 2025/0156996 A1 | 5/2025 | Lelescu et al. | |
| 2025/0252589 A1 | 8/2025 | Ciurea et al. | |

FOREIGN PATENT DOCUMENTS

| | | | |
|---|---|---|---|
| CN | 1839394 | A | 9/2006 |
| CN | 1985524 | A | 6/2007 |
| CN | 101010619 | A | 8/2007 |
| CN | 101046882 | A | 10/2007 |
| CN | 101064780 | A | 10/2007 |
| CN | 101102388 | A | 1/2008 |
| CN | 101147392 | A | 3/2008 |
| CN | 201043890 | Y | 4/2008 |
| CN | 101212566 | A | 7/2008 |
| CN | 101312540 | A | 11/2008 |
| CN | 101427372 | A | 5/2009 |
| CN | 101593350 | A | 12/2009 |
| CN | 101606086 | A | 12/2009 |
| CN | 101883291 | A | 11/2010 |
| CN | 102037717 | A | 4/2011 |
| CN | 102184720 | A | 9/2011 |
| CN | 102375199 | A | 3/2012 |
| CN | 103004180 | A | 3/2013 |
| CN | 104081414 | A | 10/2014 |
| CN | 104508681 | A | 4/2015 |
| CN | 104662589 | A | 5/2015 |
| CN | 104685513 | A | 6/2015 |
| CN | 104685860 | A | 6/2015 |
| CN | 104081414 | B | 8/2017 |
| CN | 104662589 | B | 8/2017 |
| CN | 107077743 | A | 8/2017 |
| CN | 107230236 | A | 10/2017 |
| CN | 107346061 | A | 11/2017 |
| CN | 104685513 | B | 4/2018 |
| CN | 104335246 | B | 9/2018 |
| CN | 107346061 | B | 4/2020 |
| CN | 107230236 | B | 12/2020 |
| CN | 107077743 | B | 3/2021 |
| CN | 113256730 | A | 8/2021 |
| DE | 602011041799.1 | | 9/2017 |

(56) References Cited

FOREIGN PATENT DOCUMENTS

| | | | |
|---|---|---|---|
| EP | 0677821 | A2 | 10/1995 |
| EP | 0840502 | A2 | 5/1998 |
| EP | 1201407 | A2 | 5/2002 |
| EP | 1355274 | A2 | 10/2003 |
| EP | 1418766 | A2 | 5/2004 |
| EP | 1734766 | A2 | 12/2006 |
| EP | 1243945 | B1 | 1/2009 |
| EP | 2026563 | A1 | 2/2009 |
| EP | 2104334 | A1 | 9/2009 |
| EP | 2244484 | A1 | 10/2010 |
| EP | 0957642 | B1 | 4/2011 |
| EP | 2336816 | A2 | 6/2011 |
| EP | 2339532 | A1 | 6/2011 |
| EP | 2381418 | A1 | 10/2011 |
| EP | 2502115 | A2 | 9/2012 |
| EP | 2569935 | A1 | 3/2013 |
| EP | 2652678 | A1 | 10/2013 |
| EP | 2761534 | A1 | 8/2014 |
| EP | 2777245 | A1 | 9/2014 |
| EP | 2867718 | A1 | 5/2015 |
| EP | 2873028 | A1 | 5/2015 |
| EP | 2888698 | A2 | 7/2015 |
| EP | 2888720 | A1 | 7/2015 |
| EP | 2901671 | A2 | 8/2015 |
| EP | 2973476 | A1 | 1/2016 |
| EP | 3066690 | A1 | 9/2016 |
| EP | 2569935 | B1 | 12/2016 |
| EP | 3201877 | A1 | 8/2017 |
| EP | 2652678 | B1 | 9/2017 |
| EP | 3201877 | A4 | 3/2018 |
| EP | 2817955 | B1 | 4/2018 |
| EP | 3328048 | A1 | 5/2018 |
| EP | 3075140 | B1 | 6/2018 |
| EP | 3201877 | B1 | 12/2018 |
| EP | 3467776 | A1 | 4/2019 |
| EP | 2761534 | B1 | 11/2020 |
| EP | 2888720 | B1 | 3/2021 |
| EP | 3328048 | B1 | 4/2021 |
| EP | 3869797 | A1 | 8/2021 |
| EP | 3876510 | A1 | 9/2021 |
| EP | 3869797 | B1 | 7/2023 |
| EP | 4296963 | A2 | 12/2023 |
| EP | 4307659 | A1 | 1/2024 |
| EP | 4336447 | A1 | 3/2024 |
| EP | 3876510 | B1 | 8/2024 |
| EP | 4296963 | B1 | 1/2025 |
| EP | 4336447 | B1 | 5/2025 |
| EP | 4567495 | A2 | 6/2025 |
| EP | 4567495 | A3 | 9/2025 |
| GB | 2482022 | A | 1/2012 |
| IN | 2708CHENP2014 | A1 | 8/2015 |
| IN | 361194 | | 3/2021 |
| JP | 59-025483 | A | 2/1984 |
| JP | 64-037177 | A | 2/1989 |
| JP | 02-285772 | A | 11/1990 |
| JP | 06129851 | A | 5/1994 |
| JP | 07-015457 | A | 1/1995 |
| JP | H0756112 | A | 3/1995 |
| JP | 09171075 | A | 6/1997 |
| JP | 09181913 | A | 7/1997 |
| JP | 10253351 | A | 9/1998 |
| JP | 11142609 | A | 5/1999 |
| JP | 11223708 | A | 8/1999 |
| JP | 11325889 | A | 11/1999 |
| JP | 2000209503 | A | 7/2000 |
| JP | 2001008235 | A2 | 1/2001 |
| JP | 2001194114 | A2 | 7/2001 |
| JP | 2001264033 | A2 | 9/2001 |
| JP | 2001277260 | A | 10/2001 |
| JP | 2001337263 | A2 | 12/2001 |
| JP | 2002195910 | A | 7/2002 |
| JP | 2002205310 | A | 7/2002 |
| JP | 2002209226 | A | 7/2002 |
| JP | 2002250607 | A | 9/2002 |
| JP | 2002252338 | A | 9/2002 |
| JP | 2003094445 | A | 4/2003 |
| JP | 2003139910 | A | 5/2003 |
| JP | 2003163938 | A | 6/2003 |
| JP | 2003298920 | A | 10/2003 |
| JP | 2004221585 | A | 8/2004 |
| JP | 2005116022 | A | 4/2005 |
| JP | 2005181460 | A | 7/2005 |
| JP | 2005295381 | A | 10/2005 |
| JP | 2005303694 | A | 10/2005 |
| JP | 2005341569 | A | 12/2005 |
| JP | 2005354124 | A | 12/2005 |
| JP | 2006033228 | A | 2/2006 |
| JP | 2006033493 | A | 2/2006 |
| JP | 2006047944 | A | 2/2006 |
| JP | 2006258930 | A | 9/2006 |
| JP | 2007520107 | A | 7/2007 |
| JP | 2007259136 | A | 10/2007 |
| JP | 2008039852 | A | 2/2008 |
| JP | 2008055908 | A | 3/2008 |
| JP | 2008507874 | A | 3/2008 |
| JP | 2008172735 | A | 7/2008 |
| JP | 2008258885 | A | 10/2008 |
| JP | 2009064421 | A | 3/2009 |
| JP | 2009132010 | A | 6/2009 |
| JP | 2009300268 | A | 12/2009 |
| JP | 2010139288 | A | 6/2010 |
| JP | 2011017764 | A | 1/2011 |
| JP | 2011030184 | A | 2/2011 |
| JP | 2011109484 | A | 6/2011 |
| JP | 2011523538 | A | 8/2011 |
| JP | 2011203238 | A | 10/2011 |
| JP | 2012504805 | A | 2/2012 |
| JP | 2013509022 | A | 3/2013 |
| JP | WO2011/052064 | A1 | 3/2013 |
| JP | 2013526801 | A | 6/2013 |
| JP | 2014521117 | A | 8/2014 |
| JP | 2014535191 | A | 12/2014 |
| JP | 2015522178 | A | 8/2015 |
| JP | 2015534734 | A | 12/2015 |
| JP | 5848754 | B2 | 1/2016 |
| JP | 2016524125 | A | 8/2016 |
| JP | 6140709 | B2 | 5/2017 |
| JP | 2017163550 | A | 9/2017 |
| JP | 2017163587 | A | 9/2017 |
| JP | 2017531976 | A | 10/2017 |
| JP | 6546613 | B2 | 7/2019 |
| JP | 2019-220957 | A | 12/2019 |
| JP | 6630891 | B2 | 12/2019 |
| JP | 2020017999 | A | 1/2020 |
| JP | 6767543 | B2 | 9/2020 |
| JP | 6767558 | B2 | 9/2020 |
| KR | 1020110097647 | A | 8/2011 |
| KR | 20170063827 | A | 6/2017 |
| KR | 101824672 | B1 | 2/2018 |
| KR | 101843994 | B1 | 3/2018 |
| KR | 10-2002165 | B1 | 7/2019 |
| KR | 10-2111181 | B1 | 5/2020 |
| SG | 191151 | A1 | 7/2013 |
| SG | 11201500910 | R | 10/2015 |
| TW | 200828994 | A | 7/2008 |
| TW | 200939739 | A | 9/2009 |
| TW | 201228382 | A | 7/2012 |
| TW | I535292 | B | 5/2016 |
| WO | 1994020875 | A3 | 9/1994 |
| WO | 2005057922 | A1 | 6/2005 |
| WO | 2006039906 | A2 | 4/2006 |
| WO | 2006039906 | A3 | 4/2006 |
| WO | 2007013250 | A1 | 2/2007 |
| WO | 2007052191 | A2 | 5/2007 |
| WO | 2007083579 | A1 | 7/2007 |
| WO | 2007134137 | A2 | 11/2007 |
| WO | 2008045198 | A2 | 4/2008 |
| WO | 2008050904 | A1 | 5/2008 |
| WO | 2008108271 | A1 | 9/2008 |
| WO | 2008108926 | A1 | 9/2008 |
| WO | 2008150817 | A1 | 12/2008 |
| WO | 2009073950 | A1 | 6/2009 |
| WO | 2009151903 | A2 | 12/2009 |
| WO | 2009157273 | A1 | 12/2009 |

(56) References Cited

FOREIGN PATENT DOCUMENTS

| | | | |
|---|---|---|---|
| WO | 2010037512 | A1 | 4/2010 |
| WO | 2011008443 | A2 | 1/2011 |
| WO | 2011026527 | A1 | 3/2011 |
| WO | 2011046607 | A2 | 4/2011 |
| WO | 2011055655 | A1 | 5/2011 |
| WO | 2011063347 | A2 | 5/2011 |
| WO | 2011105814 | A2 | 9/2011 |
| WO | 2011116203 | A1 | 9/2011 |
| WO | 2011063347 | A3 | 10/2011 |
| WO | 2011143501 | A1 | 11/2011 |
| WO | 2012057619 | A1 | 5/2012 |
| WO | 2012057620 | A2 | 5/2012 |
| WO | 2012057621 | A1 | 5/2012 |
| WO | 2012057622 | A1 | 5/2012 |
| WO | 2012057623 | A1 | 5/2012 |
| WO | 2012057620 | A3 | 6/2012 |
| WO | 2012074361 | A1 | 6/2012 |
| WO | 2012078126 | A1 | 6/2012 |
| WO | 2012082904 | A1 | 6/2012 |
| WO | 2012155119 | A1 | 11/2012 |
| WO | 2013003276 | A1 | 1/2013 |
| WO | 2013043751 | A1 | 3/2013 |
| WO | 2013043761 | A1 | 3/2013 |
| WO | 2013049699 | A1 | 4/2013 |
| WO | 2013055960 | A1 | 4/2013 |
| WO | 2013068759 | A1 | 5/2013 |
| WO | 2013119706 | A1 | 8/2013 |
| WO | 2013126578 | A1 | 8/2013 |
| WO | 2013166215 | A1 | 11/2013 |
| WO | 2014004134 | A1 | 1/2014 |
| WO | 2014005123 | A1 | 1/2014 |
| WO | 2014031795 | A1 | 2/2014 |
| WO | 2014052974 | A2 | 4/2014 |
| WO | 2014032020 | A3 | 5/2014 |
| WO | 2014078443 | A1 | 5/2014 |
| WO | 2014130849 | A1 | 8/2014 |
| WO | 2014133974 | A1 | 9/2014 |
| WO | 2014138695 | A1 | 9/2014 |
| WO | 2014138697 | A1 | 9/2014 |
| WO | 2014144157 | A1 | 9/2014 |
| WO | 2014145856 | A1 | 9/2014 |
| WO | 2014149403 | A1 | 9/2014 |
| WO | 2014149902 | A1 | 9/2014 |
| WO | 2014150856 | A1 | 9/2014 |
| WO | 2014153098 | A1 | 9/2014 |
| WO | 2014159721 | A1 | 10/2014 |
| WO | 2014159779 | A1 | 10/2014 |
| WO | 2014160142 | A1 | 10/2014 |
| WO | 2014164550 | A2 | 10/2014 |
| WO | 2014164909 | A1 | 10/2014 |
| WO | 2014165244 | A1 | 10/2014 |
| WO | 2014133974 | A9 | 4/2015 |
| WO | 2015048694 | A2 | 4/2015 |
| WO | 2015070105 | A1 | 5/2015 |
| WO | 2015074078 | A1 | 5/2015 |
| WO | 2015081279 | A1 | 6/2015 |
| WO | 2015134996 | A1 | 9/2015 |
| WO | 2015183824 | A1 | 12/2015 |
| WO | 2016054089 | A1 | 4/2016 |

OTHER PUBLICATIONS

Extended European Search Report for EP Application No. 13810429.4, Completed Jan. 7, 2016, Mailed Jan. 15, 2016, 6 pgs.

Extended European Search Report for European Application EP12782935.6, completed Aug. 28, 2014, mailed Sep. 4, 2014, 7 pgs.

Extended European Search Report for European Application EP12804266.0, Report Completed Jan. 27, 2015, Mailed Feb. 3, 2015, 7 pgs.

Extended European Search Report for European Application EP12835041.0, Report Completed Jan. 28, 2015, Mailed Feb. 4, 2015, 6 pgs.

Extended European Search Report for European Application EP13751714.0, completed Aug. 5, 2015, mailed Aug. 18, 2015, 8 pgs.

Extended European Search Report for European Application EP13810229.8, Report Completed Apr. 14, 2016, Mailed Apr. 21, 2016, 7 pgs.

Extended European Search Report for European Application No. 10832330.4, completed Sep. 26, 2013, Mailed Oct. 4, 2013, 7 pgs.

Extended European Search Report for European Application No. 11848308.0, Search completed Jan. 13, 2016, Mailed Jan. 22, 2016, 10 pgs.

Extended European Search Report for European Application No. 13830945.5, Search completed Jun. 28, 2016, Mailed Jul. 7, 2016, 14 pgs.

Extended European Search Report for European Application No. 13841613.6, Search completed Jul. 18, 2016, Mailed Jul. 26, 2016, 8 pgs.

Extended European Search Report for European Application No. 14763087.5, Search completed Dec. 7, 2016, Mailed Dec. 19, 2016, 9 pgs.

Extended European Search Report for European Application No. 14860103.2, Search completed Feb. 23, 2017, Mailed Mar. 3, 2017, 7 pgs.

Extended European Search Report for European Application No. 14865463.5, Search completed May 30, 2017, Mailed Jun. 8, 2017, 6 pgs.

Extended European Search Report for European Application No. 15847754.7, Search completed Jan. 25, 2018, Mailed Feb. 9, 2018, 8 pgs.

Extended European Search Report for European Application No. 18151530.5, Completed Mar. 28, 2018, Mailed Apr. 20, 2018,11 pgs.

Extended European Search Report for European Application No. 18205326.4, Search completed Jan. 08, 2019Mailed Jan. 18, 2019, 9 pgs.

Extended European Search Report for European Application No. 21169308.0, Search completed Aug. 2, 2021, Mailed Aug. 9, 2021, 9 pgs.

Extended European Search Report for European Application No. 23177057.9, Search completed Dec. 4, 2023, Mailed Dec. 15, 2023, 14 pgs.

Extended European Search Report for European Application No. 23185907.5, Search completed Feb. 12, 2024, Mailed Feb. 23, 2024, 09pgs.

Extended European Search Report for European Application No. 23206157.2, Search completed Jan. 26, 2024, Mailed Feb. 12, 2024, 10 pgs.

Extended Search Report for European Application No. 21155002.5, Search completed Jun. 07, 2021Mailed Jun. 11, 2021, 14 pgs.

International Preliminary Report on Patentability for International Application No. PCT/US2009/044687, Completed Jul. 30, 2010, 9 pgs.

International Preliminary Report on Patentability for International Application No. PCT/US2012/056151, Report Issued Mar. 25, 2014, 9 pgs.

International Preliminary Report on Patentability for International Application No. PCT/US2012/056166, Report Issued Mar. 25, 2014, Report Mailed Apr. 3, 2014, 8 pgs.

International Preliminary Report on Patentability for International Application No. PCT/US2012/058093, Report Issued Sep. 18, 2013, Mailed Oct. 22, 2013, 40 pgs.

International Preliminary Report on Patentability for International Application No. PCT/US2012/059813, Search Completed Apr. 15, 2014, 7 pgs.

International Preliminary Report on Patentability for International Application No. PCT/US2013/059991, Issued Mar. 17, 2015, Mailed Mar. 26, 2015, 8 pgs.

International Preliminary Report on Patentability for International Application PCT/US2015/032467, Report issued Nov. 29, 2016, Mailed Dec. 8, 2016, 9 pgs.

International Preliminary Report on Patentability for International Application PCT/US10/057661, issued May 22, 2012, mailed May 31, 2012, 10 pgs.

(56) References Cited

OTHER PUBLICATIONS

International Preliminary Report on Patentability for International Application PCT/US11/036349, Report Issued Nov. 13, 2012, Mailed Nov. 22, 2012, 9 pgs.
International Preliminary Report on Patentability for International Application PCT/US13/56065, Issued Feb. 24, 2015, Mailed Mar. 5, 2015, 4 pgs.
International Preliminary Report on Patentability for International Application PCT/US2011/064921, issued Jun. 18, 2013, mailed Jun. 27, 2013, 14 pgs.
International Preliminary Report on Patentability for International Application PCT/US2013/024987, Mailed Aug. 12, 2014, 13 pgs.
International Preliminary Report on Patentability for International Application PCT/US2013/027146, completed Aug. 26, 2014, Mailed Sep. 4, 2014, 10 pgs.
International Preliminary Report on Patentability for International Application PCT/US2013/039155, completed Nov. 4, 2014, Mailed Nov. 13, 2014, 10 pgs.
International Preliminary Report on Patentability for International Application PCT/US2013/046002, issued Dec. 31, 2014, Mailed Jan. 8, 2015, 6 pgs.
International Preliminary Report on Patentability for International Application PCT/US2013/048772, issued Dec. 31, 2014, Mailed Jan. 8, 2015, 8 pgs.
International Preliminary Report on Patentability for International Application PCT/US2013/056502, Issued Feb. 24, 2015, Mailed Mar. 5, 2015, 7 pgs.
International Preliminary Report on Patentability for International Application PCT/US2013/069932, issued May 19, 2015, Mailed May 28, 2015, 12 pgs.
International Preliminary Report on Patentability for International Application PCT/US2014/017766, issued Aug. 25, 2015, Mailed Sep. 3, 2015, 8 pgs.
International Preliminary Report on Patentability for International Application PCT/US2014/018084, issued Aug. 25, 2015, Mailed Sep. 3, 2015, 11 pgs.
International Preliminary Report on Patentability for International Application PCT/US2014/018116, issued Sep. 15, 2015, Mailed Sep. 24, 2015, 12 pgs.
International Preliminary Report on Patentability for International Application PCT/US2014/021439, issued Sep. 15, 2015, Mailed Sep. 24, 2015, 9 pgs.
International Preliminary Report on Patentability for International Application PCT/US2014/022118, issued Sep. 8, 2015, Mailed Sep. 17, 2015, 4 pgs.
International Preliminary Report on Patentability for International Application PCT/US2014/022123, issued Sep. 8, 2015, Mailed Sep. 17, 2015, 4 pgs.
International Preliminary Report on Patentability for International Application PCT/US2014/022774, issued Sep. 22, 2015, Mailed Oct. 1, 2015, 5 pgs.
International Preliminary Report on Patentability for International Application PCT/US2014/023762, issued Mar. 2, 2015, Mailed Mar. 9, 2015, 10 pgs.
International Preliminary Report on Patentability for International Application PCT/US2014/024407, issued Sep. 15, 2015, Mailed Sep. 24, 2015, 8 pgs.
International Preliminary Report on Patentability for International Application PCT/US2014/024903, issued Sep. 15, 2015, Mailed Sep. 24, 2015, 12 pgs.
International Preliminary Report on Patentability for International Application PCT/US2014/024947, issued Sep. 15, 2015, Mailed Sep. 24, 2015, 7 pgs.
International Preliminary Report on Patentability for International Application PCT/US2014/025100, issued Sep. 15, 2015, Mailed Sep. 24, 2015, 4 pgs.
International Preliminary Report on Patentability for International Application PCT/US2014/025904, issued Sep. 15, 2015, Mailed Sep. 24, 2015, 5 pgs.
International Preliminary Report on Patentability for International Application PCT/US2014/028447, issued Sep. 15, 2015, Mailed Sep. 24, 2015, 7 pgs.
International Preliminary Report on Patentability for International Application PCT/US2014/029052, issued Sep. 15, 2015, Mailed Sep. 24, 2015, 9 pgs.
International Preliminary Report on Patentability for International Application PCT/US2014/030692, issued Sep. 15, 2015, Mailed Sep. 24, 2015, 6 pgs.
International Preliminary Report on Patentability for International Application PCT/US2014/064693, issued May 10, 2016, Mailed May 19, 2016, 14 pgs.
International Preliminary Report on Patentability for International Application PCT/US2014/066229, issued May 24, 2016, Mailed Jun. 2, 2016, 9 pgs.
International Preliminary Report on Patentability for International Application PCT/US2014/067740, issued May 31, 2016, Mailed Jun. 9, 2016, 9 pgs.
International Preliminary Report on Patentability for International Application PCT/US2015/019529, issued Sep. 13, 2016, Mailed Sep. 22, 2016, 9 pgs.
International Preliminary Report on Patentability for International Application PCT/US2015/053013, issued Apr. 4, 2017, Mailed Apr. 13, 2017, 8 pgs.
International Preliminary Report on Patentability for International Application PCT/US13/62720, Issued Mar. 31, 2015, Mailed Apr. 9, 2015, 8 pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.
International Search Report and Written Opinion for International Application No. PCT/US2012/056166, Report Completed Nov. 10, 2012, Mailed Nov. 20, 2012, 9 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, Mailed Jul. 11, 2013, 11 pgs.
International Search Report and Written Opinion for International Application No. PCT/US2013/048772, Completed Oct. 21, 2013, Mailed Nov. 8, 2013, 6 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 12 pgs.
International Search Report and Written Opinion for International Application No. PCT/US2015/019529, completed May 5, 2015, Mailed Jun. 8, 2015, 11 pgs.
International Search Report and Written Opinion for International Application No. PCT/US2015/032467, Search completed Jul. 27, 2015, Mailed Aug. 19, 2015, 10 pgs.
International Search Report and Written Opinion for International Application No. PCT/US2015/053013, completed Dec. 1, 2015, Mailed Dec. 30, 2015, 9 pgs.
International Search Report and Written Opinion for International Application PCT/US11/36349, mailed Aug. 22, 2011, 11 pgs.
International Search Report and Written Opinion for International Application PCT/US13/62720, completed Mar. 25, 2014, Mailed Apr. 21, 2014, 9 pgs.

(56) References Cited

OTHER PUBLICATIONS

International Search Report and Written Opinion for International Application PCT/US14/17766, completed May 28, 2014, Mailed Jun. 18, 2014, 9 pgs.
International Search Report and Written Opinion for International Application PCT/US14/18084, completed May 23, 2014, Mailed Jun. 10, 2014, 12 pgs.
International Search Report and Written Opinion for International Application PCT/US14/18116, Report completed May 13, 2014, 12 pgs.
International Search Report and Written Opinion for International Application PCT/US14/21439, completed Jun. 5, 2014, Mailed Jun. 20, 2014, 10 pgs.
International Search Report and Written Opinion for International Application PCT/US14/22118, completed Jun. 9, 2014, Mailed, Jun. 25, 2014, 5 pgs.
International Search Report and Written Opinion for International Application PCT/US14/22774 report completed Jun. 9, 2014, Mailed Jul. 14, 2014, 6 pgs.
International Search Report and Written Opinion for International Application PCT/US14/24407, report completed Jun. 11, 2014, Mailed Jul. 8, 2014, 9 pgs.
International Search Report and Written Opinion for International Application PCT/US14/25100, report completed Jul. 7, 2014, Mailed Aug. 7, 2014, 5 pgs.
International Search Report and Written Opinion for International Application PCT/US14/25904 report completed Jun. 10, 2014, Mailed Jul. 10, 2014, 6 pgs.
International Search Report and Written Opinion for International Application PCT/US2009/044687, completed Jan. 5, 2010, mailed Jan. 13, 2010, 9 pgs.
International Search Report and Written Opinion for International Application PCT/US2010/057661, completed Mar. 9, 2011, 14 pgs.
International Search Report and Written Opinion for International Application PCT/US2011/064921, completed Feb. 25, 2011, mailed Mar. 6, 2012, 17 pgs.
International Search Report and Written Opinion for International Application PCT/US2012/037670, Mailed Jul. 18, 2012, Completed Jul. 5, 2012, 9 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/058093, Report completed Nov. 15, 2012, 12 pgs.
International Search Report and Written Opinion for International Application PCT/US2012/059813, completed Dec. 17, 2012, 8 pgs.
International Search Report and Written Opinion for International Application PCT/US2014/022123, completed Jun. 9, 2014, Mailed Jun. 25, 2014, 5 pgs.
International Search Report and Written Opinion for International Application PCT/US2014/023762, Completed May 30, 2014, Mailed Jul. 3, 2014, 6 pgs.
International Search Report and Written Opinion for International Application PCT/US2014/024903, completed Jun. 12, 2014, Mailed, Jun. 27, 2014, 13 pgs.
International Search Report and Written Opinion for International Application PCT/US2014/024947, Completed Jul. 8, 2014, Mailed Aug. 5, 2014, 8 pgs.
International Search Report and Written Opinion for International Application PCT/US2014/028447, completed Jun. 30, 2014, Mailed Jul. 21, 2014, 8 pgs.
International Search Report and Written Opinion for International Application PCT/US2014/029052, completed Jun. 30, 2014, Mailed Jul. 24, 2014, 10 pgs.
International Search Report and Written Opinion for International Application PCT/US2014/030692, completed Jul. 28, 2014, Mailed Aug. 27, 2014, 7 pgs.
International Search Report and Written Opinion for International Application PCT/US2014/064693, Completed Mar. 7, 2015, Mailed Apr. 2, 2015, 15 pgs.
International Search Report and Written Opinion for International Application PCT/US2014/066229, Completed Mar. 6, 2015, Mailed Mar. 19, 2015, 9 pgs.
International Search Report and Written Opinion for International Application PCT/US2014/067740, Completed Jan. 29, 2015, mailed Mar. 3, 2015, 10 pgs.
Office Action for U.S. Appl. No. 12/952,106, dated Aug. 16, 2012, 12 pgs.
Supplementary European Search Report for EP Application No. 13831768.0, Search completed May 18, 2016, Mailed May 30, 2016, 13 pgs.
Supplementary European Search Report for European Application 09763194.9, completed Nov. 7, 2011, mailed Nov. 29, 2011, 9 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"File Formats Version 6", Alias Systems, 2004, 40 pgs.
"Light Field—Wikipedia, the Free Encyclopedia", The Wayback Machine—Aug. 15, 2012, https://web.archive.Org/web/20120815204221/http://en.wikipedia.org/wiki/Light_field, XP093106694, Retrieved from the Internet :, RL:https ://web.archive.org/web/20120815204221/https://en.Wikipedia.org/wiki/Light_field#Ways—to_create—light—fields [retrieved on Nov. 28, 2023].
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, May 2007, published Apr. 16, 2007, vol. 16, No. 5, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.

(56) References Cited

OTHER PUBLICATIONS

Borman et al., "Image Resampling and Constraint Formulation for Multi-Frame Super-Resolution Restoration", Proc. SPIE, published Jul. 1, 2003, vol. 5016, 12 pgs.
Borman et al., "Linear models for multi-frame super-resolution restoration under non-affine registration and spatially varying PSF", Proc. SPIE, May 21, 2004, vol. 5299, 12 pgs.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bruckner et al., "Thin wafer-level camera lenses inspired by insect compound eyes", Optics Express, Nov. 22, 2010, vol. 18, No. 24, pp. 24379-24394.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pgs.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1 &type=pdf>, 2001, 269 pgs.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Investigation of Computational Compound-Eye Imaging System with Super-Resolution Reconstruction", IEEE, ISASSP, Jun. 19, 2006, pp. 1177-1180.
Chan et al., "Super-resolution reconstruction in a computational compound-eye imaging system", Multidim Syst Sign Process, published online Feb. 23, 2007, vol. 18, pp. 83-101.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Interactive deformation of light fields", Symposium on Interactive 3D Graphics, 2005, pp. 139-146.
Chen et al., "KNN matting", 2012 IEEE Conference on Computer Vision and Pattern Recognition, Jun. 16-21, 2012, Providence, RI, USA, pp. 869-876.
Chen et al., "KNN Matting", IEEE Transactions on Pattern Analysis and Machine Intelligence, Sep. 2013, vol. 35, No. 9, pp. 2175-2188.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Debevec et al., "Modeling and Rendering Architecture from Photographs: a Hybrid Geometry- and Image-Based Approach", Computer Graphics Proceedings. Siggraph '96, Jan. 19, 1996, pp. 11-20, XP093106889, New York, US DOI: 10.1145/237170.237191 ISBN: 978-0-89791-746-9 Retrieved from the Internet:, URL:https ://www2.eecs.berkeley.edu/Pubs/Te chRpts/1996/CSD-96-893.pdf> [retrieved on Nov. 28, 2023].
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drouin et al., "Improving Border Localization of Multi-Baseline Stereo Using Border-Cut", International Journal of Computer Vision, Jul. 5, 2006, vol. 83, Issue 3, 8 pgs.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, Nov. 21, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, Apr. 6, 2006, vol. 1, pp. R1-R16.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, Apr. 21, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.

(56) References Cited

OTHER PUBLICATIONS

Eng et al., "Gaze correction for 3D tele-immersive communication system", IVMSP Workshop, 2013 IEEE 11th. IEEE, Jun. 10, 2013, 4 pgs.
Fanaswala, "Regularized Super-Resolution of Multi-View Images", Retrieved on Nov. 10, 2012 (Nov. 10, 2012). Retrieved from the Internet at URL :<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Gastal et al., "Shared Sampling for Real-Time Alpha Matting", Computer Graphics Forum, Eurographics 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, Or, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Burst photography for high dynamic range and low-light imaging on mobile cameras", ACM Transactions on Graphics, vol. 35, No. 6, Article No. 192, 2016, pp. 1-12, https://doi.org/10.1145/2980179.2980254.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of I3D, Jan. 1, 2007, pp. 121-128.
Isaksen et al., "Dynamically Reparameterized Light Fields", In Proceedings of SIGGRAPH 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), Jun. 17-22, 2006, vol. 1, New York, NY, USA, pp. 371-378.
Joshi, Neel S. "Color Calibration for Arrays of Inexpensive Image Sensors", Master's with Distinction in Research Report, Stanford University, Department of Computer Science, Mar. 2004, 30 pgs.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. 1-103-1-110.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pgs.
Kitamura et al., "Reconstruction of a high-resolution image on a compound-eye image-capturing system", Applied Optics, Mar. 10, 2004, vol. 43, No. 8, pp. 1719-1727.
Konolige, Kurt "Projected Texture Stereo", 2010 IEEE International Conference on Robotics and Automation, May 3-7, 2010, pp. 148-155.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.

(56) References Cited

OTHER PUBLICATIONS

Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
Mcguire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Light Field Photography with a Hand-held Plenoptic Camera", Stanford Tech Report CTSR Feb. 2005, Apr. 20, 2005, pp. 1-11.
Ng et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-11-592.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-36.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction :A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.

(56) References Cited

OTHER PUBLICATIONS

Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 · Source: DBLP Conference: Computer Vision, Sixth International Conference.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", in Visual Communications and Image Processing 2000, May 2000, vol. 4067, pp. 2-13.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs., DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Robust Kernel Regression for Restoration and Reconstruction of Images from Sparse Noisy Data", 2006 International Conference on Image Processing, Atlanta, GA, USA, 2006, pp. 1257-1260, doi: 10.1109/ICIP.2006.312573.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online], [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, Nov. 1, 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Automatic Natural Video Matting with Depth", 15th Pacific Conference on Computer Graphics and Applications, PG '07, Oct. 29-Nov. 2, 2007, Maui, Hi, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pgs., published Aug. 5, 2007.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.

(56) References Cited

OTHER PUBLICATIONS

Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "A Real-Time Distributed Light Field Camera", Eurographics Workshop on Rendering (2002), published Jul. 26, 2002, pp. 1-10.
Yang et al., "Superresolution Using Preconditioned Conjugate Gradient Method", Proceedings of SPIE—The International Society for Optical Engineering, Jul. 2002, 8 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
Extended European Search Report for European Application No. 25151660.5, Search completed Jul. 10, 2025, Mailed Aug. 8, 2025, 11 Pgs.
Achanta et al., "SLIC Superpixels", EPFL Technical Report 149300, Jun. 2010, 15 pgs.
Hirschmuller et al., "Memory Efficient Semi-Global Matching", ISPRS Annals of the Photogrammetry, Remote Sensing and Spatial Information Sciences, vol. I-3, 2012, XXII ISPRS Congress, Aug. 25-Sep. 1, 2012, Melbourne, Australia, 6 pgs.
Roszkowski, Mikołaj, "Stereo matching with superpixels", Proc. SPIE 8454, Photonics Applications in Astronomy, Communications, Industry, and High-Energy Physics Experiments 2012, 84540V, Oct. 15, 2012, https://doi.org/10.1117/12.2000139.
Zabih et al., "Non-parametric Local Transforms for Computing Visual Correspondence", ECCV 1994 Proceedings of the third European Conference on Computer Vision, May 7, 1994, vol. 3, pp. 151-158.
Extended European Search Report for European Application No. 25174527.9, Search completed Nov. 13, 2025, Mailed Nov. 27, 2025, 7 pgs.
Kanaev et al., "TOMBO sensor with scene-independent superresolution processing", Optics Letter, vol. 32, No. 19, Oct. 1, 2007 pp. 2855-2857.

* cited by examiner

| Name | Byte number | Comments |
|---|---|---|
| Reserved for future extensions | Byte 3 | |
| Number of Auxiliary Maps | Byte 2 | Describes total number of Auxiliary maps present in the file |
| Depth Map Camera Array and Auxiliary Maps compression | Byte 1 | See detailed description in Figure 6 |
| Depth Map, Camera Array and Auxiliary Maps Selection | Byte 0 | See detailed description in Figure 7 |

| Data Type | Bit number | Selection values |
|---|---|---|
| Reserved for Future extensions | Bit 7 | |
| Confidence Map | Bit 7 | 0: Map is not included<br>1: Map is Present |
| Silhouette Edge Map | Bit 5 | 0: Map is not included<br>1: Map is Present |
| Regular Edge Map | Bit 4 | 0: Map is not included<br>1: Map is Present |
| Missing Pixel Map | Bit 3 | 0: Map is not included<br>1: Map is Present |
| Virtual View Point | Bit 2 | 0: No Virtual View Point<br>1: Virtual View Point is Present |
| Camera Array and Per camera Occlusion Data | Bit 1 | 0: Data is not included<br>1: Data are Present |
| Depth Map | Bit 0 | 0: Data is not included<br>1: Data is Present |

*FIG. 6*

| | | |
|---|---|---|
| Reserved for Future extensions | Bit 7 | 0: Not Compressed<br>1: Compressed |
| Confidence Map | Bit 7 | 0: Not Compressed<br>1: Compressed |
| Silhouette Edge Map | Bit 5 | 0: Not Compressed<br>1: Compressed |
| Regular Edge Map | Bit 4 | 0: Not Compressed<br>1: Compressed |
| Missing Pixel Map | Bit 3 | 0: Not Compressed<br>1: Compressed |
| Virtual View Point | Bit 2 | 0: Not Present<br>1: Present |
| Camera Array and Per camera Occlusion Data | Bit 1 | 0: Not Compressed<br>1: Compressed |
| Depth Map | Bit 0 | 0: Regular JPEG compression<br>1: Lossless JPEG LS compression |

*FIG. 7*

| Attribute name | Attribute Tag ID (4Byte) | Attribute Description |
|---|---|---|
| Reserved for future extensions | 2-127 | |
| In Focus Plane | 1 | Define central in focus Depth Plane |
| F# | 0 | Defines Synthetic Aperture |

*FIG. 8*

| Name | Byte Number | Description | Comments |
|---|---|---|---|
| Reserved for future extensions | 9-15 | | |
| Version | 7-8 | The most significant byte is used for major revisions, the least significant byte for minor revisions. Version 1.00 is the current revision. | Initial version must support Regular JPEG 8-bit grayscale compression |
| Identifier | 0-6 | Zero terminated string “PIDZDH” uniquely identifies this descriptor | |

*FIG. 9*

| Name | Byte Numbers | Description | Comments |
|---|---|---|---|
| Compressed Depth Map Data | 16 to 16 + Length | Compressed Depth Map Data for Current Segment | |
| Reserved for future extensions | 13-15 | | |
| Offset to the next Marker | 9-12 | Number of bites from current Marker to the next Marker excluding the APP9 marker itself | Next Marker could be either Depth Map Data Segment Marker, Camera Array Marker or Auxiliary Map Marker |
| Length | 7-8 | Total APP9 field byte count, including the byte count value (2 bytes), but excluding the APP9 marker itself. | A JPEG marker is limited to 65533 bytes. To represent the whole map multiple depth map markers with the same ID will be following each other |
| Identifier | 0-6 | Zero terminated string "PIDZDD" uniquely identifies this descriptor | |

*FIG. 10*

| Attribute name | Attribute Tag ID (4Byte) | Bytes | Attribute Description | Comments |
|---|---|---|---|---|
| Horizontal dimension | 0 | 4 | Number of cameras in horizontal direction N | We assume two dimensional Camera Array |
| Vertical dimension | 1 | 4 | Number of cameras in horizontal direction M | |
| Reference camera position | 2 | 4 | Camera number (row major) | |
| Virtual View Position | 3 | 8 | Two floating point numbers Px and Py defining Horizontal and Vertical position of Virtual View point | Constrains: 0<= Px <= N 0<= Py <= M |
| Number of cameras with occlusion data | 4 | 4 | Number of cameras in camera array with occlusion data | |

*FIG. 11*

| Name | Byte Number | Description | Comments |
|---|---|---|---|
| Reserved for future extensions | 9-15 | | |
| Version | 7-8 | The most significant byte is used for major revisions, the least significant byte for minor revisions. Version 1.00 is the current revision. | Initial version must support Regular JPEG 8-bit grayscale compression |
| Identifier | 0-6 | Zero terminated string "PIDZAH" uniquely identifies this descriptor | |

*FIG. 12*

| Name | Byte Numbers | Description | Comments |
|---|---|---|---|
| Reserved for future extensions | 14-15 | | |
| Offset to the next Marker | 12-13 | Number of bites from current Marker to the next Marker excluding the APP9 marker itself | Next Marker could be either Depth Map Data Segment Marker, Camera Array Marker or Auxiliary Map Marker |
| Length | 10-11 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of Occluded pixels | 8-9 | Total Number of Occluded Pixels in this Camera | Currently Camera Array Data is not compressed |
| Camera Number | 7 | Camera Number (row major) | |
| Identifier | 0-6 | Zero terminated string "PIDZCD" uniquely identifies this descriptor | |

*FIG. 13*

| Name | Byte Numbers | Description | Comments |
|---|---|---|---|
| Individual Camera Data for Current Segment | 16 to 16 + Length | Occlusion Data | Occlusion Data in current revision is not compressed |
| Reserved for future extensions | 12-15 | | |
| Offset to the next Marker | 10-11 | Number of bites from current Marker to the next Marker excluding the APP9 marker itself | Next Marker could be either Depth Map Data Segment Marker, Camera Array Marker or Auxiliary Map Marker |
| Length | 8-9 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of Pixels | 7- 8 | Number of occluded pixels in current segment | |
| Identifier | 0-6 | Zero terminated string “PIDZCD” uniquely identifies this descriptor | |

*FIG. 14*

| Name | Number of Bytes | Attribute Description | Comments |
|---|---|---|---|
| Depth | 1 | Depth value | |
| RGB Color | 3 | Pixel color | |
| Pixel coordinates | 8 | Two integer numbers defining x an y Pixel coordinates | |

*FIG. 15*

| Name | Byte Number | Description | Comments |
|---|---|---|---|
| Reserved for future extensions | 11-15 | | |
| Number of bits per Map | 10 | Number of bits per pixel for current Auxiliary Map | |
| Auxiliary Map Type | 9 | Type of Auxiliary maps | The following types of Auxiliary Maps have been currently defined:<br>0 = Missing Pixel<br>1 = Regular Edge<br>2 = Silhouette Edge<br>3 = Confidence |
| Version | 7-8 | The most significant byte is used for major revisions, the least significant byte for minor revisions. Version 1.00 is the currentrevision. | Initial version must support Regular JPEG 8-bit grayscale compression |
| Identifier | 0-6 | Zero terminated string "PIDZAM" uniquely identifies this descriptor | |

*FIG. 16*

| Name | Byte Numbers | Description | Comments |
| --- | --- | --- | --- |
| Auxiliary Map Data | 16 to 16 + Length | Auxiliary data | Not compressed in current revision |
| Reserved for future extensions | 15 | | |
| Offset to the next Marker | 11-14 | Number of bites from current Marker to the next Marker excluding the APP9 marker itself | Next Marker could be either Depth Map Data Segment Marker, Camera Array Marker or Auxiliary Map Marker |
| Length | 9-10 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of pixels | 7-8 | Number of pixels in current segment | |
| Identifier | 0-6 | Zero terminated string "PIDZAD" uniquely identifies this descriptor | |

*FIG. 17*

SYSTEMS AND METHODS FOR DECODING IMAGE FILES CONTAINING DEPTH MAPS STORED AS METADATA

CROSS-REFERENCE TO RELATED APPLICATION

The present invention is a continuation of U.S. patent application Ser. No. 18/339,775 filed Jun. 22, 2023 and issued as U.S. Pat. No. 12,052,409 on Jul. 30, 2024, which is a continuation of U.S. patent application Ser. No. 17/233,553 filed Apr. 19, 2021 and issued as U.S. Pat. No. 11,729,365 on Aug. 15, 2023, which is a continuation of U.S. patent application Ser. No. 16/586,827 filed Sep. 27, 2019 and issued as U.S. Pat. No. 10,984,276 on Apr. 20, 2021, which is a continuation of U.S. patent application Ser. No. 16/030,597 filed Jul. 9, 2018 and issued as U.S. Pat. No. 10,430,682 on Oct. 1, 2019, which is a continuation of U.S. patent application Ser. No. 15/396,024 filed Dec. 30, 2016 and issued as U.S. Pat. No. 10,019,816 on Jul. 10, 2018, which is a continuation of U.S. patent application Ser. No. 14/667,492 filed Mar. 24, 2015 and issued as U.S. Pat. No. 9,536,166 on Jan. 3, 2017, which is a continuation of U.S. patent application Ser. No. 14/504,687, filed Oct. 2, 2014 and issued as U.S. Pat. No. 9,042,667 on May 26, 2015, which is a continuation of U.S. patent application Ser. No. 14/477,374, filed Sep. 4, 2014, and issued as U.S. Pat. No. 9,036,931 on May 19, 2015, which is a continuation of U.S. patent application Ser. No. 13/955,411, filed Jul. 31, 2013 and issued as U.S. Pat. No. 8,831,367 on Sep. 9, 2014, which is a continuation of U.S. patent application Ser. No. 13/631,736, filed Sep. 28, 2012 and issued as U.S. Pat. No. 8,542,933 on Sep. 24, 2013, which claims priority to U.S. Provisional Application No. 61/540,188 entitled "JPEG-DX: A Backwards-compatible, Dynamic Focus Extension to JPEG", to Venkataraman et al., filed Sep. 28, 2011, the disclosures of which are incorporated herein by reference in their entirety.

FIELD OF THE INVENTION

The present invention relates to decoding of image files and more specifically to the decoding of light field image files.

BACKGROUND

The ISO/IEC 10918-1 standard, more commonly referred to as the JPEG standard after the Joint Photographic Experts Group that developed the standard, establishes a standard process for digital compression and coding of still images. The JPEG standard specifies a codec for compressing an image into a bitstream and for decompressing the bitstream back into an image.

A variety of container file formats including the JPEG File Interchange Format (JFIF) specified in ISO/IEC 10918-5 and the Exchangeable Image File Format (Exif) and can be used to store a JPEG bitstream. JFIF can be considered a minimal file format that enables JPEG bitstreams to be exchanged between a wide variety of platforms and applications. The color space used in JFIF files is YCbCr as defined by CCIR Recommendation 601, involving 256 levels. The Y, Cb, and Cr components of the image file are converted from R, G, and B, but are normalized so as to occupy the full 256 levels of an 8-bit binary encoding. YCbCr is one of the compression formats used by JPEG. Another popular option is to perform compression directly on the R, G and B color planes. Direct RGB color plane compression is also popular when lossless compression is being applied.

A JPEG bitstream stores 16-bit word values in big-endian format. JPEG data in general is stored as a stream of blocks, and each block is identified by a marker value. The first two bytes of every JPEG bitstream are the Start Of Image (SOI) marker values FFh D8h. In a JFIF-compliant file there is a JFIF APP0 (Application) marker, immediately following the SOI, which consists of the marker code values FFh E0h and the characters JFIF in the marker data, as described in the next section. In addition to the JFIF marker segment, there may be one or more optional JFIF extension marker segments, followed by the actual image data.

Overall, the JFIF format supports sixteen "Application markers" to store metadata. Using application markers makes it is possible for a decoder to parse a JFIF file and decode only required segments of image data. Application markers are limited to 64K bytes each but it is possible to use the same maker ID multiple times and refer to different memory segments.

An APP0 marker after the SOI marker is used to identify a JFIF file. Additional APP0 marker segments can optionally be used to specify JFIF extensions. When a decoder does not support decoding a specific JFIF application marker, the decoder can skip the segment and continue decoding.

One of the most popular file formats used by digital cameras is Exif. When Exif is employed with JPEG bitstreams, an APP1 Application marker is used to store the Exif data. The Exif tag structure is borrowed from the Tagged Image File Format (TIFF) maintained by Adobe Systems Incorporated of San Jose, California.

SUMMARY OF THE INVENTION

Systems and methods in accordance with embodiments of the invention are configured to render images using light field image files containing an image synthesized from light field image data and metadata describing the image that includes a depth map. One embodiment of the invention includes a processor and memory containing a rendering application and a light field image file including an encoded image and metadata describing the encoded image, where the metadata comprises a depth map that specifies depths from the reference viewpoint for pixels in the encoded image. In addition, the rendering application configures the processor to: locate the encoded image within the light field image file; decode the encoded image; locate the metadata within the light field image file; and post process the decoded image by modifying the pixels based on the depths indicated within the depth map to create a rendered image.

In a further embodiment the rendering application configuring the processor to post process the decoded image by modifying the pixels based on the depths indicated within the depth map to create the rendered image comprises applying a depth based effect to the pixels of the decoded image.

In another embodiment, the depth based effect comprises at least one effect selected from the group consisting of: modifying the focal plane of the decoded image; modifying the depth of field of the decoded image; modifying the blur in out-of-focus regions of the decoded image; locally varying the depth of field of the decoded image; creating multiple focus areas at different depths within the decoded image; and applying a depth related blur.

In a still further embodiment, the encoded image is an image of a scene synthesized from a reference viewpoint using a plurality of lower resolution images that capture the scene from different viewpoints, the metadata in the light field image file further comprises pixels from the lower resolution images that are occluded in the reference viewpoint, and the rendering application configuring the processor to post process the decoded image by modifying the pixels based on the depths indicated within the depth map to create the rendered image comprises rendering an image from a different viewpoint using the depth map and the pixels from the lower resolution images that are occluded in the reference viewpoint.

In still another embodiment, the metadata in the light field image file includes descriptions of the pixels from the lower resolution images that are occluded in the reference viewpoint including the color, location, and depth of the occluded pixels, and rendering an image from a different viewpoint using the depth map and the pixels from the lower resolution images that are occluded in the reference viewpoint further includes: shifting pixels from the decoded image and the occluded pixels in the metadata to the different viewpoint based upon the depths of the pixels; determining pixel occlusions; and generating an image from the different viewpoint using the shifted pixels that are not occluded and by interpolating to fill in missing pixels using adjacent pixels that are not occluded.

In a yet further embodiment, the image rendered from the different viewpoint is part of a stereo pair of images.

In yet another embodiment, the metadata in the light field image file further comprises a confidence map for the depth map, where the confidence map indicates the reliability of the depth values provided for pixels by the depth map, and rendering an image from a different viewpoint using the depth map and the pixels from the lower resolution images that are occluded in the reference viewpoint further comprises applying at least one filter based upon the confidence map.

In a further embodiment again, the metadata in the light field image file further comprises an edge map that indicates pixels in the decoded image that lie on a discontinuity, and rendering an image from a different viewpoint using the depth map and the pixels from the lower resolution images that are occluded in the reference viewpoint further comprises applying at least one filter based upon the edge map.

In another embodiment again, the edge map identifies whether a pixel lies on an intensity discontinuity.

In a further additional embodiment, the edge map identifies whether a pixel lies on an intensity and depth discontinuity.

In another additional embodiment, the metadata in the light field image file further comprises a missing pixel map that indicates pixels in the decoded image that do not correspond to a pixel from the plurality of low resolution images of the scene and that are generated by interpolating pixel values from adjacent pixels in the synthesized image, and rendering an image from a different viewpoint using the depth map and the pixels from the lower resolution images that are occluded in the reference viewpoint further comprises ignoring pixels based upon the missing pixel map.

In a still further embodiment again, the light field image file conforms to the JFIF standard and the encoded image is encoded in accordance with the JPEG standard, the memory comprises a JPEG decoder application, and the rendering application configures the processor to: locate the encoded image by locating a Start of Image marker within the light field image file; and decode the encoded image using the JPEG decoder.

In still another embodiment again, the metadata is located within an Application marker segment within the light field image file.

In a still further additional embodiment, the Application marker segment is identified using the APP9 marker.

In still another additional embodiment, the depth map is encoded in accordance with the JPEG standard using lossless compression, and the rendering application configures the processor to: locate at least one Application marker segment containing the metadata comprising the depth map; and decode the depth map using the JPEG decoder.

In a yet further embodiment again, the encoded image is an image of a scene synthesized from a reference viewpoint using a plurality of lower resolution images that capture the scene from different viewpoints, the metadata in the light field image file further comprises pixels from the lower resolution images that are occluded in the reference viewpoint, the rendering application configures the processor to locate at least one Application marker segment containing the metadata comprising the pixels from the lower resolution images that are occluded in the reference viewpoint, and the rendering application configuring the processor to post process the decoded image by modifying the pixels based on the depth of the pixel indicated within the depth map to create the rendered image comprises rendering an image from a different viewpoint using the depth map and the pixels from the lower resolution images that are occluded in the reference viewpoint.

In yet another embodiment again, the metadata in the light field image file includes descriptions of the pixels from the lower resolution images that are occluded in the reference viewpoint including the color, location, and depth of the occluded pixels, and rendering an image from a different viewpoint using the depth map and the pixels from the lower resolution images that are occluded in the reference viewpoint further includes: shifting pixels from the decoded image and the occluded pixels in the metadata to the different viewpoint based upon the depths of the pixels; determining pixel occlusions; and generating an image from the different viewpoint using the shifted pixels that are not occluded and by interpolating to fill in missing pixels using adjacent pixels that are not occluded.

In a yet further additional embodiment, the image rendered from the different viewpoint is part of a stereo pair of images.

In yet another additional embodiment, the metadata in the light field image file further comprises a confidence map for the depth map, where the confidence map indicates the reliability of the depth values provided for pixels by the depth map, and rendering an image from a different viewpoint using the depth map and the pixels from the lower resolution images that are occluded in the reference viewpoint further comprises applying at least one filter based upon the confidence map.

In a further additional embodiment again, the metadata in the light field image file further comprises an edge map that indicates pixels in the decoded image that lie on a discontinuity, and rendering an image from a different viewpoint using the depth map and the pixels from the lower resolution images that are occluded in the reference viewpoint further comprises applying at least one filter based upon the edge map.

In another additional embodiment again, the edge map identifies whether a pixel lies on an intensity discontinuity.

In a still yet further embodiment again, the edge map identifies whether a pixel lies on an intensity and depth discontinuity.

In still yet another embodiment again, the edge map is encoded in accordance with the JPEG standard using lossless compression, and the rendering application configures the processor to: locate at least one Application marker segment containing the metadata comprising the edge map; and decode the edge map using the JPEG decoder.

In a still yet further additional embodiment, the metadata in the light field image file further comprises a missing pixel map that indicates pixels in the decoded image that do not correspond to a pixel from the plurality of low resolution images of the scene and that are generated by interpolating pixel values from adjacent pixels in the synthesized image, and rendering an image from a different viewpoint using the depth map and the pixels from the lower resolution images that are occluded in the reference viewpoint further comprises ignoring pixels based upon the missing pixel map.

In still yet another additional embodiment, the missing pixel map is encoded in accordance with the JPEG standard using lossless compression, and the rendering application configures the processor to: locate at least one Application marker segment containing the metadata comprising the missing pixel; and decode the missing pixel map using the JPEG decoder.

An embodiment of the method of the invention includes locating an encoded image within an light field image file using a rendering device, decoding the encoded image using the rendering device, locating the metadata within the light field image file using the rendering device, and post processing the decoded image by modifying the pixels based on the depths indicated within the depth map to create a rendered image using the rendering device.

In a further embodiment of the method of the invention, post processing the decoded image by modifying the pixels based on the depths indicated within the depth map to create the rendered image comprises applying a depth based effect to the pixels of the decoded image using the rending device.

In another embodiment of the method of the invention, the depth based effect comprises at least one effect selected from the group consisting of: modifying the focal plane of the decoded image using the rendering device; modifying the depth of field of the decoded image using the rendering device; modifying the blur in out-of-focus regions of the decoded image using the rendering device; locally varying the depth of field of the decoded image using the rendering device; creating multiple focus areas at different depths within the decoded image using the rendering device; and applying a depth related blur using the rendering device.

In a still further embodiment of the method of the invention, the encoded image is an image of a scene synthesized from a reference viewpoint using a plurality of lower resolution images that capture the scene from different viewpoints, the metadata in the light field image file further comprises pixels from the lower resolution images that are occluded in the reference viewpoint, and post processing the decoded image by modifying the pixels based on the depths indicated within the depth map to create the rendered image comprises using the depth map and the pixels from the lower resolution images that are occluded in the reference viewpoint to render an image from a different viewpoint using the rendering device.

Another further embodiment of the invention includes a machine readable medium containing processor instructions, where execution of the instructions by a processor causes the processor to perform a process involving: locating an encoded image within a light field image file, where the light field image file includes an encoded image and metadata describing the encoded image comprising a depth map that specifies depths from the reference viewpoint for pixels in the encoded image; decoding the encoded image; locating the metadata within the light field image file; and post processing the decoded image by modifying the pixels based on the depths indicated within the depth map to create a rendered image.

BRIEF DESCRIPTION OF THE DRAWINGS

FIG. 6 illustrates a “Depth Map, Camera Array and Auxiliary Maps Selection Descriptor” contained within an APP9 Application marker segment of a light field image file that conforms to the JFIF standard in accordance with an embodiment of the invention.

FIG. 7 illustrates a “Depth Map, Camera Array and Auxiliary Maps Compression Descriptor” contained within an APP9 Application marker segment of a light field image file that conforms to the JFIF standard in accordance with an embodiment of the invention.

FIG. 8 illustrates a “Depth Map Attributes” field within a “Depth Map Header” contained within an APP9 Application marker segment of a light field image file that conforms to the JFIF standard in accordance with an embodiment of the invention.

FIG. 9 illustrates a “Depth Map Descriptor” field within a “Depth Map Header” contained within an APP9 Application marker segment of a light field image file that conforms to the JFIF standard in accordance with an embodiment of the invention.

FIG. 10 illustrates a “Depth Map Data Descriptor” contained within an APP9 Application marker segment of a light field image file that conforms to the JFIF standard in accordance with an embodiment of the invention.

FIG. 11 illustrates a “Camera Array Attributes” field within a “Camera Array Header” contained within an APP9 Application marker segment of a light field image file that conforms to the JFIF standard in accordance with an embodiment of the invention.

FIG. 12 illustrates a “Camera Array Descriptor” field within a “Camera Array Header” contained within an APP9 Application marker segment of a light field image file that conforms to the JFIF standard in accordance with an embodiment of the invention.

FIG. 13 illustrates an “Individual Camera Descriptor” contained within an APP9 Application marker segment of a light field image file that conforms to the JFIF standard in accordance with an embodiment of the invention.

FIG. 14 illustrates "Individual Camera Data" within an APP9 Application marker segment of a light field image file that conforms to the JFIF standard in accordance with an embodiment of the invention.

FIG. 15 illustrates an "Individual Pixel Data Structure" within an APP9 Application marker segment of a light field image file that conforms to the JFIF standard in accordance with an embodiment of the invention.

FIG. 16 illustrates an "Auxiliary Map Descriptor" within an "Auxiliary Map Header" contained within an APP9 Application marker segment of a light field image file that conforms to the JFIF standard in accordance with an embodiment of the invention.

FIG. 17 illustrates an "Auxiliary Map Data Descriptor" within an APP9 Application marker segment of a light field image file that conforms to the JFIF standard in accordance with an embodiment of the invention.

DETAILED DESCRIPTION

Figure 1:
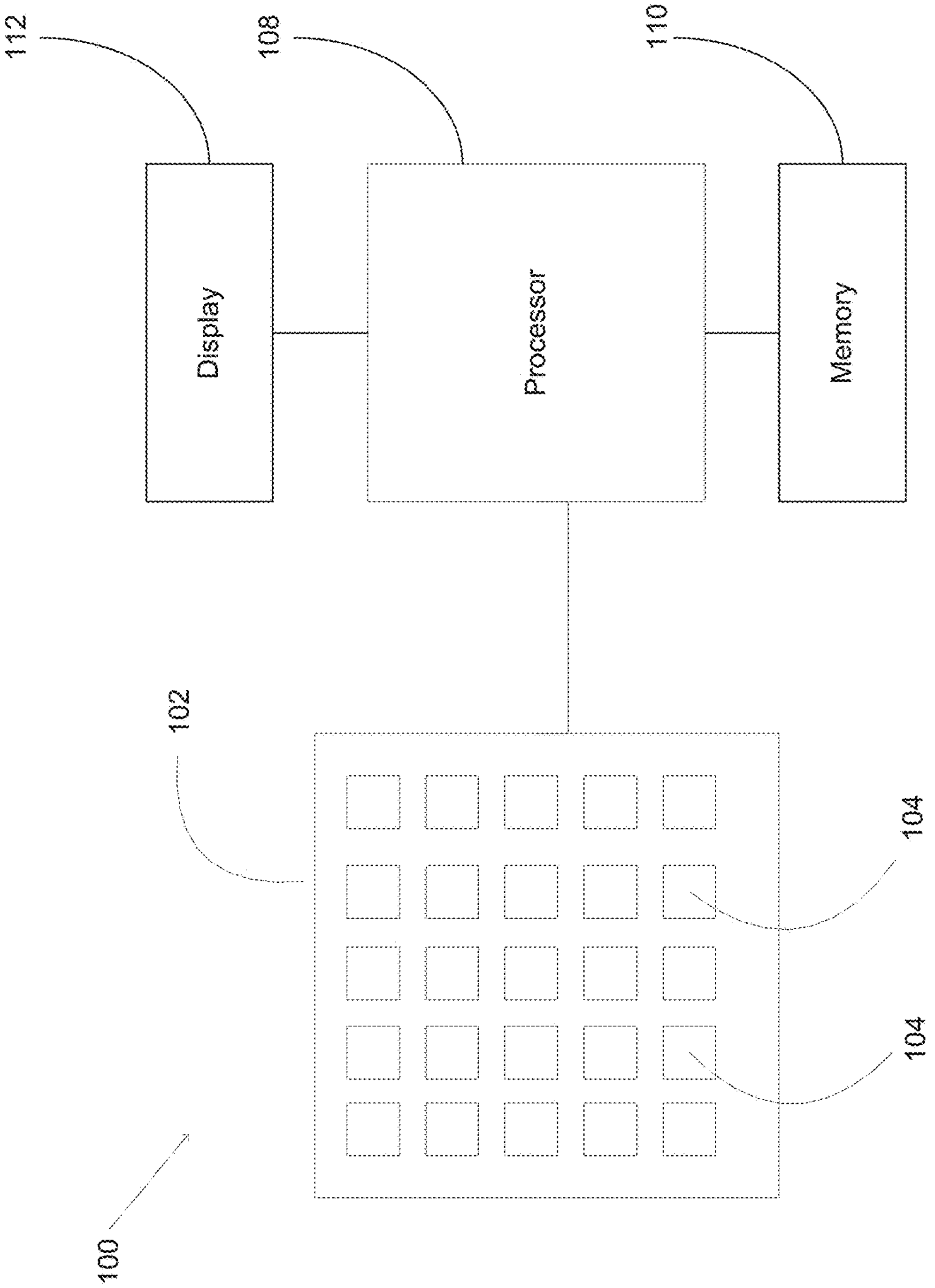
FIG. 1 conceptually illustrates the architecture of an array camera configured to generate light field image files in accordance with embodiments of the invention.

Turning now to the drawings, systems and methods for storing images synthesized from light field image data and metadata describing the images in electronic files and for rendering images using the stored image and the metadata in accordance with embodiments of the invention are illustrated. A file containing an image synthesized from light field image data and metadata derived from the light field image data can be referred to as a light field image file. As is discussed further below, the encoded image in a light field image file is typically synthesized using a super resolution process from a number of lower resolution images. The light field image file can also include metadata describing the synthesized image derived from the light field image data that enables post processing of the synthesized image. In many embodiments, a light field image file is created by encoding an image synthesized from light field image data and combining the encoded image with a depth map derived from the light field image data. In several embodiments, the encoded image is synthesized from a reference viewpoint and the metadata includes information concerning pixels in the light field image that are occluded from the reference viewpoint. In a number of embodiments, the metadata can also include additional information including (but not limited to) auxiliary maps such as confidence maps, edge maps, and missing pixel maps that can be utilized during post processing of the encoded image to improve the quality of an image rendered using the light field image data file.

In many embodiments, the light field image file is compatible with the JPEG File Interchange Format (JFIF). The synthesized image is encoded as a JPEG bitstream and stored within the file. The accompanying depth map, occluded pixels and/or any appropriate additional information including (but not limited to) auxiliary maps are then stored within the JFIF file as metadata using an Application marker to identify the metadata. A legacy rendering device can simply display the synthesized image by decoding the JPEG bitstream. Rendering devices in accordance with embodiments of the invention can perform additional post-processing on the decoded JPEG bitstream using the depth map and/or any available auxiliary maps. In many embodiments, the maps included in the metadata can also be compressed using lossless JPEG encoding and decoded using a JPEG decoder. Although much of the discussion that follows references the JFIF and JPEG standards, these standards are simply discussed as examples and it should be appreciated that similar techniques can be utilized to embed metadata derived from light field image data used to synthesize the encoded image within a variety of standard file formats, where the synthesized image and/or maps are encoded using any of a variety of standards based image encoding processes.

By transmitting a light field image file including an encoded image, and metadata describing the encoded image, a rendering device (i.e. a device configured to generate an image rendered using the information within the light field image file) can render new images using the information within the file without the need to perform super resolution processing on the original light field image data. In this way, the amount of data transmitted to the rendering device and the computational complexity of rendering an image is reduced. In several embodiments, rendering devices are configured to perform processes including (but not limited to) refocusing the encoded image based upon a focal plane specified by the user, synthesizing an image from a different viewpoint, and generating a stereo pair of images. The capturing of light field image data and the encoding and decoding of light field image files in accordance with embodiments of the invention are discussed further below.

Capturing Light Field Image Data

A light field, which is often defined as a 4D function characterizing the light from all direction at all points in a scene, can be interpreted as a two-dimensional (2D) collection of 2D images of a scene. Array cameras, such as those described in U.S. patent application Ser. No. 12/935,504 entitled "Capturing and Processing of Images using Monolithic Camera Array with Heterogeneous Imagers" to Venkataraman et al., can be utilized to capture light field images. In a number of embodiments, super resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the cameras in the array camera. A high resolution image synthesized using super resolution processing is synthesized from a specific viewpoint that can be referred to as a reference viewpoint. The reference viewpoint can be from the viewpoint of one of the cameras in a camera array. Alternatively, the reference viewpoint can be an arbitrary virtual viewpoint.

Due to the different viewpoint of each of the cameras, parallax results in variations in the position of foreground objects within the images of the scene. Processes for performing parallax detection are discussed in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. As is disclosed in U.S. Provisional Patent Application Ser. No. 61/691,666, a depth map from a reference viewpoint can be generated by determining the disparity between the pixels in the images within a light field due to parallax. A depth map indicates the distance of the surfaces of scene objects from a reference viewpoint. In a number of embodiments, the computational complexity of generating depth maps is reduced by generating an initial low resolution depth map and then increasing the resolution of the depth map in regions where additional depth information is desirable such as (but not limited to) regions involving depth transitions and/or regions containing pixels that are occluded in one or more images within the light field.

During super resolution processing, a depth map can be utilized in a variety of ways. U.S. patent application Ser. No. 12/967,807 describes how a depth map can be utilized during super resolution processing to dynamically refocus a synthesized image to blur the synthesized image to make portions of the scene that do not lie on the focal plane to appear out of focus. U.S. patent application Ser. No. 12/967,807 also describes how a depth map can be utilized during super resolution processing to generate a stereo pair of higher resolution images for use in 3D applications. A depth map can also be utilized to synthesize a high resolution image from one or more virtual viewpoints. In this way, a rendering device can simulate motion parallax and a dolly zoom (i.e. virtual viewpoints in front or behind the reference viewpoint). In addition to utilizing a depth map during super-resolution processing, a depth map can be utilized in a variety of post processing processes to achieve effects including (but not limited to) dynamic refocusing, generation of stereo pairs, and generation of virtual viewpoints without performing super-resolution processing. Light field image data captured by array cameras, storage of the light field image data in a light field image file, and the rendering of images using the light field image file in accordance with embodiments of the invention are discussed further below.

Array Camera Architecture

Array cameras in accordance with embodiments of the invention are configured so that the array camera software can control the capture of light field image data and can capture the light field image data into a file that can be used to render one or more images on any of a variety of appropriately configured rendering devices. An array camera including an imager array in accordance with an embodiment of the invention is illustrated in FIG. 1. The array camera 100 includes a sensor 102 having an array of focal planes 104 and which is configured to communicate with a processor 108. The processor is also configured to communicate with one or more different types of memory 110 that can be utilized to store image data and/or contain machine readable instructions utilized to configure the processor to perform processes including (but not limited to) the various processes described below. The array camera 100 also includes a display 112 that can be utilized by the processor 108 to present a user interface to a user and to display an image rendered using the light field image data. Although the processor is illustrated as a single processor, array cameras in accordance with embodiments of the invention can utilize a single processor or multiple processors including (but not limited to) a graphics processing unit (GPU).

In the illustrated embodiment, the processor receives image data generated by the sensor and reconstructs the light field captured by the sensor from the image data. The processor can manipulate the light field in any of a variety of different ways including (but not limited to) determining the depth and visibility of the pixels in the light field and synthesizing higher resolution 2D images from the image data of the light field. Sensors including multiple focal planes are discussed in U.S. patent application Ser. No. 13/106,797 entitled "Architectures for System on Chip Array Cameras", to Pain et al., the disclosure of which is incorporated herein by reference in its entirety.

In the illustrated embodiment, the focal planes are configured in a 5×5 array. Each focal plane 104 on the sensor is capable of capturing an image of the scene. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In many embodiments, an array of images (i.e. a light field) is created using the image data captured by the focal planes in the sensor. As noted above, processors 108 in accordance with many embodiments of the invention are configured using appropriate software to take the image data within the light field and synthesize one or more high resolution images. In several embodiments, the high resolution image is synthesized from a reference viewpoint, typically that of a reference focal plane 104 within the sensor 102. In many embodiments, the processor is able to synthesize an image from a virtual viewpoint, which does not correspond to the viewpoints of any of the focal planes 104 in the sensor 102. Unless all of the objects within a captured scene are a significant distance from the array camera, the images in the light field will include disparity due to the different fields of view of the focal planes used to capture the images. Processes for detecting and correcting for disparity when performing super-resolution processing in accordance with embodiments of the invention are discussed in U.S. Provisional Patent Application Ser. No. 61/691,666 (incorporated by reference above). The detected disparity can be utilized to generate a depth map. The high resolution image and depth map can be encoded and stored in memory 110 in a light field image file. The processor 108 can use the light field image file to render one or more high resolution images. The processor 108 can also coordinate the sharing of the light field image file with other devices (e.g. via a network connection), which can use the light field image file to render one or more high resolution images.

Although a specific array camera architecture is illustrated in FIG. 1, alternative architectures can also be utilized in accordance with embodiments of the invention. Systems and methods for encoding high resolution images and depth maps for storage in electronic files in accordance with embodiments of the invention are discussed below.

Capturing and Storing Light Field Image Data

Processes for capturing and storing light field image data in accordance with many embodiments of the invention involve capturing light field image data, generating a depth map from a reference viewpoint, and using the light field image data and the depth map to synthesize an image from the reference viewpoint. The synthesized image can then be compressed for storage. The depth map and additional data that can be utilized in the post processing can also be encoded as metadata that can be stored in the same container file with the encoded image.

Figure 2:
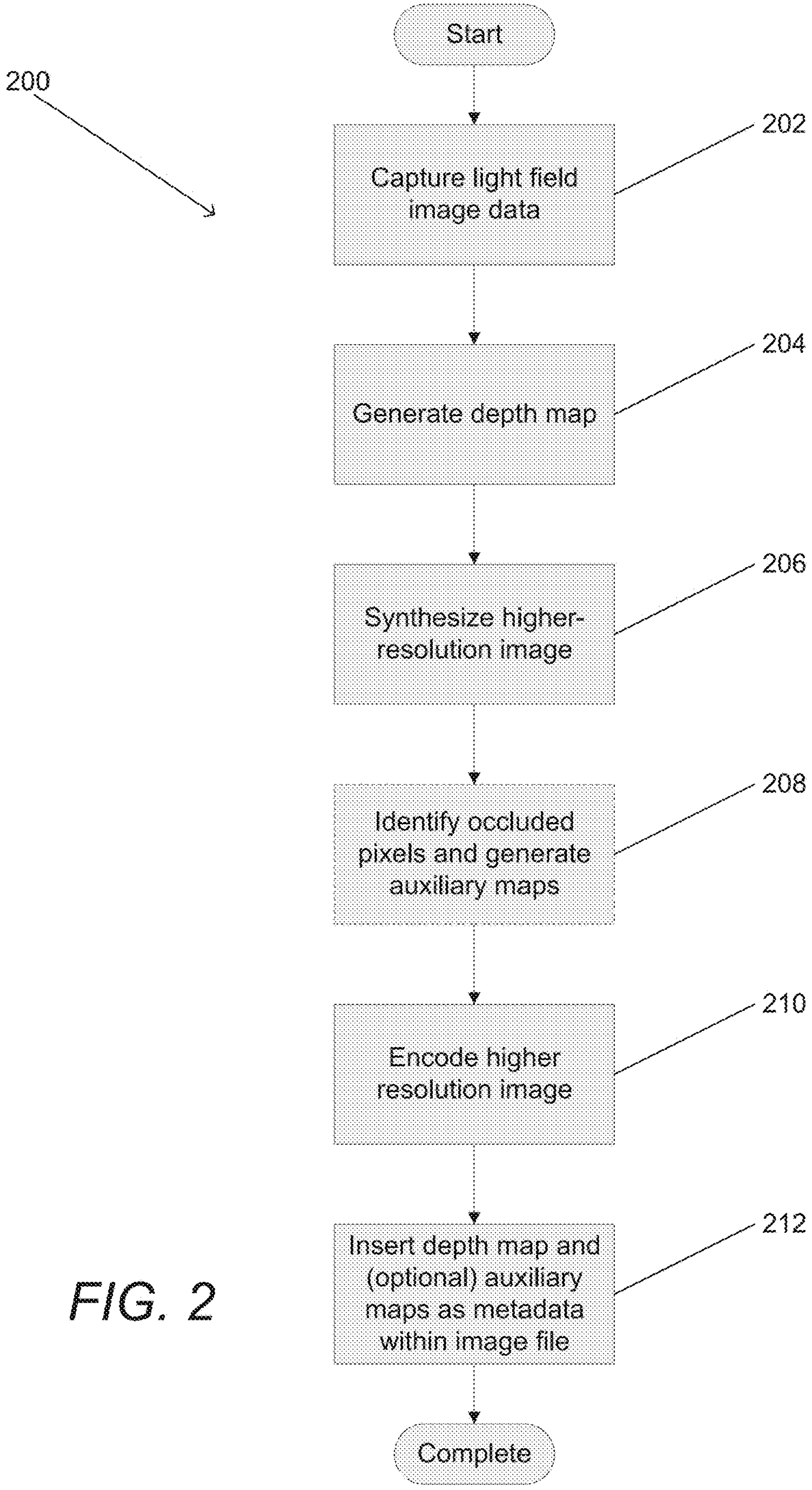
FIG. 2 is a flow chart of a process for creating a light field image file including an image synthesized from light field image data and a depth map for the synthesized image generated using the light field image data in accordance with an embodiment of the invention.

A process for capturing and storing light field image data in accordance with an embodiment of the invention is illustrated in FIG. 2. The process 200 includes capturing (202) light field image data. In several embodiments, the light field image data is captured using an array camera similar to the array cameras described above. In other embodiments, any of a variety of image capture device(s) can be utilized to capture light field image data. The light field image data is used to generate (204) a depth map. A depth map can be generated using any of a variety of techniques including (but not limited to) using any of the processes disclosed in U.S. Provisional Patent Application Ser. No. 61/691,666 or U.S. patent application Ser. No. 13/623,091 entitled "Systems and Methods for Determining Depth from Multiple Views of a Scene that Include Aliasing Using Hypothesized Fusion", to Venkatarman et al. The disclosure of U.S. patent Ser. No. 13/623,091 is incorporated by reference herein in its entirety.

The light field image data and the depth map can be utilized to synthesize (206) an image from a specific viewpoint. In many embodiments, the light field image data includes a number of low resolution images that are used to synthesize a higher resolution image using a super resolution process. In a number of embodiments, a super resolution process such as (but not limited to) any of the super resolution processes disclosed in U.S. patent application Ser. No. 12/967,807 can be utilized to synthesize a higher resolution image from the reference viewpoint.

In order to be able to perform post processing to modify the synthesized image without the original light field image data, metadata can be generated (208) from the light field image data, the synthesized image, and/or the depth map. The metadata data can be included in a light field image file and utilized during post processing of the synthesized image to perform processing including (but not limited to) refocusing the encoded image based upon a focal plane specified by the user, and synthesizing one or more images from a different viewpoint. In a number of embodiments, the auxiliary data includes (but is not limited to) pixels in the light field image data occluded from the reference viewpoint used to synthesize the image from the light field image data, one or more auxiliary maps including (but not limited to) a confidence map, an edge map, and/or a missing pixel map.

Auxiliary data that is formatted as maps or layers provide information corresponding to pixel locations within the synthesized image. A confidence map is produced during the generation of a depth map and reflects the reliability of the depth value for a particular pixel. This information may be used to apply different filters in areas of the image and improve image quality of the rendered image. An edge map defines which pixels are edge pixels, which enables application of filters that refine edges (e.g. post sharpening). A missing pixel map represents pixels computed by interpolation of neighboring pixels and enables selection of post-processing filters to improve image quality. As can be readily appreciated, the specific metadata generated depends upon the post processing supported by the image data file. In a number of embodiments, no auxiliary data is included in the image data file.

In order to generate an image data file, the synthesized image is encoded (210). The encoding typically involves compressing the synthesized image and can involve lossless or lossy compression of the synthesized image. In many embodiments, the depth map and any auxiliary data are written (212) to a file with the encoded image as metadata to generate a light field image data file. In a number of embodiments, the depth map and/or the auxiliary maps are encoded. In many embodiments, the encoding involves lossless compression.

Although specific processes for encoding light field image data for storage in a light field image file are discussed above, any of a variety of techniques can be utilized to process light field image data and store the results in an image file including but not limited to processes that encode low resolution images captured by an array camera and calibration information concerning the array camera that can be utilized in super resolution processing. Storage of light field image data in JFIF files in accordance with embodiments of the invention is discussed further below.

Image Data Formats

In several embodiments, the encoding of a synthesized image and the container file format utilized to create the light field image file are based upon standards including but not limited to the JPEG standard (ISO/IEC 10918-1) for encoding a still image as a bitstream and the JFIF standard (ISO/IEC 10918-5). By utilizing these standards, the synthesized image can be rendered by any rendering device configured to support rendering of JPEG images contained within JFIF files. In many embodiments, additional data concerning the synthesized image such as (but not limited to) a depth map and auxiliary data that can be utilized in the post processing of the synthesized image can be stored as metadata associated with an Application marker within the JFIF file. Conventional rendering devices can simply skip Application markers containing this metadata. Rendering device in accordance with many embodiments of the invention can decode the metadata and utilize the metadata in any of a variety of post processing processes.

Figure 3:
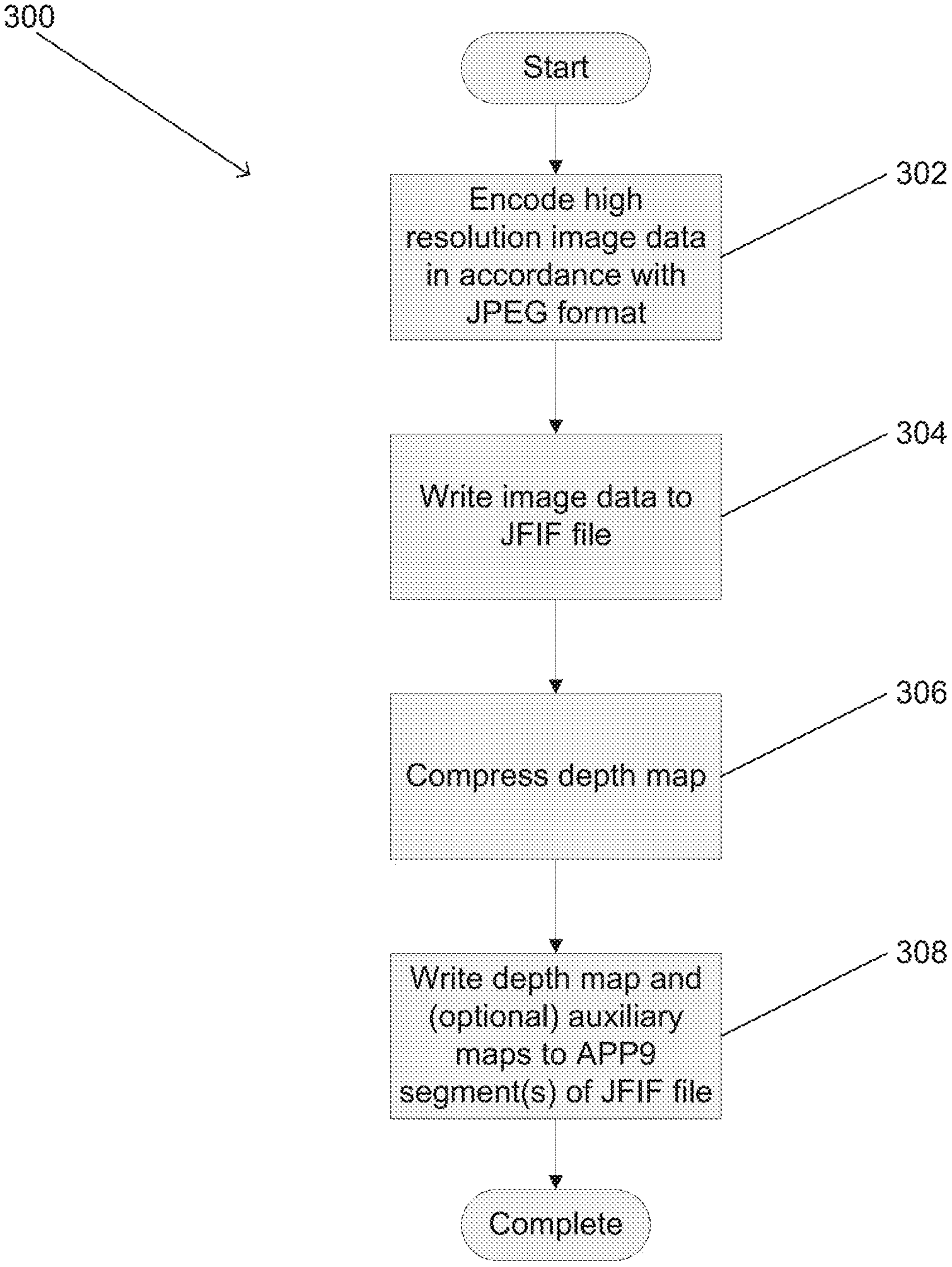
FIG. 3 is a process for creating a light field image file that conforms to the JFIF standard and that includes an image encoded in accordance with the JPEG standard in accordance with an embodiment of the invention.

A process for encoding an image synthesized using light field image data in accordance with the JPEG specification and for including the encoded image and metadata that can be utilized in the post processing of the image in a JFIF file in accordance with an embodiment of the invention is illustrated in FIG. 3. The process 300 includes encoding (302) an image synthesized from light field image data in accordance with the JPEG standard. The image data is written (304) to a JFIF file. A depth map for the synthesized image is compressed (306) and the compressed depth map and any additional auxiliary data are written (308) as metadata to an Application marker segment of the JFIF file containing the encoded image. Where the auxiliary data includes maps, the maps can also be compressed by encoding the maps in accordance with the JPEG standard. At which point, the JFIF file contains an encoded image and metadata that can be utilized to perform post processing on the encoded image in ways that utilize the additional information captured in the light field image data utilized to synthesize the high resolution image (without the need to perform super resolution processing on the underlying light field image data).

Although specific processes are discussed above for storing light field image data in JFIF files, any of a variety of processes can be utilized to encode synthesized images and additional metadata derived from the light field image data used to synthesize the encoded images in a JFIF file as appropriate to the requirements of a specific application in accordance with embodiments of the invention. The encoding of synthesized images and metadata for insertion into JFIF files in accordance with embodiments of the invention are discussed further below. Although much of the discussion that follows relates to JFIF files, synthesized images and metadata can be encoded for inclusion in a light field image file using any of a variety of proprietary or standards based encoding techniques and/or utilizing any of a variety of proprietary or standards based file formats.

Encoding Images Synthesized from Light Field Image Data

An image synthesized from light field image data using super resolution processing can be encoded in accordance with the JPEG standard for inclusion in a light field image file in accordance with embodiments of the invention. The JPEG standard is a lossy compression standard. However, the information losses typically do not impact edges of objects. Therefore, the loss of information during the encoding of the image typically does not impact the accuracy of maps generated based upon the synthesized image (as opposed to the encoded synthesized image). The pixels within images contained within files that comply with the JFIF standard are typically encoded as YCbCr values. Many array cameras synthesize images, where each pixel is expressed in terms of a Red, Green and Blue intensity value. In several embodiments, the process of encoding the synthesized image involves mapping the pixels of the image from the RGB domain to the YCbCr domain prior to encoding. In other embodiments, mechanisms are used within the file to encode the image in the RGB domain. Typically, encoding in the YCbCr domain provides better compression ratios and encoding in the RGB domain provides higher decoded image quality.

Storing Additional Metadata Derived from Light Field Image Data

The JFIF standard does not specify a format for storing depth maps or auxiliary data generated by an array camera. The JFIF standard does, however, provide sixteen Application markers that can be utilized to store metadata concerning the encoded image contained within the file. In a number of embodiments, one or more of the Application markers of a JFIF file is utilized to store an encoded depth map and/or one or more auxiliary maps that can be utilized in the post processing of the encoded image contained within the file.

Figures 4, 5:
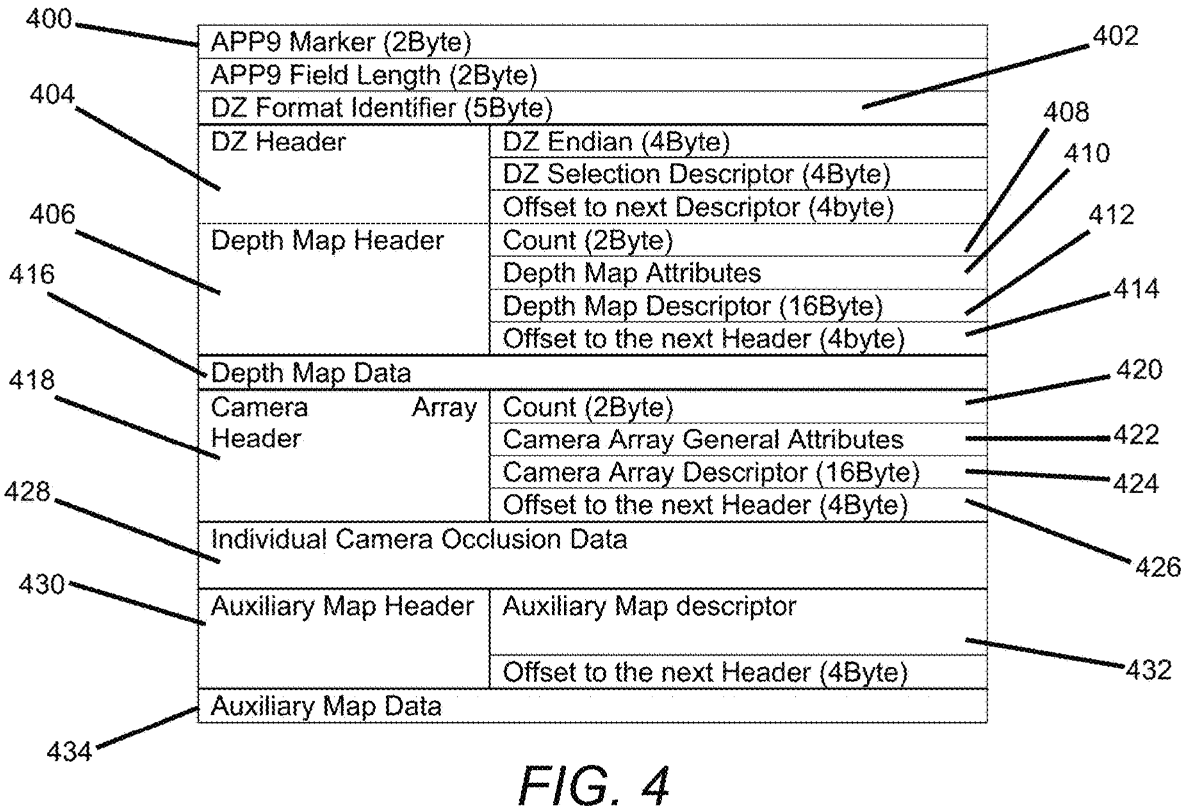
FIG. 4 illustrates an APP9 Application marker segment of a light field image file that conforms to the JFIF standard in accordance with an embodiment of the invention.
FIG. 5 illustrates a “DZ Selection Descriptor” contained within an APP9 Application marker segment of a light field image file that conforms to the JFIF standard in accordance with an embodiment of the invention.

A JFIF Application marker segment that can be utilized to store a depth map, individual camera occlusion data and auxiliary map data in accordance with an embodiment of the invention is illustrated in FIG. 4. The APP9 Application marker segment 400 uses a format identifier 402 that uniquely identifies that the Application marker segment contains metadata describing an image synthesized using light field image data. In a number of embodiments, the identifier is referred to as the "DZ Format Identifier" 402 and is expressed as the zero terminated string "PIDZO".

The Application marker segment includes a header 404 indicated as "DZ Header" that provides a description of the metadata contained within the Application marker segment. In the illustrated embodiment, the "DZ Header" 404 includes a DZ Endian field that indicates whether the data in the "DZ Header" is big endian or little endian. The "DZ Header" 404 also includes a "DZ Selection Descriptor".

An embodiment of a "DZ Selection Descriptor" is illustrated in FIG. 5, which includes four bytes. The first two bytes (i.e. bytes 0 and 1) contain information concerning the metadata describing the encoded image that are present (see FIG. 6) and the manner in which the different pieces of metadata are compressed (see FIG. 7). In the illustrated embodiment, the types of metadata that are supported are a depth map, occluded pixel data, virtual view point data, a missing pixel map, a regular edge map, a silhouette edge map, and/or a confidence map. In other embodiments, any of a variety of metadata describing an encoded image obtained from the light field image data used to synthesize the image can be included in the metadata contained within a JFIF file in accordance with an embodiment of the invention. In many instances, the metadata describing the encoded image can include maps that can be considered to be monochrome images that can be encoded using JPEG encoding. In a number of embodiments, the maps can be compressed using lossless JPEG LS encoding. In several embodiments, the maps can be compressed using lossy JPEG encoding. Utilizing JPEG encoding to compress the maps reduces the size of the maps and enables rendering devices to leverage a JPEG decoder to both decode the image contained within the JFIF file and the maps describing the encoded image. The third byte (i.e. byte 2) of the "DZ Selection Descriptor" indicates the number of sets of metadata describing the encoded image that are contained within the Application marker segment and the fourth byte is reserved. Although specific implementations of the header 404 describing the metadata contained within the Application marker segment are illustrated in FIGS. 4-7, any of a variety of implementations can be utilized to identify the maps describing the synthesized image that are present within the metadata contained within an light field image file as appropriate to the requirements of the application in accordance with embodiments of the invention.

Depth Map

Referring back to FIG. 4, the Application marker segment also includes a "Depth Map Header" 406 that describes depth map 416 included within the Application marker segment. The "Depth Map Header" 406 includes an indication 408 of the size of "Depth Map Attributes" 410 included within the "Depth Map Header", the "Depth Map Attributes" 410, and a "Depth Map Descriptor" 412. As noted above, the depth map 416 can be considered to be a monochrome image and lossless or lossy JPEG encoding can be utilized to compress the "Depth Map Data" included in a JFIF file.

A "Depth Map Attributes" table in accordance with an embodiment of the invention is illustrated in FIG. 8 and includes information concerning the manner in which the depth map should be used to render the encoded image. In the illustrated embodiment, the information contained within the "Depth Map Attributes" table includes the focal plane and the F # of the synthetic aperture to utilize when rendering the encoded image. Although specific pieces of information related to the manner in which the depth map can be utilized to render the encoded image are illustrated in FIG. 8, any of a variety of pieces of information appropriate to the requirements of a specific application can be utilized in accordance with embodiments of the invention.

A "Depth Map Descriptor" in accordance with an embodiment of the invention is illustrated in FIG. 9 and includes metadata describing the depth map. In the illustrated embodiment, the "Depth Map Descriptor" includes a zero terminated identifier string "PIDZDH0" and version information. In other embodiments, any of a variety of pieces of information appropriate to the specific requirements of particular applications can be utilized in accordance with embodiments of the invention.

A JFIF Application marker segment is restricted to 65,533 bytes. However, an Application marker can be utilized multiple times within a JFIF file. Therefore, depth maps in accordance with many embodiments of the invention can span multiple APP9 Application marker segments. The manner in which depth map data is stored within an Application marker segment in a JFIF file in accordance with an embodiment of the invention is illustrated in FIG. 10. In the illustrated embodiment, the depth map data is contained within a descriptor that is uniquely identified using the "PIDZDD0" zero terminated string. The descriptor also includes the length of the descriptor and depth map data.

Although specific implementations of a depth map and header describing a depth map within an Application marker segment of a JFIF file are illustrated in FIGS. 4, 8, 9, and 10, any of a variety of implementations can be utilized to include a depth map describing an encoded image within a JFIF file as appropriate to the requirements of the application in accordance with embodiments of the invention.

Occlusion Data

Referring back to FIG. 4, the Application marker segment also includes a "Camera Array Header" 418 that describes occlusion data 428 for individual cameras within an array camera that captured the light field image data utilized to synthesize the image contained within the light field image file. The occlusion data can be useful in a variety of post processing processes including (but not limited) to process that involve modifying the viewpoint of the encoded image. The "Camera Array Header" 418 includes an indication 420 of the size of a "Camera Array General Attributes" table 422 included within the "Camera Array Header", the "Camera Array General Attributes" table 422, and a "Camera Array Descriptor" 424.

A "Camera Array General Attributes" table in accordance with an embodiment of the invention is illustrated in FIG. 11 and includes information describing the number of cameras and dimensions of a camera array utilized to capture the light field image data utilized to synthesize the image encoded within the JFIF file. In addition, the "Camera Array General Attributes" table can indicate a reference camera position within the array and/or a virtual view position within the array. The "Camera Array General Attributes" table also provides information concerning the number of cameras within the array for which occlusion data is provided within the JFIF file.

A "Camera Array Descriptor" in accordance with an embodiment of the invention is illustrated in FIG. 12 and includes metadata describing the individual camera occlusion data contained within the JFIF file. In the illustrated embodiment, the "Camera Array Descriptor" includes a zero terminated identifier string "PIDZAH0" and version information. In other embodiments, any of a variety of pieces of information appropriate to the specific requirements of particular applications can be utilized in accordance with embodiments of the invention.

In many embodiments, occlusion data is provided on a camera by camera basis. In several embodiments, the occlusion data is included within a JFIF file using an individual camera descriptor and an associated set of occlusion data. An individual camera descriptor that identifies a camera and identifies the number of occluded pixels related to the identified camera described within the JFIF file in accordance with an embodiment of the invention is illustrated in FIG. 13. In the illustrated embodiment, the descriptor is identified using the "PIDZCD0" zero terminated string. The descriptor also includes a camera number that can be utilized to identify a camera within an array camera that captured light field image data utilized to synthesize the encoded image contained within the JFIF file. In addition, the descriptor includes the number of occluded pixels described in the JFIF file and the length (in bytes) of the data describing the occluded pixels. The manner in which the occluded pixel data can be described in accordance with embodiments of the invention is illustrated in FIG. 14. The same descriptor "PDIZCD0" is used to identify the occluded pixel data and the descriptor also includes the number of pixels of occluded data contained within the segment, the length of the data in bytes and an offset to the next marker in addition to the occluded pixel data. Due to the restriction on Application marker segments not exceeding 65,533 bytes in data, the additional information enables a rendering device to reconstruct the occluded pixel data across multiple APP9 application marker segments within a JFIF file in accordance with embodiments of the invention.

A table describing an occluded pixel that can be inserted within a JFIF file in accordance with an embodiment of the invention is illustrated in FIG. 15. The table includes the depth of the occluded pixel, the pixel color of the occluded pixel and the pixel coordinates. In the illustrated embodiment, the pixel color is illustrated as being in the RGB domain. In other embodiments, the pixel color can be expressed in any domain including the YCbCr domain.

Although specific implementations for storing information describing occluded pixel depth within an Application marker segment of a JFIF file are illustrated in FIGS. 4, 13, 14, and 15, any of a variety of implementations can be utilized to include occluded pixel information within a JFIF file as appropriate to the requirements of the application in accordance with embodiments of the invention.

Auxiliary Maps

Referring back to FIG. 4, any of a variety of auxiliary maps can be included in an Application marker segment within a JFIF file in accordance with an embodiment of the invention. The total number of auxiliary maps and the types of auxiliary maps can be indicated in the Application marker segment. Each auxiliary map can be expressed using an "Auxiliary Map Descriptor" 432 and "Auxiliary Map Data" 434. In the illustrated embodiment, the "Auxiliary Map Descriptor" 432 is included in an "Auxiliary Map Header" 430 within the Application marker segment in the JFIF file.

An "Auxiliary Map Descriptor" that describes an auxiliary map contained within a light field image file in accordance with an embodiment of the invention is illustrated in FIG. 16. The "Auxiliary Map Descriptor" includes an identifier, which is the "PIDZAM0" zero terminated string and information specifying the type of auxiliary map and number of bits per pixel in the map. As noted above, any of a variety of auxiliary maps derived from light field image data used to synthesize an encoded image can be included within a JFIF file in accordance with embodiments of the invention.

In the illustrated embodiment, confidence maps, silhouette edge maps, regular edge maps, and missing pixel maps are supported.

"Auxiliary Map Data" stored in a JFIF file in accordance with an embodiment of the invention is conceptually illustrated in FIG. 17. The "Auxiliary Map Data" uses the same "PDIZAD0" zero terminated string identifier and includes the number of pixels of the auxiliary map contained within the segment, the length of the data in bytes and an offset to the next marker in addition to pixels of the auxiliary map. Due to the restriction on Application marker segments not exceeding 65,533 bytes in data, the additional information enables a rendering device to reconstruct the auxiliary map describing the encoded image across multiple APP9 application marker segments within a JFIF file.

Although specific implementations for storing auxiliary maps within an Application marker segment of a JFIF file are illustrated in FIGS. 4, 16, and 17, any of a variety of implementations can be utilized to include auxiliary map information within a JFIF file as appropriate to the requirements of the application in accordance with embodiments of the invention. Various examples of auxiliary maps that can be utilized to provide additional information concerning an encoded image based upon the light field image data utilized to synthesize the encoded image in accordance with embodiments of the invention are discussed below.

Confidence Maps

A confidence map can be utilized to provide information concerning the relative reliability of the information at a specific pixel location. In several embodiments, a confidence map is represented as a complimentary one bit per pixel map representing pixels within the encoded image that were visible in only a subset of the images used to synthesize the encoded image. In other embodiments, a confidence map can utilize additional bits of information to express confidence using any of a variety of metrics including (but not limited to) a confidence measure determined during super resolution processing, or the number of images in which the pixel is visible.

Edge Maps

A variety of edge maps can be provided included (but not limited to) a regular edge map and a silhouette map. A regular edge map is a map that identifies pixels that are on an edge in the image, where the edge is an intensity discontinuity. A silhouette edge maps is a map that identifies pixels that are on an edge, where the edge involves an intensity discontinuity and a depth discontinuity. In several embodiments, each can be expressed as a separate one bit map or the two maps can be combined as a map including two pixels per map. The bits simply signal the presence of a particular type of edge at a specific location to post processing processes that apply filters including (but not limited to) various edge preserving and/or edge sharpening filters.

Missing Pixel Maps

A missing pixel map indicates pixel locations in a synthesized image that do not include a pixel from the light field image data, but instead include an interpolated pixel value. In several embodiments, a missing pixel map can be represented using a complimentary one bit per pixel map. The missing pixel map enables selection of post-processing filters to improve image quality. In many embodiments, a simple interpolation algorithm can be used during the synthesis of a higher resolution from light field image data and the missing pixels map can be utilized to apply a more computationally expensive interpolation process as a post processing process. In other embodiments, missing pixel maps can be utilized in any of a variety of different post processing process as appropriate to the requirements of a specific application in accordance with embodiments of the invention.

Rendering Images Using Light Field Imaging Files

Figure 18:
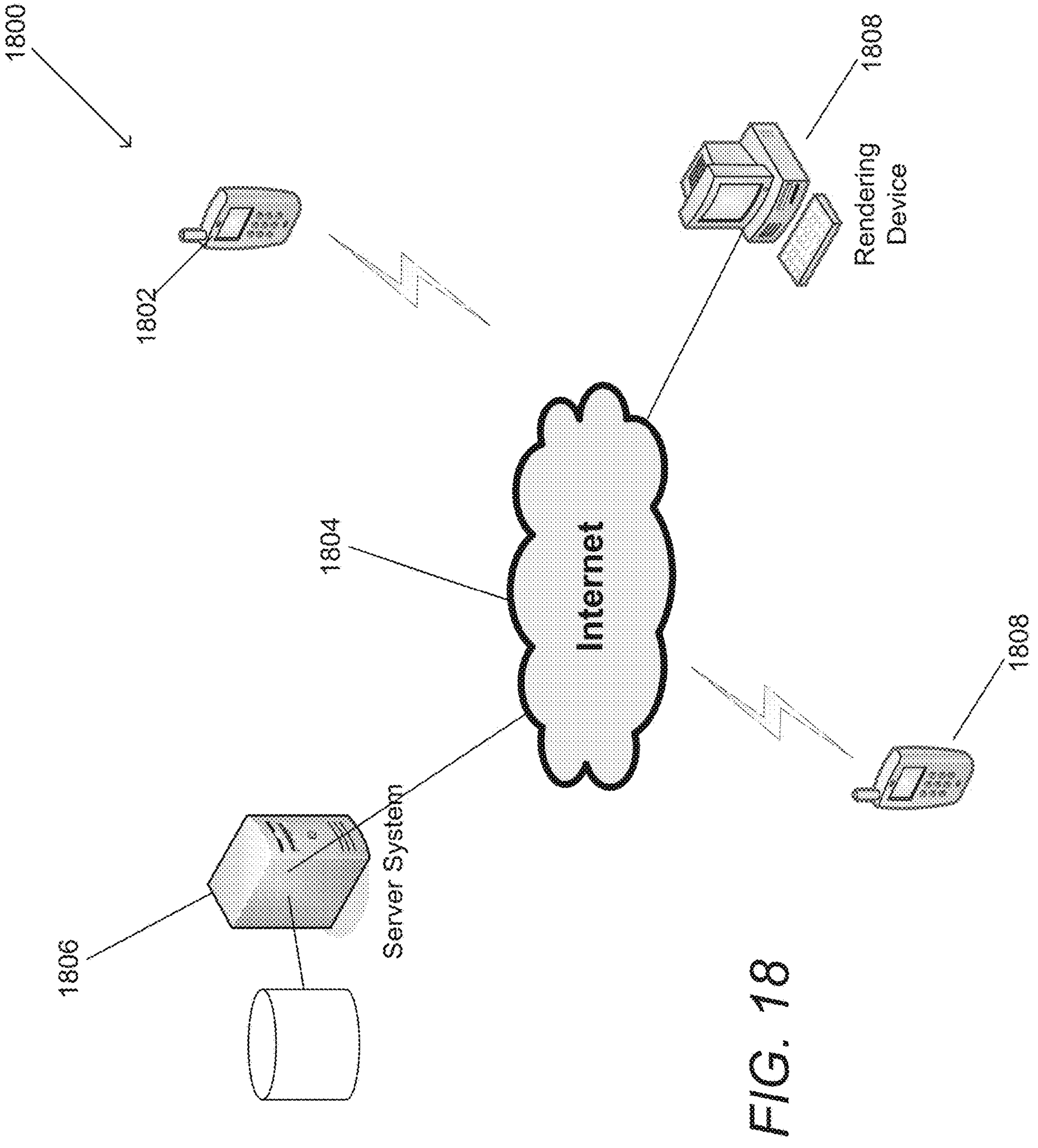
FIG. 18 illustrates a network including at least one encoding device configured to capture light field image data and encode light field image files and to share the light field image file with rendering devices via a network in accordance with an embodiment of the invention.

When light field image data is encoded in a light field image file, the light field image file can be shared with a variety of rendering devices including but not limited to cameras, mobile devices, personal computers, tablet computers, network connected televisions, network connected game consoles, network connected media players, and any other device that is connected to the Internet and can be configured to display images. A system for sharing light field image files in accordance with an embodiment of the invention is illustrated in FIG. 18. The system 1800 includes a mobile device 1802 including an array camera configured to capture light field image data and encode the light field image data in a light field image file. The mobile device 1802 also includes a network interface that enables the transfer of a light field image file to other rendering devices via the Internet 1804. In several embodiments, the light field image file is transferred with the assistance of a server system 1806 that can either store the light field image file for access by other devices or relay the light field image file to other rendering devices. In many embodiments, the server system 1806 provides a user interface that enables users to modify the rendering of the image provided to the device. In several embodiments, the server system 1806 provides the light field image file to a device for rendering. In the illustrated embodiment, a variety of network connected rendering devices 1808 are illustrated including a mobile phone and a personal computer. In other embodiments, any of a variety of network connected and/or disconnected devices can render images using a light field image file in accordance with embodiments of the invention. Rendering devices and processes for rendering images in accordance with embodiments of the invention are discussed further below.

Rendering Devices

A rendering device in accordance with embodiments of the invention typically includes a processor and a rendering application that enables the rendering of an image based upon a light field image data file. The simplest rendering is for the rendering device to decode the encoded image contained within the light field image data file. More complex renderings involve applying post processing to the encoded image using the metadata contained within the light field image file to perform manipulations including (but not limited to) modifying the viewpoint of the image and/or modifying the focal plane of the image.

Figure 19:
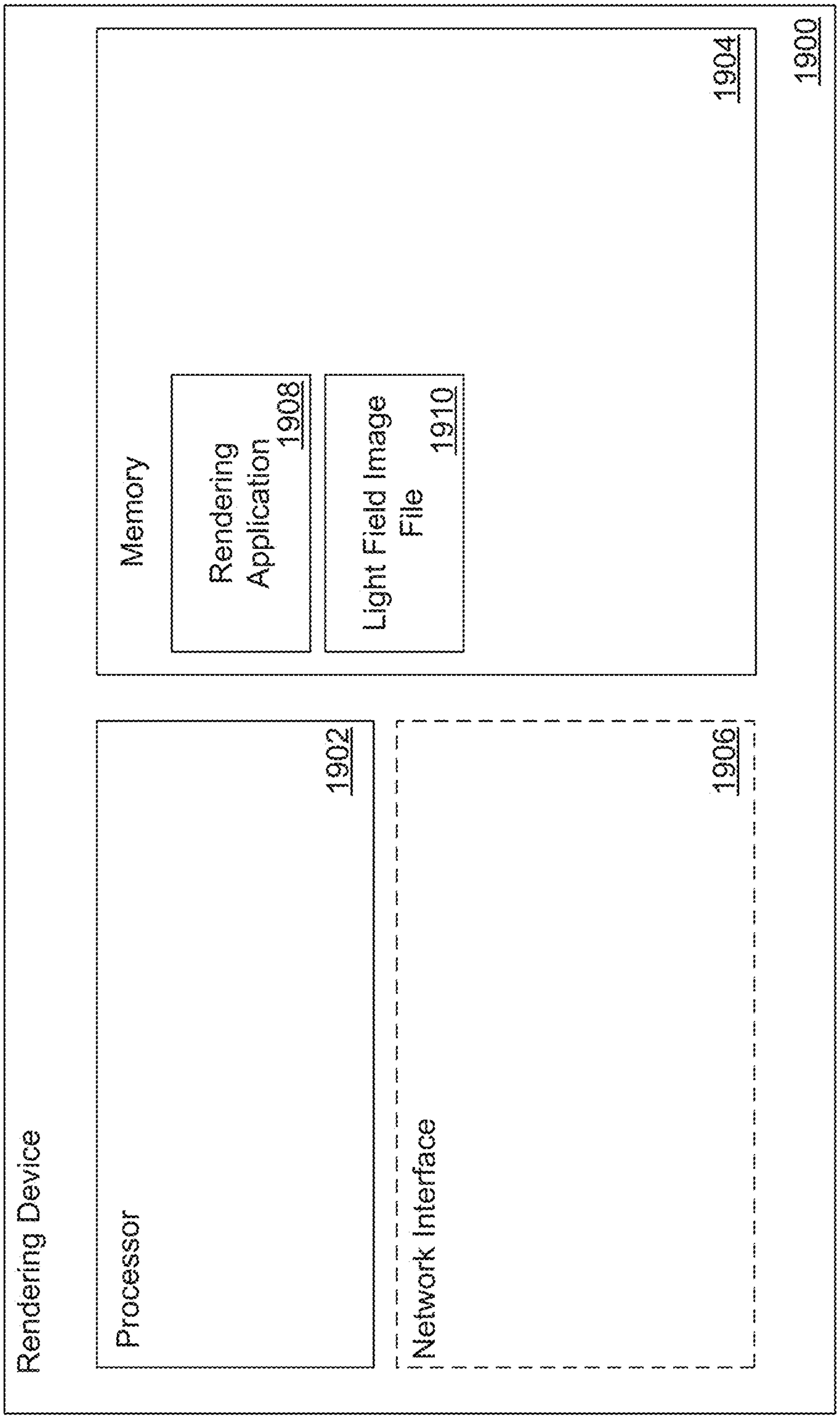
FIG. 19 conceptually illustrates a rendering device configured by a rendering application to render an image using a light field image file.

A rendering device in accordance with an embodiment of the invention is illustrated in FIG. 19. The rendering device 1900 includes a processor 1902, memory 1904, and an optional network interface 1906. The memory contains a rendering application 1908 that is used to configure the microprocessor to render images for display using a light field image file 1910. In the illustrated embodiment, the light field image file is shown stored in memory. In other embodiments, the light field image file can be stored in an external storage device. Although a specific rendering device is illustrated in FIG. 19, any of a variety of rendering devices can be utilized in accordance with embodiments of the invention including (but not limited to) the types of devices that are customarily used to display images using image files. Processes for rendering of images using light field image files in accordance with embodiments of the invention are discussed further below.

Processes for Rendering Images Using Light Field Image Files

Figure 20:
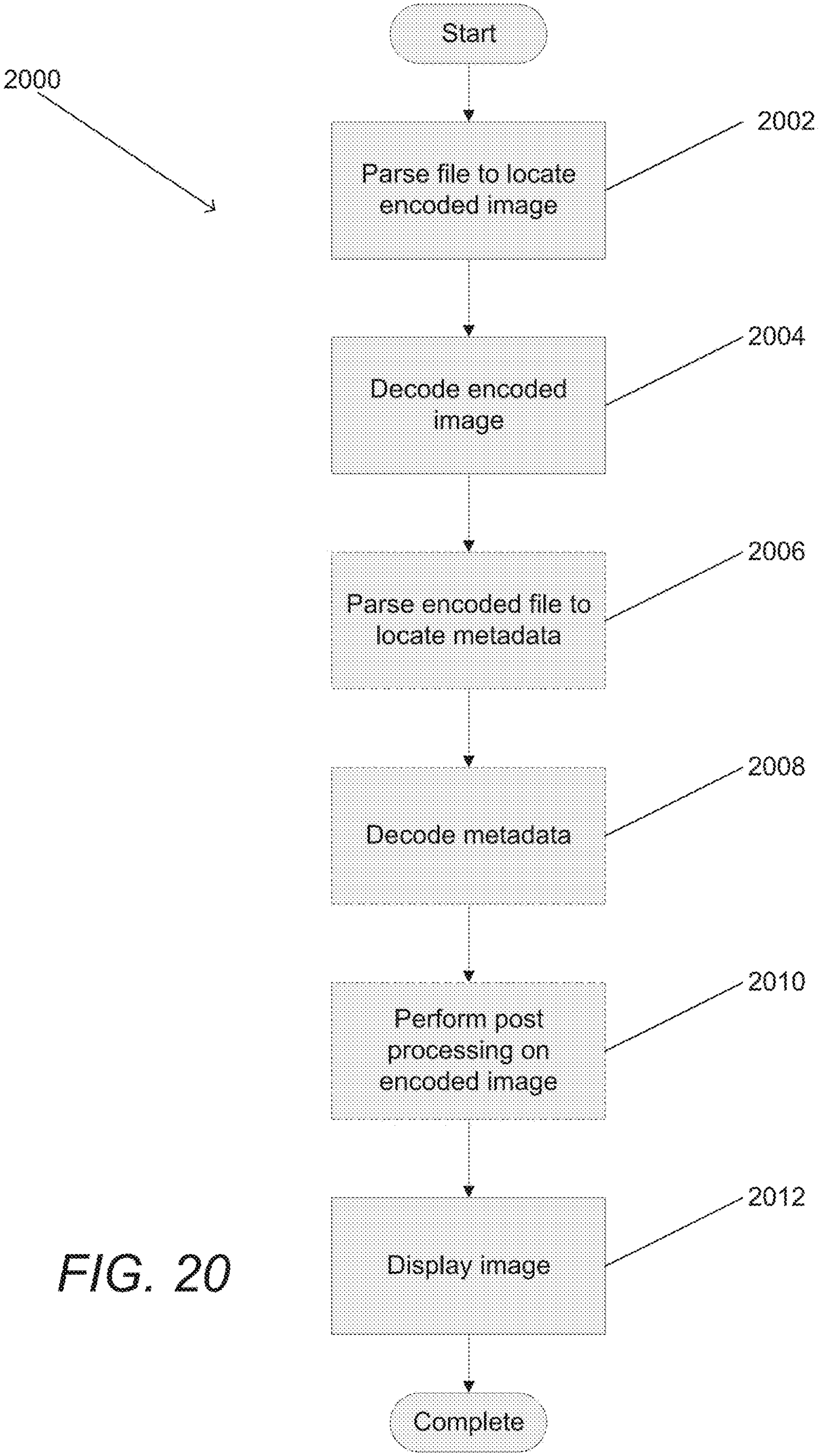
FIG. 20 is a flow chart illustrating a process for rendering an image using a light field image file in accordance with an embodiment of the invention.

As noted above, rendering a light field image file can be as simple as decoding an encoded image contained within the light field image file or can involve more complex post processing of the encoded image using metadata derived from the same light field image data used to synthesize the encoded image. A process for rendering a light field image in accordance with an embodiment of the invention is illustrated in FIG. 20. The process 2000 includes parsing (2002) the light field image file to locate the encoded image contained within the image file. The encoded image file is decoded (2004). As noted above, the image can be encoded using a standards based encoder and so the decoding process can utilize a standards based codec within a rendering device, or the image can be encoded using a proprietary encoding and a proprietary decoder is provided on the rendering device to decode the image. When the process for rendering the image simply involves rendering the image, the decoded image can be displayed. When the process for rendering the image includes post processing, the image file is parsed (2006) to locate metadata within the file that can be utilized to perform the post processing. The metadata is decoded (2008). The metadata can often take the form of maps that can be encoded using standards based image encoders and a standards based decoder present on the rendering device can be utilized to decode the metadata. In other embodiments, a proprietary decoding process is utilized to decode the metadata. The metadata can then be used to perform (2010) the post processing of the encoded image and the image can be displayed (2012). The display of the image can be local. Alternatively the image can be streamed to a remote device or encoded as an image and provided to a remote device for display.

Although specific processes for rendering an image from a light field image file are discussed with reference to FIG. 20, any of a variety of processes appropriate to the requirements of a specific application can be utilized to render an image for display using a light field image file in accordance with an embodiment of the invention. As noted above, any of a variety of standards based encoders and decoders can be utilized in the encoding and decoding of light field image files in accordance with embodiments of the invention. Processes for rendering images using light field image files that conform to the JFIF standard and include an image and/or metadata encoded in accordance with the JPEG standard are discussed further below.

Rendering Images Using JFIF Light Field Image Files

The ability to leverage deployed JPEG decoders can greatly simplify the process of rendering light field images. When a light field image file conforms to the JFIF standard and the image and/or metadata encoded within the light field image file is encoded in accordance with the JPEG standard, a rendering application can leverage an existing implementation of a JPEG decoder to render an image using the light field image file. Similar efficiencies can be obtained where the light field image file includes an image and/or metadata encoded in accordance with another popular standard for image encoding.

Figure 21:
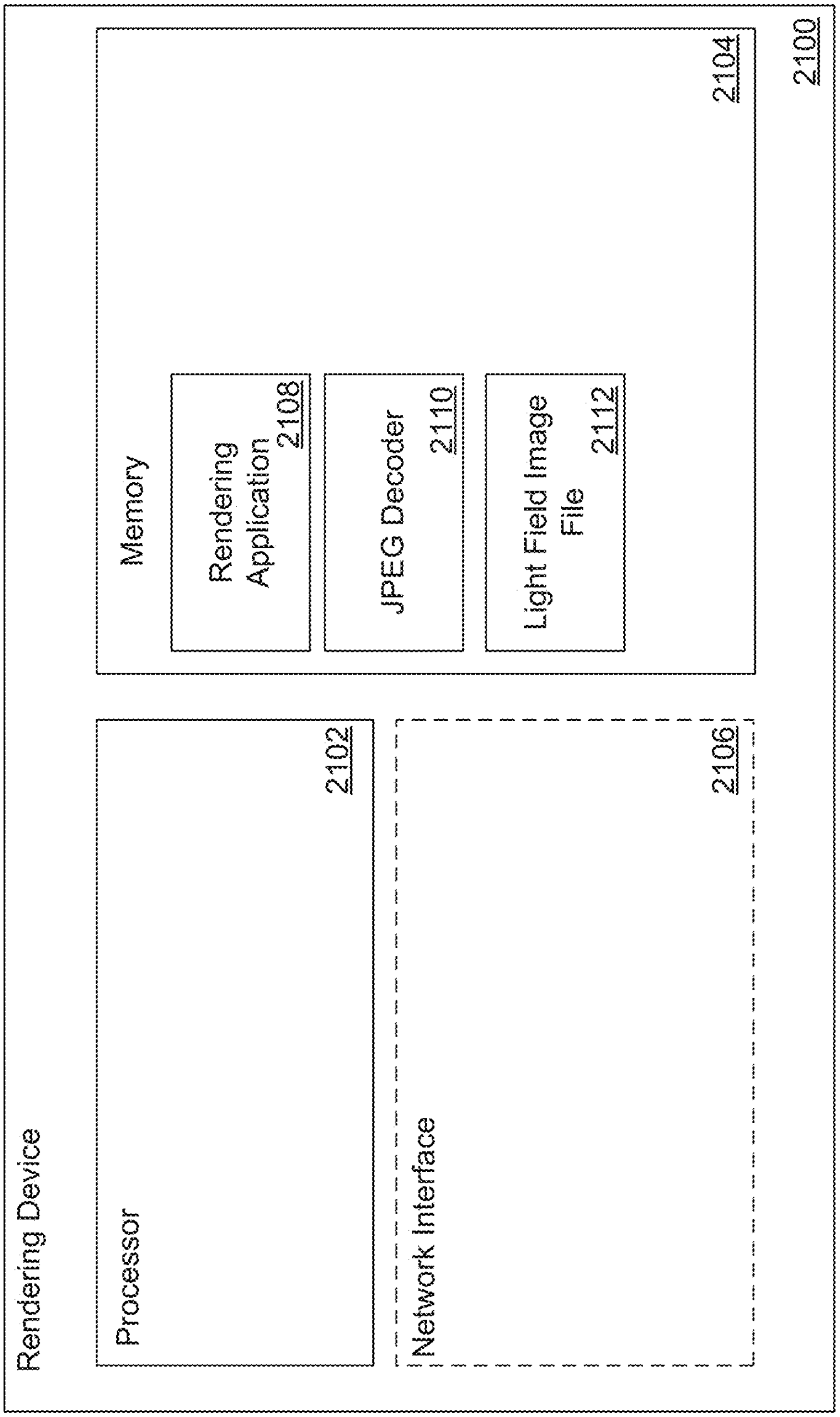
FIG. 21 conceptually illustrates a rendering device configured by a rendering application to render an image using a light field image file containing an image and/or a map encoded in accordance with the JPEG standard.

A rendering device configured by a rendering application to render an image using a light field image file in accordance with an embodiment of the invention is illustrated in FIG. 21. The rendering device 2100 includes a processor 2102, memory 2104, and an optional network interface 2106 that can be utilized to receive light field image files. In the illustrated embodiment, the memory 2104 of the rendering device 2100 includes a rendering application 2108, a JPEG decoder application 2110, and a light field image file 2112 that contains at least one image and/or metadata encoded in accordance with the JPEG standard. The rendering application 2108 configures the processor to parse the light field image file to locate an encoded image and to decode the encoded image using the JPEG decoder application 2110. Similarly, the rendering application can configure the processor to parse the light field image file to locate metadata and to decode encoded maps contained within the metadata using the JPEG decoder.

Although specific rendering devices including JPEG decoders are discussed above with reference to FIG. 21, any of a variety of rendering devices incorporating standards based decoders can be utilized to render images from appropriately encoded light field image files in accordance with embodiments of the invention. Processes for decoding light field image files that confirm with the JFIF standard and that contain at least one image and/or metadata encoded in accordance with the JPEG standard in accordance with embodiments of the invention are discussed further below.

Processes for Rendering Images from JFIF Light Field Image Files

Processes for rending images using light field image files that conform to the JFIF standard can utilize markers within the light field image file to identify encoded images and metadata. Headers within the metadata provide information concerning the metadata present in the file and can provide offset information or pointers to the location of additional metadata and/or markers within the file to assist with parsing the file. Once appropriate information is located a standard JPEG decoder implementation can be utilized to decode encoded images and/or maps within the file.

Figure 22:
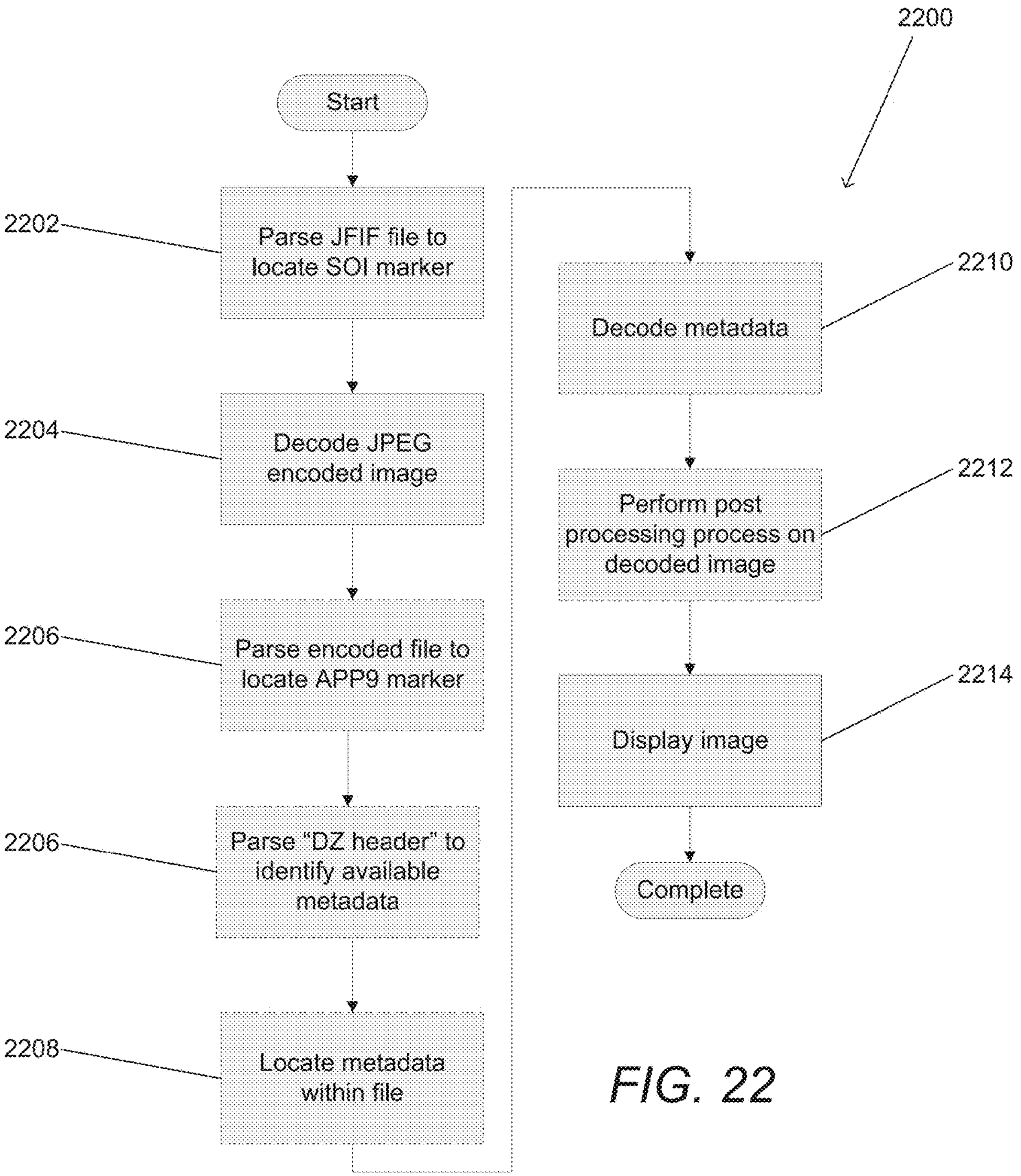
FIG. 22 is a flow chart illustrating a process for rendering an image using a light field image file that conforms to the JFIF standard and includes an image encoded in accordance with the JPEG standard and metadata describing the encoded image.

A process for displaying an image rendered using a light field image file that conforms to the JFIF standard using a JPEG decoder in accordance with an embodiment of the invention is illustrated in FIG. 22. The process 2200 involves parsing (2202) the light field image file to locate a Start of Image (SOI) Marker. The SOI marker is used to locate an image file encoded in accordance with the JPEG format. The encoded image can be decoded (2204) using a JPEG decoder. When no post processing of the decoded image is desired, the image can simply be displayed. Where post processing of the image is desired (e.g. to change the view point of the image and/or the focal plane of the image), the process parses (2206) the light field image file to locate an appropriate Application marker. In the illustrated embodiment, an APP9 marker indicates the presence of metadata within the light field image file. The specific metadata within the file can be determined by parsing (2206) a header within the APP9 Application marker segment that describes the metadata within the file. In the illustrated embodiment, the header is the "DZ Header" within the APP9 Application marker segment. The information within the metadata header can be utilized to locate (2208) specific metadata utilized in a post processing process within the light field image file. In instances where the metadata is encoded, the metadata can be decoded. In many embodiments, metadata describing an encoded image within a light field image file is in the form of a map that provides information concerning specific pixels within an encoded image contained within the light field image file and JPEG encoding is used to compress the map. Accordingly, a JPEG decoder can be utilized to decode the map. The decoded metadata can be utilized to perform (2212) a post processes the decoded image. The image can then be displayed (2214). In many embodiments, the image is displayed on a local display. In a number of embodiments, the image is streamed to a remote display or encoded as an image and forwarded to a remote device for display.

Although specific processes for displaying images rendered using light field image files are discussed above with respect to FIG. 22, any of a variety of processes for parsing a light field image file and decoding images and/or metadata encoded in accordance with the JPEG standard using a JPEG decoder can be utilized in accordance with embodiments of the invention. Much of the discussion above references the use of metadata derived from light field image data and contained within a light field image file to perform post processing processes on an encoded image synthesized from the light field image data. Post processing of images synthesized from light field image data using metadata obtained using the light field image data in accordance with embodiments of the invention are discussed further below.

Post Processing of Images Using Metadata Derived from Light Field Image Data

Images can be synthesized from light field image data in a variety of ways. Metadata included in light field image files in accordance with embodiments of the invention can enable images to be rendered from a single image synthesized from the light field image data without the need to perform super resolution processing. Advantages of rendering images in this way can include that the process of obtaining the final image is less processor intensive and less data is used to obtain the final image. However, the light field image data provides rich information concerning a captured scene from multiple viewpoints. In many embodiments, a depth map and occluded pixels from the light field image data (i.e. pixels that are not visible from the reference viewpoint of the synthesized image) can be included in a light field image file to provide some of the additional information typically contained within light field image data. The depth map can be utilized to modify the focal plane when rendering an image and/or to apply depth dependent effects to the rendered image. The depth map and the occluded pixels can be utilized to synthesize images from different viewpoints. In several embodiments, additional maps are provided (such as, but not limited to, confidence maps, edge maps, and missing pixel maps) that can be utilized when rendering alternative viewpoints to improve the resulting rendered image. The ability to render images from different viewpoints can be utilized to simply render an image from a different viewpoint. In many embodiments, the ability to render images from different viewpoints can be utilized to generate a stereo pair for 3D viewing. In several embodiments, processes similar to those described in U.S. Provisional Patent Application Ser. No. 61/707,691, entitled "Synthesizing Images From Light Fields Utilizing Virtual Viewpoints" to Jain (the disclosure of which is incorporated herein by reference in its entirety) can be utilized to modify the viewpoint based upon motion of a rendering device to create a motion parallax effect. Processes for rendering images using depth based effects and for rendering images using different viewpoints are discussed further below.

Rendering Images Using Depth Based Effects

Figure 23:
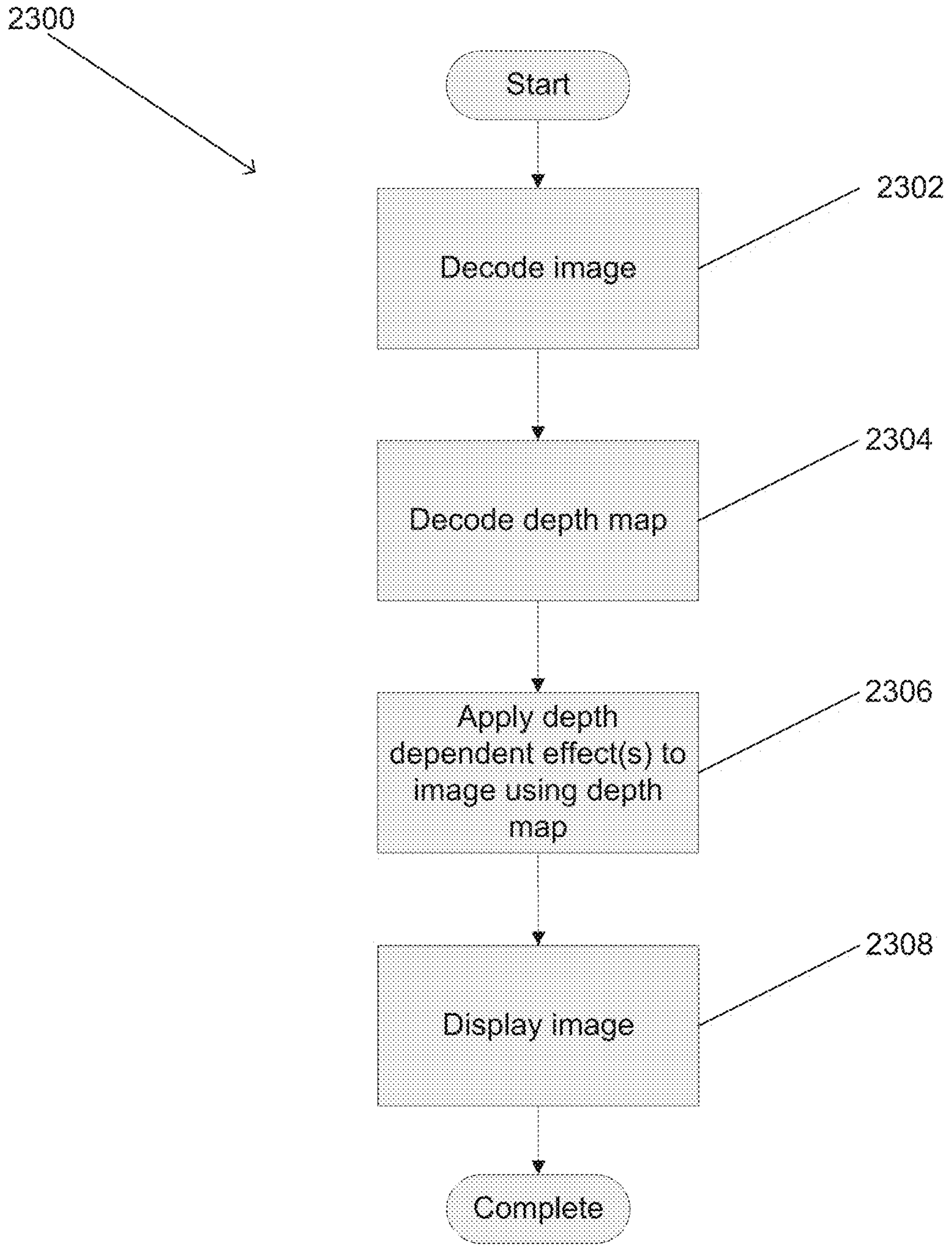
FIG. 23 is a flow chart illustrating a process applying depth dependent effects to an encoded image contained within the light field image file based upon a depth map contained within the light field image file in accordance with an embodiment of the invention.

A variety of depth based effects can be applied to an image synthesized from light field image data in accordance with embodiments of the invention including (but not limited to) applying dynamic refocusing of an image, locally varying the depth of field within an image, selecting multiple in focus areas at different depths, and/or applying one or more depth related blur model. A process for applying depth based effects to an image synthesized from light field image data and contained within a light field image file that includes a depth map in accordance with an embodiment of the invention is illustrated in FIG. 23. The process 2300 includes decoding (2302) an image synthesized from light field image data contained within a light field image file. In addition, a depth map derived from the light field image data that describes the synthesized image is also decoded (2304) from metadata contained within the light field image file. One or more depth dependent effects can then be applied (2406) to the pixels of the decoded image based upon the depths of the pixels indicated by the depth map. In a number of embodiments, the depth dependent effects are automatically determined by modifying the focal plane, and/or F number (which provides different depths of fields and degree of blur in out-of-focus regions). The image can then be displayed (2308). In many embodiments, the image is displayed on a local display. In a number of embodiments, the image is streamed to a remote display or encoded as an image and forwarded to a remote device for display.

Although specific processes for applying depth dependent effects to an image synthesized from light field image data using a depth map obtained using the light field image data are discussed above with respect to FIG. 23, any of a variety of processes can be utilized for extracting an image and a depth map from a light field image file and for using the depth map to apply one or more depth dependent effects in accordance with embodiments of the invention. Processes for rendering images from different viewpoints to the reference viewpoint of an image contained within a light field image file based upon a depth map and information concerning occluded pixels contained within the light field image file in accordance with embodiments of the invention are discussed further below.

Rendering Images Using Different Viewpoints

One of the compelling aspects of computational imaging is the ability to use light field image data to synthesize images from different viewpoints. The ability to synthesize images from different viewpoints creates interesting possibilities including the creation of stereo pairs for 3D applications and the simulation of motion parallax as a user interacts with an image. Light field image files in accordance with many embodiments of the invention can include an image synthesized from light field image data from a reference viewpoint, a depth map for the synthesized image and information concerning pixels from the light field image data that are occluded in the reference viewpoint. A rendering device can use the information concerning the depths of the pixels in the synthesized image and the depths of the occluded images to determine the appropriate shifts to apply to the pixels to shift them to the locations in which they would appear from a different viewpoint. Occluded pixels from the different viewpoint can be identified and locations on the grid of the different viewpoint that are missing pixels can be identified and hole filling can be performed using interpolation of adjacent non-occluded pixels. In many embodiments, the quality of an image rendered from a different viewpoint can be increased by providing additional information in the form of auxiliary maps that can be used to refine the rendering process. In a number of embodiments, auxiliary maps can include confidence maps, edge maps, and missing pixel maps. Each of these maps can provide a rendering process with information concerning how to render an image based on customized preferences provided by a user. In other embodiments, any of a variety of auxiliary information including additional auxiliary maps can be provided as appropriate to the requirements of a specific rendering process.

Figure 24:
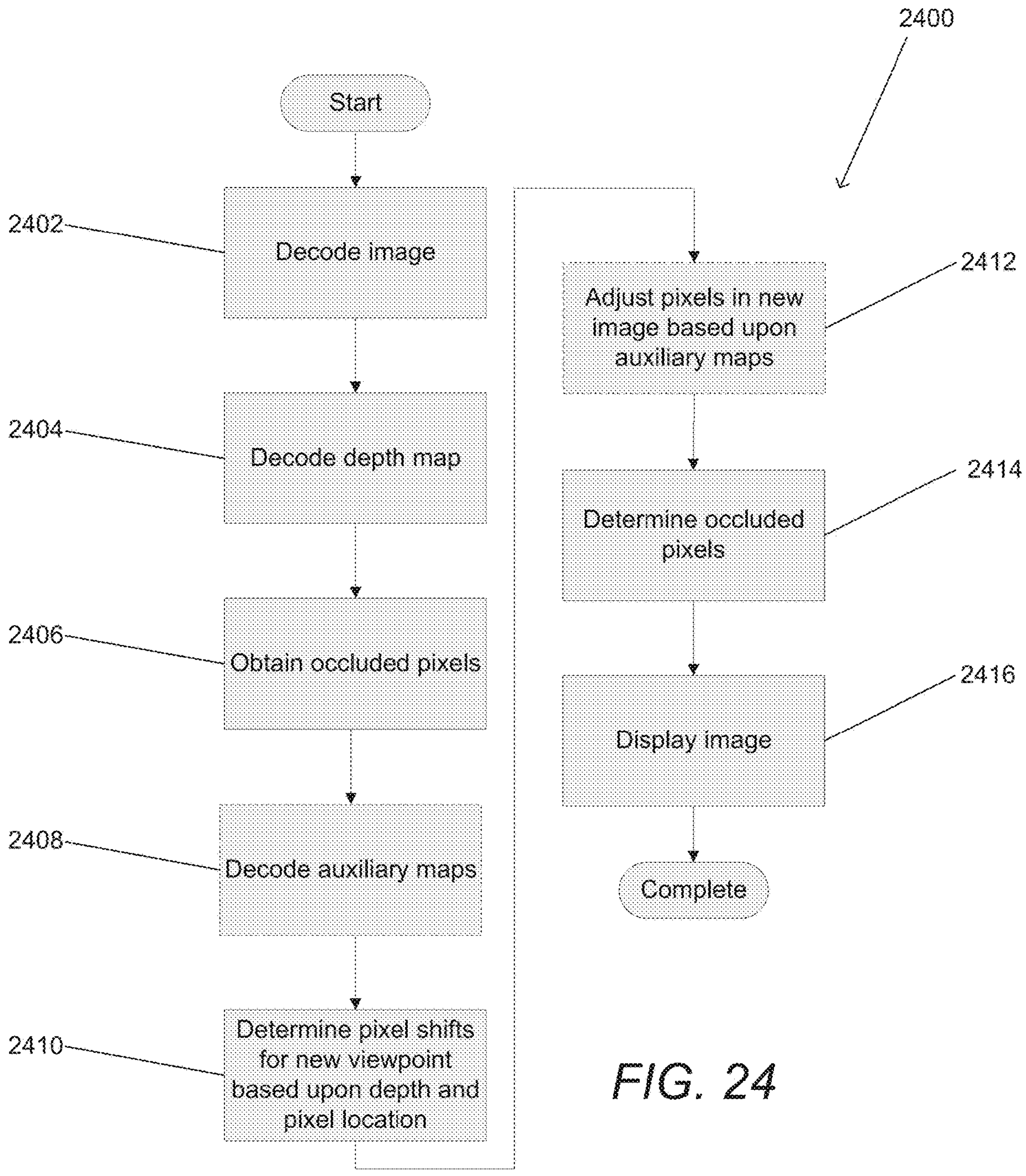
FIG. 24 is a flow chart illustrating a process for rendering an image from a different viewpoint to a reference viewpoint of an image contained within a light field image file in accordance with an embodiment of the invention.

A process for rendering an image from a different viewpoint using a light field image file containing an image synthesized using light field image data from a reference viewpoint, a depth map describing the depth of the pixels of the synthesized image, and information concerning occluded pixels in accordance with an embodiment of the invention is illustrated in FIG. 24. The process 2400 includes decoding (2402) an image contained within a light field image file, where the image is an image synthesized from light field image data. The process also includes decoding (2404) a depth map from the light field image file, where the depth map was also obtained from the light field image data used to synthesize the encoded image. Information concerning pixels from the light field image data that are occluded in the reference viewpoint is also obtained (2405) from the light field image file, where the information includes the location and depth of the occluded pixels from the reference viewpoint. In many embodiments, auxiliary information, including auxiliary maps that specify additional information concerning the pixels in the encoded image, is also contained within the light field image file and auxiliary information useful in the rendering of an image from a different viewpoint to the reference viewpoint can be extracted and decoded (2408) from the light field image file. Using the depth map and the depths of the occluded pixels, shifts in the location and depths of pixels in the different viewpoint can be determined (2410). Based upon the shifts, occluded pixels can be determined (2414) and the image displayed. Where auxiliary information is available, the auxiliary information can be utilized to adjust (2412) the pixels in the image prior to rendering. In many embodiments, the adjustments are performed prior to identifying occluded pixels and displaying the final image. In a number of embodiments, the adjustments are performed after occluded pixels are identifies.

Although specific processes for rendering an image from a different viewpoint using an image synthesized from a reference view point using light field image data, a depth map obtained using the light field image data, and information concerning pixels in the light field image data that are occluded in the reference viewpoint are discussed above with respect to FIG. 24, any of a variety of processes can be utilized for rendering images from different viewpoints using a light field image file as appropriate to the requirements of specific applications in accordance with embodiments of the invention. Processes for rendering images simulating different lens characteristics from in accordance with embodiments of the invention are discussed further below.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A method, comprising:

obtaining a first image file, where the first image file comprises: an image of a scene, the image stored in a first portion of the first image file; and a depth map for the image of the scene, the depth map stored in a second portion of the first image file;

obtaining an input indicating a depth-based effect to be applied to the image of the scene;

generating, based on the depth map, metadata associated with the depth-based effect;

generating a synthetic image of the scene by applying the depth-based effect to the image of the scene; and encoding a second image file, where the second image file comprises: the image of the scene, the image stored in a first portion of the second image file; the metadata stored in a second portion of the second image file; and the synthetic image of the scene, the synthetic image stored in a third portion of the second image file; and storing the second image file.

2. The method of claim 1, wherein the depth map comprises depth information generated by determining disparity between pixels in the image of the scene, and pixels in a second image of the scene, wherein the image of the scene is captured using a first camera of an array camera; and the second image of the scene is captured using a second camera of the array camera.

3. The method of claim 2, wherein the first image file further comprises the second image of the scene stored in a third portion of the first image file.

4. The method of claim 1, wherein the depth-based effect comprises ablur effect.

5. The method of claim 1, wherein the first image file is encoded in accordance with the Exchangeable Image File Format (EXIF).

6. The method of claim 1, wherein the first image file is encoded in accordance with the JPEG File Interchange Format (JFIF).

7. The method of claim 1, wherein the first image file further comprises a confidence map for the depth map, the confidence map stored in a third portion of the first image file.

8. The method of claim 1, wherein the first image file further comprises an edge map stored in a third portion of the first image file.

9. The method of claim 1, wherein the first image file further comprises a lower resolution image of the scene stored in a third portion of the first image file.

10. The method of claim 1, wherein the first image file further comprises an existing synthetic image of the scene, where the existing synthetic image comprises an existing depth-based effect applied to the image of the scene, wherein the depth-based effect applied to generate the synthetic image differs from the existing depth-based effect.

11. The method of claim 10, wherein the existing depth-based effect comprises a blur effect.

12. The method of claim 1, wherein the second image file is encoded in accordance with the Exchangeable Image File Format (EXIF).

13. The method of claim 1, wherein the second image file is encoded in accordance with the JPEG File Interchange Format (JFIF).

14. A mobile device, comprising:

a processor; and a memory, the memory containing an application that configures the processor to:

obtain a first image file, where the image file comprises: an image of a scene, the image stored in a first portion of the first image file; and a depth map for the image of the scene, the depth map stored in a second portion of the first image file;

obtain an input indicating a depth-based effect to be applied to the image of the scene;

generate, based on the depth map, metadata associated with the depth-based effect;

generate a synthetic image of the scene by applying the depth-based effect to the image of the scene; and encode a second image file, where the second image file comprises: the image of the scene, the image stored in a first portion of the second image file; the metadata stored in a second portion of the second image file; and the synthetic image of the scene, the synthetic image stored in a third portion of the second image file; and store the second image file.

15. The mobile device of claim 14, wherein the depth map comprises depth information generated by determining disparity between pixels in the image of the scene, and pixels in a second image of the scene, wherein the image of the scene is captured using a first camera of an array camera; and the second image of the scene is captured using a second camera of the array camera.

16. The mobile device of claim 14, wherein the depth-based effect comprises a blur effect.

17. The mobile device of claim 16, wherein the first image file further comprises an existing synthetic image of the scene, where the existing synthetic image comprises an existing depth-based effect applied to the image of the scene, wherein the depth-based effect applied to generate the synthetic image differs from the existing depth-based effect.

18. The mobile device of claim 14, wherein the second image file is encoded in accordance with the Exchangeable Image File Format (EXIF).

19. The mobile device of claim 14, wherein the second image file is encoded in accordance with the JPEG File Interchange Format (JFIF).

20. The mobile device of claim 14, wherein the first image file is encoded in accordance with the Exchangeable Image File Format (EXIF).

* * * * *